(12) United States Patent
Faulkner et al.

(10) Patent No.: US 8,761,350 B2
(45) Date of Patent: Jun. 24, 2014

(54) HOME WIRING TEST SYSTEM WITH MISSING FILTER DETECTION

(75) Inventors: Roger Faulkner, Swindon (GB); Gregory M. Nulty, Reston, VA (US)

(73) Assignee: Tollgrade Communications, Inc., Cranberry Township, PA (US)

( * ) Notice: Subject to any disclaimer, the term of this patent is extended or adjusted under 35 U.S.C. 154(b) by 5 days.

(21) Appl. No.: 13/492,703

(22) Filed: Jun. 8, 2012

(65) Prior Publication Data

US 2012/0307983 A1 Dec. 6, 2012

Related U.S. Application Data

(63) Continuation-in-part of application No. 13/279,382, filed on Oct. 24, 2011, and a continuation-in-part of application No. 13/279,627, filed on Oct. 24, 2011.

(60) Provisional application No. 61/405,846, filed on Oct. 22, 2010, provisional application No. 61/405,820, filed on Oct. 22, 2010.

(51) Int. Cl.
*H04M 1/24* (2006.01)
*H04M 3/08* (2006.01)
*H04M 3/22* (2006.01)

(52) U.S. Cl.
USPC .................... 379/22.03; 379/1.04; 379/22.07; 379/29.01; 379/29.07

(58) Field of Classification Search
USPC .......... 379/1.01, 1.03, 1.04, 21, 22.03, 22.08, 379/27.01, 29.01, 22.07, 29.03, 29.07; 375/224; 324/539, 614
See application file for complete search history.

(56) References Cited

U.S. PATENT DOCUMENTS

| | | |
|---|---|---|
| 5,699,402 A | 12/1997 | Bauer et al. |
| 6,369,650 B1 | 4/2002 | Hayat-Dawoodi |
| 6,654,914 B1 | 11/2003 | Kaffine et al. |
| 6,823,479 B1 | 11/2004 | McElhaney, Jr. et al. |
| 6,970,429 B2 | 11/2005 | Arsikere et al. |
| 7,042,983 B2 | 5/2006 | Bauer et al. |

(Continued)

FOREIGN PATENT DOCUMENTS

| | | | |
|---|---|---|---|
| EP | 1 699 172 A1 | 9/2006 | |
| EP | 1 761 012 A1 | 3/2007 | |

(Continued)

OTHER PUBLICATIONS

International Search Report and Written Opinion for Application No. PCT/US2012/041946 mailed Jan. 24, 2013.

(Continued)

*Primary Examiner* — Binh Tieu
(74) *Attorney, Agent, or Firm* — Wolf, Greenfield & Sacks, P.C.

(57) ABSTRACT

A system for testing a conductor of a structure can include a test device connected to the conductor. The test device is configured to test an electrical characteristic of the conductor and to produce a test result based at least in part on the electrical characteristic. A service provider network may be configured to communicate with the test device to initiate a test and/or to obtain the test result. A customer may use a computing device to obtain information regarding the test result, as well as guidance for troubleshooting and resolving a problem detected with the electrical conductor, such as a fault.

25 Claims, 25 Drawing Sheets

(56) References Cited

U.S. PATENT DOCUMENTS

| | | |
|---|---|---|
| 7,127,506 B1 | 10/2006 | Schmidt et al. |
| 7,295,655 B2 | 11/2007 | Harrison |
| 7,702,080 B2 * | 4/2010 | Defoort .................... 379/29.08 |
| 8,031,841 B2 | 10/2011 | Barzegar et al. |
| 2002/0150217 A1 * | 10/2002 | Haines ...................... 379/22.02 |
| 2004/0080323 A1 | 4/2004 | Bostoen et al. |
| 2005/0232159 A1 | 10/2005 | Joo et al. |
| 2006/0164101 A1 * | 7/2006 | Fossion et al. ................ 324/539 |
| 2006/0198500 A1 * | 9/2006 | Defoort ........................ 379/1.01 |
| 2007/0001685 A1 | 1/2007 | Gorka |
| 2007/0147591 A1 | 6/2007 | Ploumen et al. |
| 2007/0192477 A1 | 8/2007 | Hicks et al. |
| 2007/0230667 A1 | 10/2007 | Warner et al. |
| 2008/0013612 A1 | 1/2008 | Miller et al. |
| 2008/0205501 A1 * | 8/2008 | Cioffi et al. .................. 375/224 |
| 2009/0047016 A1 | 2/2009 | Bernard et al. |
| 2009/0080349 A1 | 3/2009 | Rofougaran |
| 2009/0135732 A1 | 5/2009 | Maxson |
| 2010/0150319 A1 | 6/2010 | Irenze et al. |
| 2012/0099436 A1 | 4/2012 | Afzal et al. |
| 2012/0099629 A1 * | 4/2012 | Faulkner et al. ............. 375/222 |
| 2012/0140641 A1 | 6/2012 | Reese et al. |
| 2012/0306895 A1 | 12/2012 | Faulkner et al. |
| 2012/0307982 A1 | 12/2012 | Faulkner et al. |

FOREIGN PATENT DOCUMENTS

| | | |
|---|---|---|
| EP | 1 796 282 A1 | 6/2007 |
| EP | 2 216 972 A1 | 8/2010 |
| WO | WO 2005/036919 A2 | 4/2005 |
| WO | WO 2007/008835 A2 | 1/2007 |
| WO | WO 2010/091340 A2 | 8/2010 |
| WO | WO 2012/054921 A2 | 4/2012 |

OTHER PUBLICATIONS

International Search Report and Written Opinion for Application No. PCT/US2012/041952 mailed Jan. 24, 2013.

Invitation to Pay Additional Fees for Application No. PCT/US2012/041956 mailed Jan. 24, 2013.

International Search Report and Written Opinion for Application No. PCT/US2012/041956 mailed Apr. 5, 2013.

International Search Report and Written Opinion for Application No. PCT/US2011/057475 mailed May 4, 2012.

International Preliminary Report on Patentability for Application No. PCT/US2011/057475 mailed May 2, 2013.

Invitation to Pay Additional Fees for Application No. PCT/US2011/057486 mailed Nov. 28, 2011.

International Search Report and Written Opinion for Application No. PCT/US2011/057486 mailed Apr. 19, 2012.

International Preliminary Report on Patentability for Application No. PCT/US2011/057486 mailed May 2, 2013.

"3M Dynatel Line Tester 946-PT," 2006, 4 pages, 3M Telecommunications, Austin, TX.

"JDSU SmartClass IW-1000," SmartClass IW-1000 datasheet, 2011, 8 pages, JDS Uniphase Corporation, US.

* cited by examiner

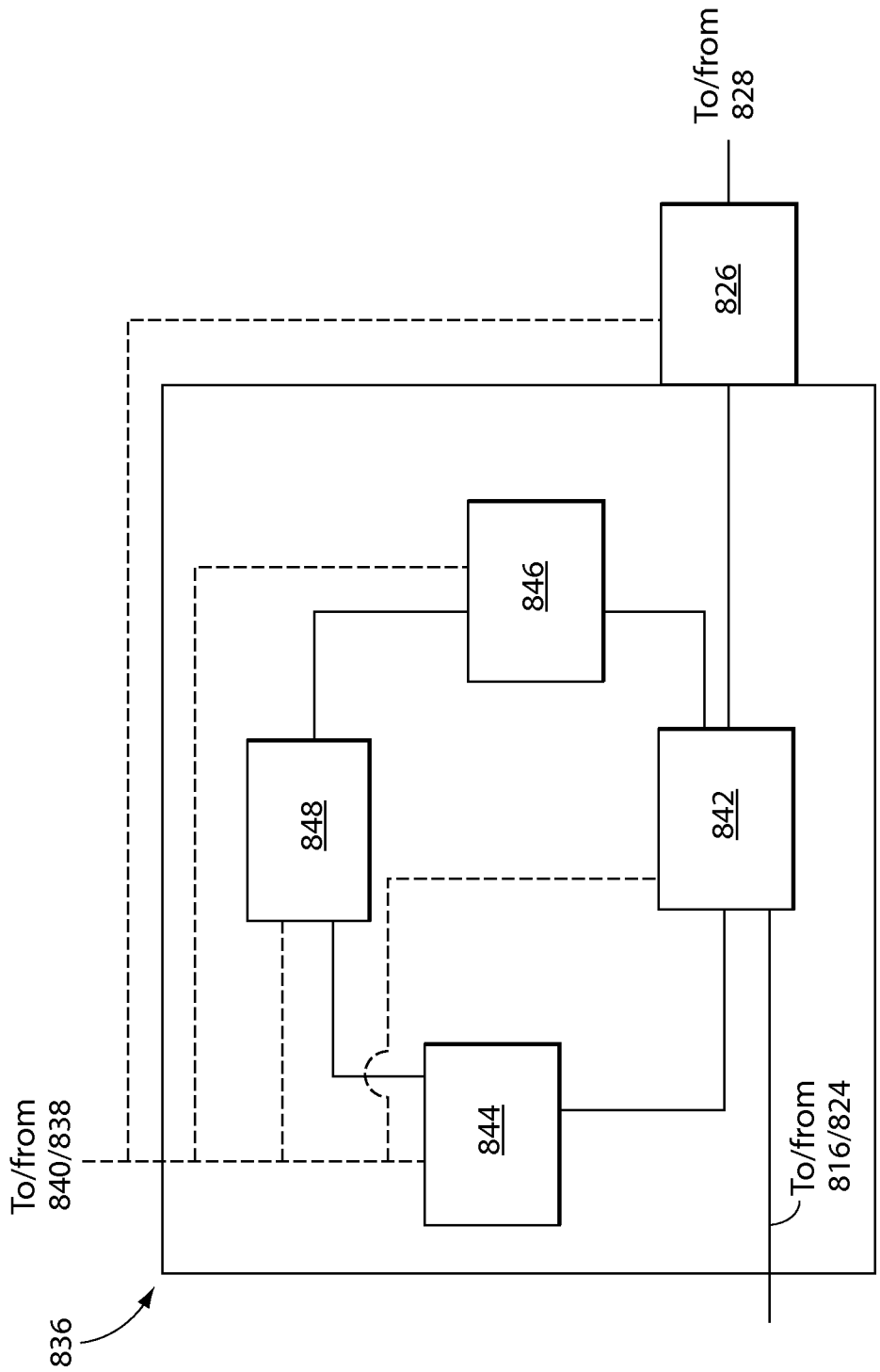

HOME WIRING TEST SYSTEM WITH MISSING FILTER DETECTION

RELATED APPLICATIONS

This application is a continuation-in-part of and claims priority under 35 U.S.C. 120 to U.S. patent application Ser. No. 13/279,382, filed on Oct. 24, 2011, titled "Communications Wiring Noise Level Monitor and Alarm Indicator," which claims the benefit under 35 U.S.C. 119(e) of U.S. Provisional Application 61/405,846, filed on Oct. 22, 2010 titled "In Home Communications Wiring Noise Level Monitor and Alarm Indicator;" and is a continuation-in-part of and claims priority under 35 U.S.C. 120 to U.S. patent application Ser. No. 13/279,627, filed on Oct. 24, 2011, titled "Integrated Ethernet Over Coaxial Cable, STB, and Physical Layer Test and Monitoring," which claims the benefit under 35 U.S.C. 119(e) of U.S. Provisional Application 61/405,820, filed on Oct. 22, 2010, titled "Integrated Ethernet Over Coaxial Cable, STB and Physical Layer Test and Monitoring," each of which is hereby incorporated by reference in its entirety.

DISCUSSION OF RELATED ART

Residential customers may receive communication services, such as telephone or Internet access, from various service providers such as cable or DSL service providers. These services may be distributed to multiple customers through service provider networks that carry signals to each customer's premises. At each customer's premises, wiring is often connected to the network to make such services available at multiple locations or through multiple devices.

Communication services can be degraded or interrupted due to faults in either the network or the wiring local to the customer's premises. The service provider is generally responsible for faults that occur in the network. However, the customer is usually responsible for repairing faults with the customer's premises.

Nonetheless, when problems occur with the customer's service, the customer may call the service provider for assistance, whether or not the problem is caused by a fault in the customer premises wiring or the service provider's network. An automated system may assist the user over the telephone. If the customer is unable to resolve the problem, he/she may request to speak with a customer support representative. In some circumstances, the customer support representative may initiate a wiring test using a line test system that controls a test head to test the service provider network. Though, if the customer support representative determines that the cause of the problem is not within the service provider's network or cannot identify the source of the problem, it may be necessary for the service provider to send a technician to the customer's residence to resolve the problem.

Dispatching a technician can be costly for the service provider. In some instances, the service provider will impose a charge on the customer for dispatching a technician to the customer's premises, which can also be costly or frustrating for the customer. Even if a technician is not dispatched, the cost of maintaining a customer support center with personnel and test systems to respond to customer calls can be costly for the service provider.

Furthermore, the inventors have recognized and appreciated that existing techniques for testing wiring by a service provider may be insufficient for detecting wiring faults at a customer's location. In particular, noise or interference problems that occur at high frequencies may be difficult to detect from a remote location.

SUMMARY

Some embodiments relate to a method to detect a service affecting condition in a communications network associated with a missing filter. The method includes, with a test device connected to a conductor of the communications network, measuring a spectrum on the conductor to determine first spectrum information. The method also includes detecting a communication device connected to the communication network in an in-use state. The method additionally includes, while the communication device is in the in-use state, with the test device, measuring a spectrum on the conductor to determine second spectrum information. The method further includes indicating a missing filter when the second spectrum information deviates from the first spectrum information by more than a threshold amount.

Some embodiments relate to at least one non-transitory computer readable medium comprising computer executable instructions that, when executed by at least one processor, perform a method for detecting a service affecting condition in a communication network. The method includes controlling test hardware connected to a conductor of the communications network to measure a spectrum on the conductor to determine first spectrum information. The method also includes storing the first spectrum information. The method additionally includes measuring a spectrum on the conductor to determine second spectrum information in response to a trigger, the trigger comprising an indication that a telephone-like device connected to the communications network is off-hook. The method further includes conditionally indicating a missing filter based on a magnitude of a difference between the second spectrum information and the first spectrum information.

Some embodiments relate to a test device that includes a port for connection to a conductor of a customer premises over which DSL service is provided. The DSL service supports communications in a voice band and a data band. The test device includes measurement circuitry and at least one processor. The at least one processor is configured to operate the measurement circuitry so as to obtain spectrum information associated with signals on the conductor at a plurality of times; analyze the spectrum information to identify, in the data band, spectral energy generated by a terminal device adapted to communicate in the voice band; and when the spectral energy exceeds a threshold, indicate a fault condition associated with the conductor.

The foregoing summary is provided by way of illustration and is not intended to be limiting.

BRIEF DESCRIPTION OF DRAWINGS

FIG. 11 shows an example of a Measurement AFE/Pass-Through circuit, according to some embodiments.

DETAILED DESCRIPTION

Figure 1:
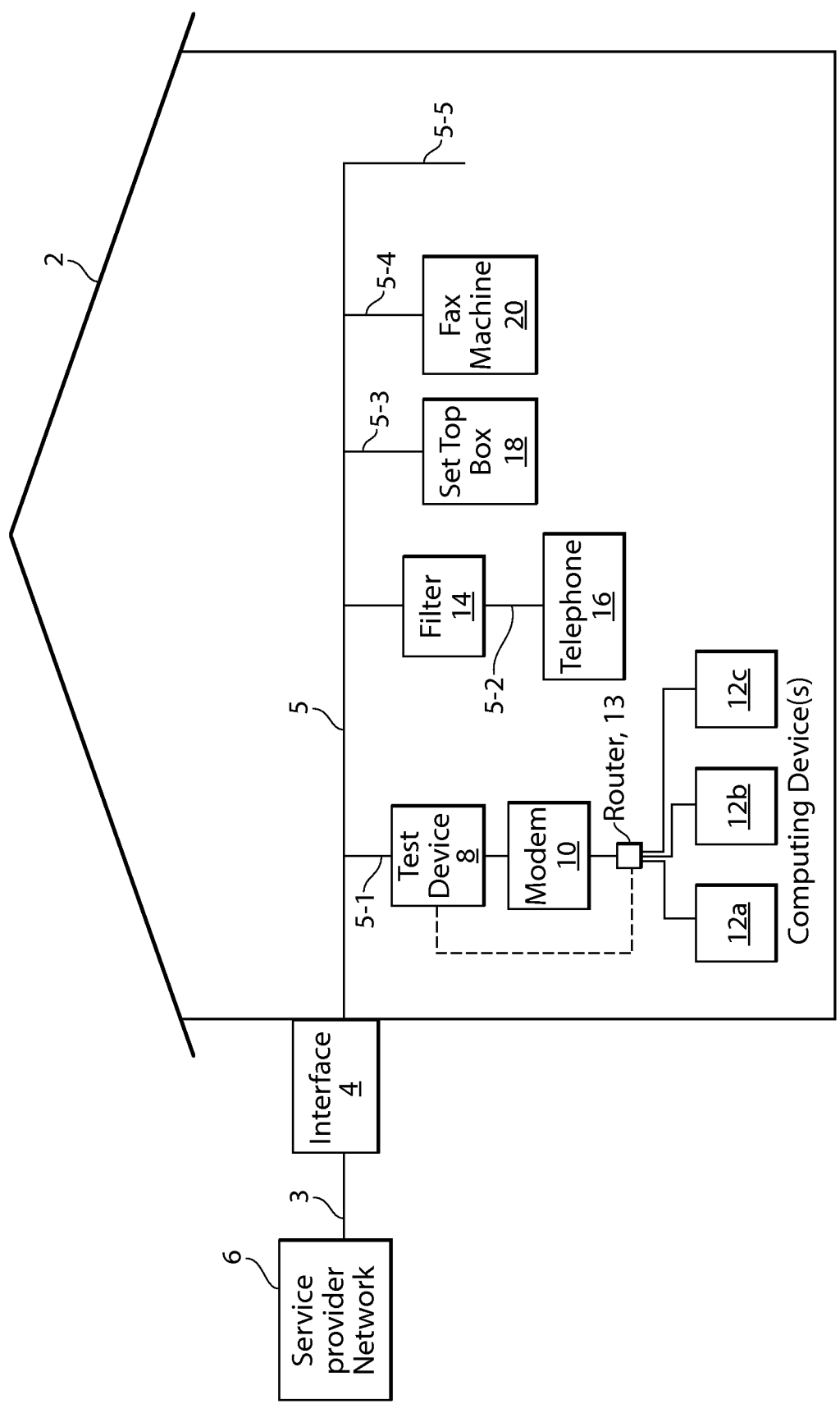
FIG. 1 illustrates a building provided with a communication service, in which a test device may be used to test conductors used in providing the communication service.

The inventors have recognized and appreciated that a significant reduction in service related costs can be achieved by a service provider that has a customer service system that supports interaction with test devices at customer premises. The inventors have also recognized and appreciated that customers of a communication service may have an improved user experience through such a test device that is simple to install and operate at the customer's premises. For the service provider, there may be a reduction in the need for maintaining support personnel and test equipment for responding to customer complaints about problems that ultimately are traced to faults in customer premises wiring. For customers, the frustration of interacting with a service provider only to ultimately learn that problems with the customer's service are caused by the customer's own wiring may be reduced. Costs of an unnecessary dispatch of a technician to the customer's premises might be avoided. Even in scenarios where dispatch of a technician is required, the surprise of being required to pay the service provider for that dispatch may be eliminated, which may ultimately improve the customer's experience.

Described herein is a testing system and associated techniques that employ a test device positioned at the customer's location within the customer's premises. Advantageously, embodiments are described in which the test device may be connected easily by the customer within the customer's home. The test device can test wires (or other electrical conductors) carrying service at the customer's location, including conductors on the customer premises and/or outside of the customer premises (e.g., in the service provider network) to enable detecting faults or other problems that may cause a service disruption. Such a device may support multiple operating modes to facilitate multiple modes of identifying conditions that could create service problems, for current or possible future services.

The test device can make any of a variety of measurements and to generate any of a variety of test signals. Supported measurements may include measurements of electrical properties of the conductors themselves. These measurements may be used to determine conditions of conductors, such as shorts, opens or conditions causing imbalance of conductors used as a differential pair. These measurements may also be used to determine operational state of conductors, such as whether the conductors are actively being used to provide telephone service or data service.

Other measurements may reveal energy at different frequencies. Such a capability may be used, in combination with an ability to determine whether a line is actively in use, to measure quiet line noise or to detect a missing microfilter. Alternatively or additionally, such a capability may be used in combination with an ability to generate test signals (e.g., stimulus signals) at a range of frequencies to perform frequency domain reflectometry measurements, which can aid in determining a location of a fault. As a further example, such a capability may be used to determine whether signals in accordance with a protocol, such as DSL, are being received, which can be used to detect or localize faults.

Embodiments of the test device described herein may be able to measure parameters that are useful in testing various aspects of conductors present at a customer premises, including a physical network layer of a network within the customer's residence (or other structure). For example, the test device may perform electrical tests on any suitable electrical conductors (e.g., wiring, cables, etc.) within the structure and may be configured to derive, based on those measurements, conclusions about faults or other service-affecting conditions on those conductors. In the embodiments described herein, a test device may be configured to perform tests on telephone lines, cable television wiring, or power lines, for example. Such tests may assist in resolving problems with DSL service, cable television and/or Internet service, a power line communication network, or any other suitable type of service.

Such a test device may be triggered to perform tests in one or more ways. The test device, for example, may be activated by the customer, e.g., by the push of a button, thus enabling the customer to initiate a test without requiring the customer to contact the service provider. Alternatively or additionally, the test device may be activated by an external computing device.

The external computing device may be a computing device operated by the customer. Such a computing device may be programmed to control the test device to perform a diagnostic sequence aimed at identifying faults in conductors on the premises. The diagnostic sequence may include instructions for the user to take action that can aid in diagnosing or, in some scenarios, resolving service-affecting conditions within the customer's premises. In some embodiments, the external computing device that triggers one or more tests may be a DSL modem, router, residential gateway or other customer premises equipment such as a set top box, television, personal computer, tablet computer, smartphone or other device.

Alternatively or additionally, the external computing device may be a computing device operated by the service provider. The external computing device, for example, may be a component of a test system that is testing a line used by a customer having the test device. Interactions between the service provider test system and the test device on the customer premises may better diagnose a fault and determine its location than either the test system or test device alone. Alternatively or additionally, the external computing device may be a computing device managing interactions with a customer that has contacted the service provider for assistance in resolving a problem with service.

In such a scenario, the external computing device may trigger the test device to perform tests or to provide the results of tests. Though, it is not a requirement that the external computing device trigger either the generation or transmission of test results by the test device. The test device, for example, may be programmed to initiate communication with the external computing device based on measurements made in performing a test or may be triggered to initiate communication based on user input or other factors.

In some embodiments, communication, conveying commands, test results or other information may occur over a communication network, which may be the same network providing the communication service or a different network. In the case of a DSL service provider, the communications may be "in-band," which in that scenario may occur using signaling tones sent as part of a telephone signal, or may be "out of band," which in that scenario may occur using an Internet service to connect to a web site. Though, it is not a requirement of the invention that such communication between a test device and an external computing device take place electronically or even provided to an external computing device at all. In some embodiments, the test device may have a user interface. A test result can be provided to the customer through the user interface to allow the customer to determine the status of the electrical conductors in their home, and can allow the customer to troubleshoot and resolve problems on their own.

Alternatively or additionally, in some embodiments, a customer may obtain the test result through the user interface and input the test result to an external computing device, such as the customer's computing device. In this way, the external computing device may provide the customer with additional information regarding the test result and/or troubleshooting information. In this manner, detailed guidance may be presented to the customer to assist the customer to resolve the problem.

The test devices described herein may be simple and inexpensive, facilitating widespread use by customers and allowing service providers to decrease the cost associated with customer support calls and technician visits. The use of a test device as described herein can revolutionize the way in which service providers diagnose and resolve service problems, enabling resolving service problems more efficiently, resulting in lower costs and improving the customer's satisfaction with their service.

In some embodiments, a test device may be implemented as a device, separate from other components, that may be connected by the customer to one or more conductors (e.g., wiring, cables, etc.) within the customer's structure. However, the techniques and devices described herein are not limited in this respect. For example, in some embodiments, a test device may be installed in an interface between the external conductors of the service provider network and the conductors inside the customer's premises. As another example, a test device may be configured to reside within another device in the customer's premises, such as a set-top-box (STB) or modem, for example. An embodiment in which a test device may be implemented as a device separate from other components will be discussed with respect to FIG. 1.

FIG. 1 schematically illustrates an example of a customer premises, which in this example is building 2 which may be a residence or other structure. The customer premises is provided with one or more service(s), such as telephone service and/or DSL (Digital Subscriber Line, which comes in multiple forms, such as ADSL and VDSL) service by service provider network 6 via one or more external conductors 3 (e.g., electrical conductors, such as telephone, wiring, in this example). External conductors 3 may be any suitable types of conductors, such as wires, cables, etc., and may be formed of any suitable electrically conductive material (e.g., copper). In the example of FIG. 1, in which telephone service may be provided via external conductors 3, the external conductors 3 may be a twisted pair cable, such as a Tip-Ring pair. External conductors 3 may be connected to the internal conductors 5 (e.g., electrical conductors, such as telephone, wiring, in this example) of the customer premises at an interface 4. Although interface 4 is illustrated in FIG. 1 as being located on the exterior of the customer premises, in some embodiments, an interface between the internal conductors 5 and external conductors 3 may be located on the inside of the customer premises, or in any other suitable location. Interface 4 is an example of a network demarcation point, which in this example is connected between the internal conductors 5 and external conductors 3 of a building 2. However, it should be appreciated that other types of buildings, such as multi-dwelling premises, may have interfaces located at different network demarcation points within and/or outside of the premises.

Internal conductors 5 may be any suitable types of conductors such as wires, cables, etc., and may be formed of any suitable electrically conductive material (e.g., copper). As with the external conductors 3, the internal conductors 5 in this example may be a twisted pair cable, such as a Tip-Ring pair. In this example, interface 4 between the internal conductors 5 and the external conductors 3 may be a Network Interface Device (NID), as known in the art.

The internal conductors 5 may include unfiltered extensions 5-1, 5-3, 5-4 and 5-5, and a filtered extension 5-2. Filtered extension 5-2 has an associated filter 14, which may be a low-pass filter, commonly referred to as a microfilter, to filter out high frequency DSL tones, as known in the art. A telephone 16 may be connected to the filtered extension 5-2. Additional devices may be connected to the unfiltered extensions. For example, as illustrated in FIG. 1, a set top box (STB) 18 may be connected to unfiltered extension 5-3 and a fax machine 20 may be connected to unfiltered extension 5-4. One or more unterminated extensions 5-5 may also be present.

In some embodiments, a test device 8 may be connected to the internal conductors 5 of the customer premises (e.g., the unfiltered extension 5-1 illustrated in FIG. 1). In the embodiment shown in FIG. 1, a modem 10 is connected to the internal conductors 5 via the test device 8. One or more computing device(s) 12a, 12b, 12c, etc. may be connected to the modem 10 via a wired or wireless connection, either directly or indirectly through another device, such as a router 13. Any suitable type of wired or wireless communication may be used, such as WiFi or Bluetooth for wireless communication, for example, or Ethernet, USB, FireWire, etc., for wired communication, by way of example and not limitation. Examples of computing devices 12a, 12b, 12c include a personal computer (e.g., a desktop or laptop computer), a tablet computer and a cellular telephone (e.g., a smartphone), by way of illustration. However, any suitable type computing device(s) may be used. Router 13 may be any suitable wired and/or wireless router. Router 13 may enable communication between computing device(s) 12*a*, 12*b*, 12*c* and modem 10, thereby forming a local network (e.g., a home network). Any suitable number of computing devices may be present in the home network.

Moreover, it should be appreciated that the devices and connections illustrated in FIG. 1 are exemplary rather than limiting. For example, though FIG. 1 illustrates multiple computing devices connected in a local network, any other network-enabled devices, such as smart appliances, televisions, gaming devices or Internet radios, may be connected to the network. As another example, a set top box may be connected to the local network. Further, though FIG. 1 illustrates that fax machine 20 is not coupled to other device through a filter like filter 14, in some embodiments, such a filter may be used. Moreover, in some scenarios, absence of such a filter may allow a device, such as fax machine 20, to generate signals that can interfere with operation of modem 10 when the device is active. Such a service-affecting condition may be detected by a test device.

In operation, modem 10 may communicate with the service provider network 6 via the internal conductors 5 and external conductors 3. In some embodiments, the modem 10 may be a customer's DSL modem (commonly referred to as ATU-R) that receives DSL service over conductors 3, 5 (e.g., telephone lines). If the service provider network 6 is a telephone network that provides DSL service, the service provider network 6 may include a central office (CO), a toll office (TO), a remote terminal (RT) and/or any other network nodes (not shown), as is known. Such a node may house the main telephone switching equipment for the customer premises and can serve as the location for the DSL service provider's modem (commonly referred to as ATU-C). The TO and the RT may be connected by one or more pairs of wires, and the CO may be connected to the TO via a fiber-optic link. However, the techniques described herein are not limited as to the manner in which signals are transmitted through the service provider network 6.

When modem 10 is a DSL modem, modem 10 may communicate with the service provider's modem using tones of higher frequency than the frequencies typically used for voice communication. In such embodiments, any suitable type of DSL communication may be used. The principles of DSL communication are known in the art and therefore will not be detailed herein. However, briefly, a DSL line may carry both a telephone signal and a data signal. These signals may be communicated at different frequencies and in different formats so that they can be separately processed. The data signal may be formatted as multiple sub-signals, or tones. Each of the tones may be modulated to convey one or more bits of information in a particular interval. The number of a bits that can be conveyed per tone, and the number of tones used, may depend on the characteristics of, or other conditions affecting, conductors used to carry that signal and these parameters of communication may be determined dynamically based on detected conditions. As known in the art, the service provider's modem may exchange data with the customer's modem 10 to provide network access to the customer. This network access may allow for any suitable service (e.g., Internet access).

Figure 2:
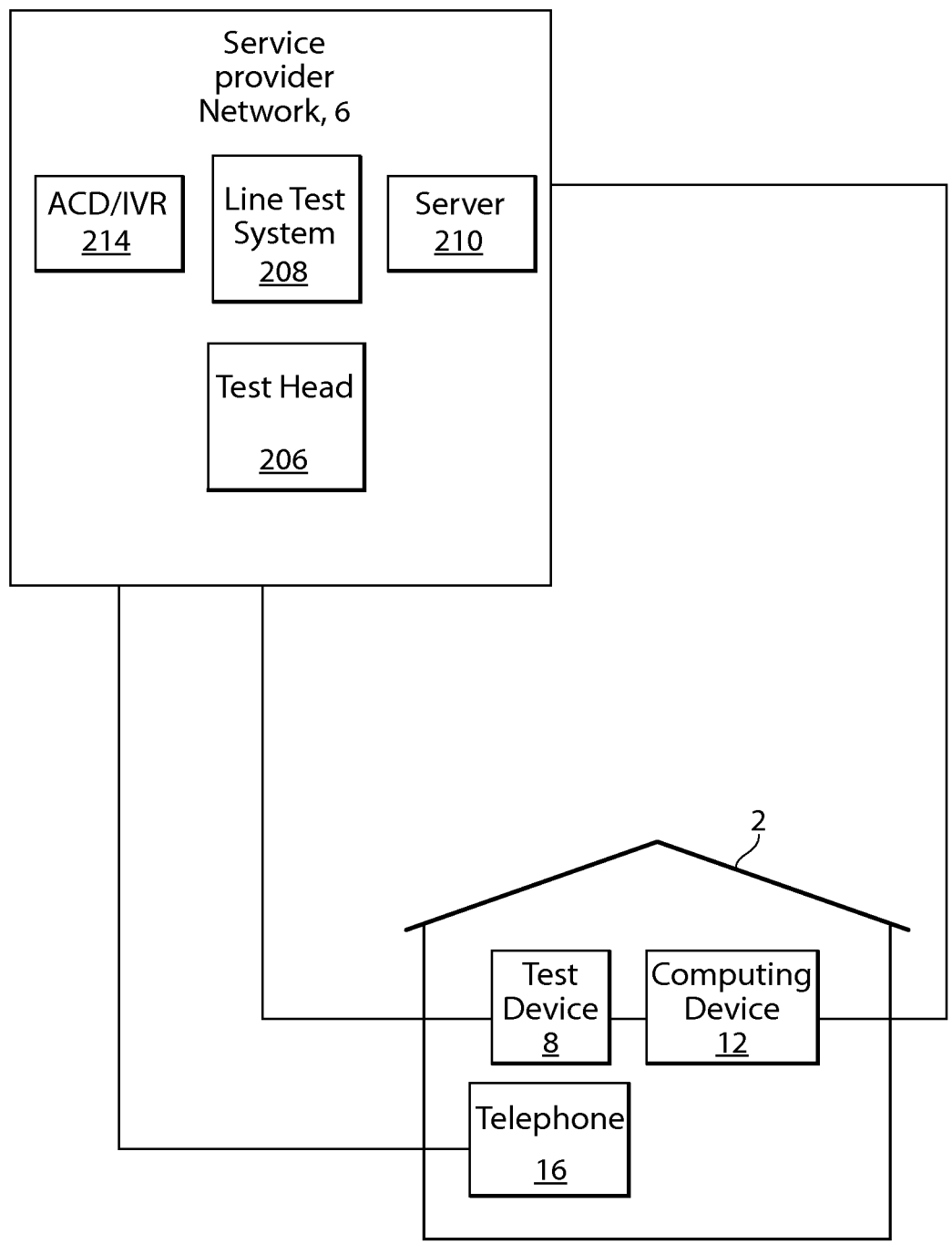
FIG. 2 shows a system in which a test device on the customer's premises is connected to a service provider's network.

FIG. 2 shows a diagram of a system in which the test device 8 may communicate with one or more other devices to provide additional functionality to aid in testing or troubleshooting. For example, as illustrated in FIG. 2, the test device 8 may communicate with a computing device 12 (e.g., device 12*a*, 12*b* and/or 12*c*, etc.) in the customer's structure. Since, in some embodiments, test device 8 may be a relatively simple device, the customer's computing device 12 may facilitate providing information to the customer regarding a test result obtained using the test device 8. For example, once a test has been performed, the test device 8 may send a test result to the computing device 12. The computing device 12 may use the test result to provide the customer with information regarding the condition identified by the code. Advantageously, the computing device 12 may provide troubleshooting information to assist the customer in resolving the problem. Examples of such techniques will be discussed in further detail with reference to FIGS. 4*a* and 4*b*.

In some embodiments, the test device 8 may communicate with the service provider network 6 to exchange test data and/or control commands. For example, the test device 8 may be configured to receive a command from the service provider network 6 to initiate a test. Such a technique may be used in a variety of scenarios. For example, if a customer is having a problem with their service, the customer may call the service provider (e.g., using telephone 16 or a cellular telephone). The customer's call may be handled by an Automated Call Distribution/Interactive Voice Response System (ACD/IVR) 214. ACD/IVR system 214 may be implemented using techniques as are known in the art. Though, it may be programmed to interact with test device 8 at a customer's premises.

To assist in resolving the problem, the ACD/IVR system 214 may interact with test device 8. In a scenario in which a customer has called ACD/IVR system 214 using a telephone on the customer premises, there may already be a connection, using the telephone service such that the interaction may occur over a telephone line. In some embodiments, that interaction may be performed using signaling tones designated for communications between the test device 8 and a remote computing device.

That interaction may include sending a command to the test device 8 to cause test device 8 to provide test results. The command may initiate an electrical test on the conductors of the customer premises and/or may trigger test device 8 to provide results of a most recently performed test.

This information may be used by the ACD/IVR system 214 in any suitable way. For example, the information may be used as part of an automated diagnosis technique. Test results from test device 8, reflecting a condition of conductors in a customer's premises, for example, may be used to localize a service affecting condition to either the service provider's network or the customer's premises. The test results also may be used to rule in or rule out problems, either in the premises or within the service provider network. The test results also may be used to confirm a diagnosis or increase the confidence in a conclusion as to the source or location of a condition affecting service.

Alternatively or additionally, the test results may be used by ACD/IVR system 214 to direct the service flow. For example, ACD/IVR system 214 may be programmed to prompt a customer for more information when test results from a test device within a customer's premises are not available than when results are available. As a specific example, if a quiet line noise measurement is available from test device 8, ACD/IVR system 214 may be programmed to omit questions prompting a customer to provide information about problem symptoms that might reveal a noise source creating interference with digital data services, but to ask those questions otherwise. As yet another example, if test device 8 is programmed to test for missing microfilters within the customer's premises, and if the test results indicate that missing microfilters were detected, ACD/IVR system 214 may present to the customer instructions for obtaining and installing microfilters, As yet a further use of such data, it may be used to condition access to a human service representative or to otherwise prioritize service provided to a customer. Because of the high cost to a service provider of making a human service representative available to a customer, a service provider may prioritize such access to those customers most likely to be experiencing problems with the service provider's network, and not problems within their own premises. Alternatively or additionally, including a step in a service flow that requires or encourages customers to conduct a test with a test device on their premises promotes diagnosis by a human customer service representative that has better information on which to diagnose a customer's problem. Having test results passed to ACD/IVR system 214 or other suitable computing device that is part of the service provider's network may provide the customer service representative with additional information, not available by asking questions of the customer. Moreover, in some scenarios, information provided by a test device may be more reliable than comparable information provided by a customer. A customer, for example, may inadvertently provide incorrect information or may make up information, thinking that doing so will expedite the service process.

As yet a further use of data from test device 8, ACD/IVR system 214 may use that data to provide the customer with information regarding a test result (e.g., a test result code) and/or troubleshooting information to aid the customer in resolving the problem. Such information may be provided to the user in a variety of ways, such as through automated speech generated by ACD/IVR system 214. As another example, information may be communicated in digital form for display on the test device 8, such as in the form of a test result code. In another example, a customer's computing device 12 may receive the test result and/or additional information from the server 210 or another computing device within the service provider network 6, for presentation to the customer. Though, it should be appreciated that any suitable device may be used to output such information. For example, in a scenario in which the test device is embedded within a set top box (18, FIG. 1), or otherwise connected to a television, the information may be presented as text, graphics or audio-video information on the television or another display device separate from a computing device.

It should be appreciated that, though ACD/IVR system 214 provides one mechanism by which test device 8 may interact with a component in the service provider's network, other modes of interaction may alternatively or additionally be supported. In another exemplary scenario, when a service problem occurs, the customer may go online to obtain assistance from the service provider via the Internet. For example, the customer may visit the service provider's web site using a web browser or may use an application program (i.e., an "app" for a smart phone, tablet P.C., or other device) that enables the customer to exchange information with the service provider over the Internet. To do so, the customer may use computing device 12 to communicate with a server 210 of the service provider network 6. As an example, if the customer is having a problem with their service that prevents access to the Internet through the service provider (e.g., DSL service), the customer may access the Internet using another medium, such as a cellular data connection, for example. The customer may thereby communicate with the service provider network 6 (e.g., via server 210) to request assistance. In one example, the service provider may provide assistance through the exchange of messages (e.g., using a chat session), or using any other suitable technique. In the course of providing assistance to the customer, the service provider network 6 may exchange information with the test device 8. As in other embodiments, the information exchanged may include a command to control operation of the test device and/or test data, as discussed above.

In some embodiments, interaction between the test device 8 and the service provider network may entail exchange of information for the purpose of detecting or localizing service-affecting conditions within the service provider network and/or within the customer's premises. In such a scenario, the "information" exchanged may serve as test signals that may be generated or measured at either test device 8 or a computerized device within the service provider network. Such testing may allow for double-ended measurements, such as may be used to detect shorts or opens or to determine attenuation at various frequencies or other parameters of a line.

Based on the measurement of such parameters, multiple conditions might be detected. For example, from a frequency profile, service-affecting conditions such as degraded insulation, wet wiring, or bridge taps might be detected. The measurements may also be used to identify configuration problems. For example, failure to detect a DSL tone that should be on a line may indicate a component, such as a modem intended to be present to generate such a signal, is not present. Though, it is not a requirement that interactive testing in this mode be based on measured parameters of a line. For example, a test device may contain circuitry on its line interface to present an impedance signature characterizing the device as a test device. An interactive measurement may test to determine whether such a signal can be detected, which may indicate end-to-end connectivity and may also generate information about the presence and/or capabilities of the test device, which may be useful in analyzing in data purportedly from the test device.

Accordingly, if the service provider has capabilities to perform another type of test, such as a test using line test system 208, that test may be adapted to include a mode in which there is interaction with a test device within a customer's premises. Such a test may be initiated as part of a test sequence when a test is performed by test device 8, or at any other suitable time when a test is desired to be performed on the external conductors 3 leading to the customer premises. For example, as described above, a customer call may be handled in accordance with a test flow that involves a series of interactions with the service provider. Those interactions may initially be performed with an automated system such as ACD/IVR system 214, initially based on readily available information or customer input. If the automated call processing does not resolve the customer's concern, the call may be transferred to a human customer service representative.

That human customer service representative may receive data collected by ACD/IVR system 214 when the call is transferred. That data may include data collected from test device 8. The human customer service representative may use that data to determine whether use of the line test system is warranted. If so, that test may involve interaction between the line-test system and the on-premises test device 8. Though, it is not a requirement that such a test involving interaction be initiated by a human customer service representative.

Regardless of how such a test is initiated, when a test is initiated, the line test system 208 may control the test head 206 to send a signal to the test device 8 via any suitable communication channel, including the external conductors 3 and internal conductors 5. Such a signal, or signals, may serve any one or more purposes useful in determining whether a service affecting condition exists of localizing the service affecting condition, In some embodiments, test head 206 may simply measure properties of the signal to determine whether a signature of test device is detected, which can determine that a communication path is present.

In other scenarios, the test device 8 may make a measurement of the signal received from test head 206. Such a test may be used to measure a loss of signal between the test head 206 and the test device 8, and/or any other suitable electrical parameter, such as a fault. The result of the test may be analyzed by test device 8 and/or the line test system 208. For example, the test device 8 may send a measurement and/or test result to the service provider network 6 for further analysis.

Alternatively or additionally, test device 8 may generate a signal that can be measured by test head 206. In a similar vein, measurement of parameters of the test signal may be used to determine characteristics of the conductors between test device 8 and test head 206. Though, any suitable type of signal may be generated directly or indirectly and interactive measurement may be made directly or indirectly. As an example of indirect signal generation, test head 206 may trigger a modem or other component to transmit a DSL signal, or a test signal representing one or more aspects of such a signal. As an example of indirect signal measurement, test head 206 may receive an indication from a modem or other component that a DSL signal, or a test signal representing one or more aspects of such a signal, was received. Such indirect measurements may confirm both conditions of the conductors that carry such signals but may also serve to confirm that the components, such as modems, used for indirect signal generation or measurement are present and operating correctly.

Although, in some embodiments, a test may be initiated in response to a customer's request for assistance, the techniques described herein are not limited in this respect. In some embodiments, the service provider may take action proactively to perform one or more tests. For example, a test may be initiated by the service provider in response to detecting a decrease in performance of a connection as indicated by data generated by a customer's modem 10 or other modem. These parameters may indicate, for example, that the dynamically selected parameters of a communication protocol, such as DSL, do not support bandwidth above a predetermined threshold or fail to meet some other criteria. As another example, the service provider may initiate tests periodically, if desired. Such techniques may allow the service provider to detect a problem before the customer notices the problem or requests assistance. If the service provider detects a problem in this manner, the service provider may notify the customer through any suitable medium (e.g., telephone call, e-mail or text message). For example, the service provider may send a notification to the customer of the nature of the problem and/or a suggested action to be taken. For example, the customer may be requested to access the service provider's web site to obtain additional information regarding the problem detected or to use an application program suitable for obtaining assistance from the service provider.

Having described a system and various scenarios in which a test device 8 may be used to perform measurements on internal conductors 5 of a customer's structure, an example of a test device 8 will be described.

Figure 3:
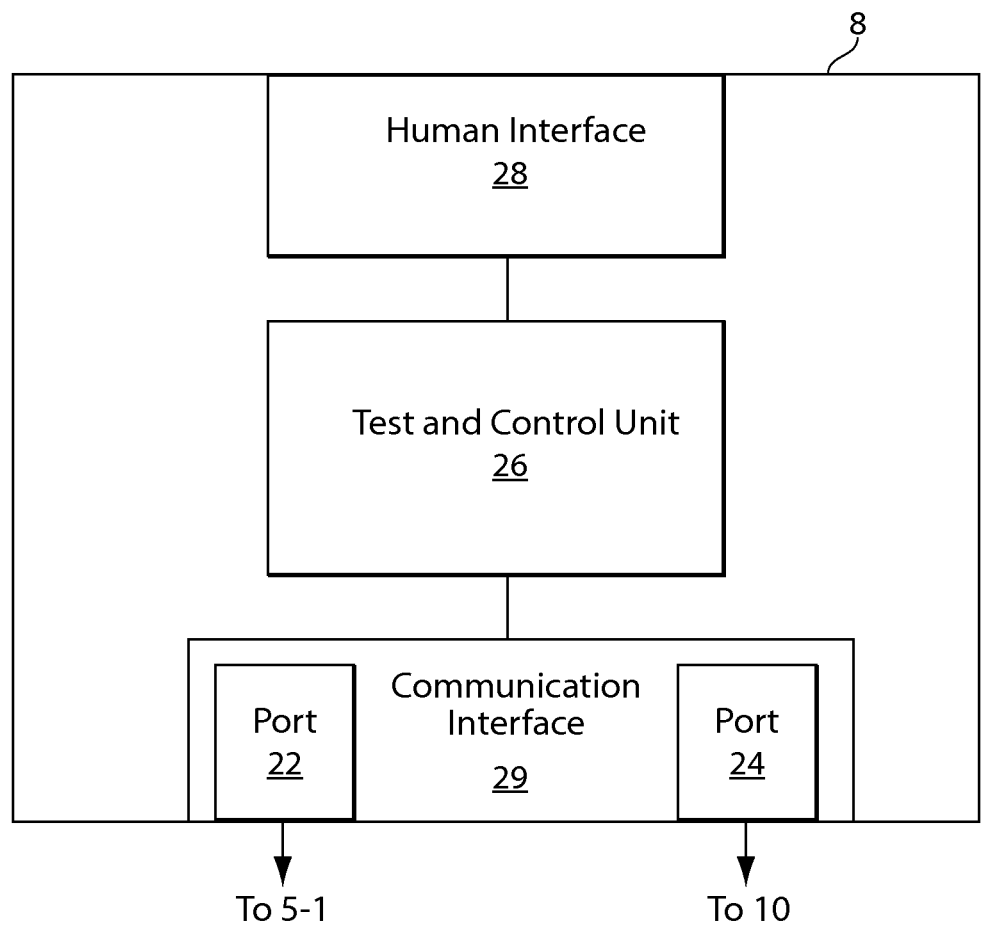
FIG. 3 shows an example of a test device configured to test an electrical characteristic of a conductor in the customer's structure, according to some embodiments.

FIG. 3 shows a block diagram of a test device 8, according to some embodiments. As discussed above, in some embodiments the test device 8 may be relatively simple device that may be located on the customer premises configured to test an electrical conductor within and/or outside of the customer premises. Though, test device 8 may be configured to perform other test functions, including interacting with a computerized device operated by a communication service provider.

The test device 8 may have a communication interface 29 for making a test connection to the internal conductors 5 and/or for communicating with one or more other devices. For example, the communication interface may have a port 22 configured to be connected to the internal conductors 5. Port 22 can be configured to be connected to any suitable type of wires, cables, or other type of internal conductors 5. In an embodiment as illustrated in FIG. 1, the test device 8 may also have a port 24 for connecting to another device, such as modem 10, through another conductor (e.g., wire, cable, etc.). Port 22 may be a connector of the type used for connecting devices used for the communication service to internal conductors 5. For example, if the test device 8 is configured to test DSL service, ports 22 and/or 24 may include a connector configured to connect to telephone wiring (e.g., an xDSL-compatible connector such as an RJ 11 socket or plug). However, the test device 8 may be configured to connect to any suitable type of conductors. For example, in some embodiments, test device 8 may be configured to test cables carrying cable television and/or cable Internet services. In such cases, ports 22 and/or 24 may be configured to connect to a coaxial cable. The techniques described herein are not limited as to the type of conductors tested by test device 8.

The test device 8 may include a test and control unit 26 connected to the communication interface 29. In operation, test and control unit 26 may control the test device 8 to perform one or more tests on the internal conductors 5. For example, the test and control unit 26 may perform electrical tests to detect a fault that may be present on the internal conductors 5 and/or the external conductors 3 leading to the customer premises. In some embodiments, the test and control unit 26 may be configured to perform spectral analysis of signals of different frequencies measured on the internal conductors 5. The test and control unit 26 may analyze the measured frequency spectra to identify the cause of a service problem. Any of a variety of suitable tests may be performed, examples of which are discussed herein.

In some embodiments, the test device 8 may include a user interface 28 configured to receive inputs from a user and/or to provide information to the user. For example, in some embodiments the user interface 28 may include one or more input devices to receive input from a user. Though, in some embodiments, test device 8 may not have a user interface. Rather, through communication with another device that includes a user interface, test device 8 may receive user inputs and may output information to a user.

In some embodiments in which test device 8 has a user interface, this interface may have as simple design. As an example of an input device, a button may be disposed on the test device 8, which, when pressed by the user, initiates performing a test or sequence of tests by the test and control unit 26. Any suitable input devices may be included in user interface 28, such as a button, switch, touch-screen, keyboard, etc. In some embodiments, the user interface 28 may be configured to provide information to a user in a human perceptible format, such as a visual format. For example, the user interface 28 may include a status light (e.g., an LED) to display the status of the test device 8. As another example, the user interface 28 may include a display to display a test result, such as a test result code. For example, the user interface 28 may include a seven-segment alphanumeric display (e.g., a single-character display or multiple-character display) to display a code representing a test result, in some embodiments. As yet another example, the user interface 28 may include a display screen (e.g., an LCD screen) that displays information, such as the status of the device, a test result, corrective actions to be taken, troubleshooting information, etc.

In some embodiments, when a test result code is displayed by the test device 8, the user may view the displayed code and associate the code with a corresponding condition of the conductors. For example, the customer may be provided with printed or electronic reference material, which may be software or a link to a web site where the reference material can be accessed, that allows the user to look up the code to find out additional information regarding the determined condition. For example, the customer may be provided with information to enable the customer to troubleshoot and potentially resolve a problem, as discussed further below.

In some embodiments, the communication interface 29 may enable the test device to communicate with one or more external computing devices, which may be internal to the customer's premises our outside the customer premises. Examples of such computing devices include computing device 12 or a computing device of the service provider network 6, for example. Any suitable type of communication interface 29 may be used to communicate with other devices, such a wired communication interface and/or a wireless communication interface, for example. In some embodiments, the communication interface 29 may enable the test device 8 to receive a command, such as command for initiating a particular test or a test sequence.

The communication interface 29 may enable the test device 8 to send information, such as a test result code, to another device. As discussed above, in some embodiments, a test result may be sent to the service provider network 6 to enable the service provider to receive the test result. The service provider may analyze the test result and send information to the customer, such as troubleshooting information, corrective action to be taken, etc. The service provider may store the test result in a database of test results for future analysis, in some embodiments.

If the information regarding the test result is sent to computing device 12 (either directly or via the service provider network 6), computing device 12 may display a test result, and/or may interpret the test result to provide additional information to the user, such as troubleshooting information, corrective action to be taken, etc. Moreover, by enabling communication between an external computing device and a test device that can be simply connected to internal conductors within a customer's premises, the external computing device may drive a test sequence.

The customer may participate in that test sequence in one or more ways. That participation may include connecting the test device to at one or more locations within the premises or observing conditions at the premises. The customer may input information about the observed conditions through a user interface on computing device 12 such that the customer observations may be used as part of troubleshooting. For example, the user may be asked to confirm the presence of microfilters or to indicate a state of status indicators of equipment, such as a modem.

Customer participation may alternatively or additionally include establishing conditions at the customer premises, such as taking a phone off hook or connecting the test device at a particular location. Establishing the conditions alternatively or additionally may include altering conditions at the customer premises. For example, when measurements indicate that a low frequency interference is present and a possible source of a problem reported by a customer, the customer may be guided through steps of moving electronic devices with large power supplies that could generate such interference from locations where those devices could cause noise that is a possible source of a problem experienced by a customer.

The customer also may input information that controls progression through the test sequence, For example, the user input may indicate that directed conditions have been established. In response, the computing device may request the test device to repeat the same series of measurements or to perform different tests. In some simple embodiments of test device 8, test device 8 may be configured to perform the same series of measurements and output the same types of information each time a test is requested. Though, other embodiments are possible in which a test device may accept multiple commands that initiate different types of tests or that trigger the device to output different types of data.

In some embodiments, customer input that controls progression through the test sequence may be input through a user interface of a computing device interacting with test device 8. Though, such information, and any other information, alternatively or additionally may be input through test device 8. For controlling the progression through a test sequence, for example, the customer may press a button on test device 8 that triggers device 8 to perform a test.

Figure 4A:
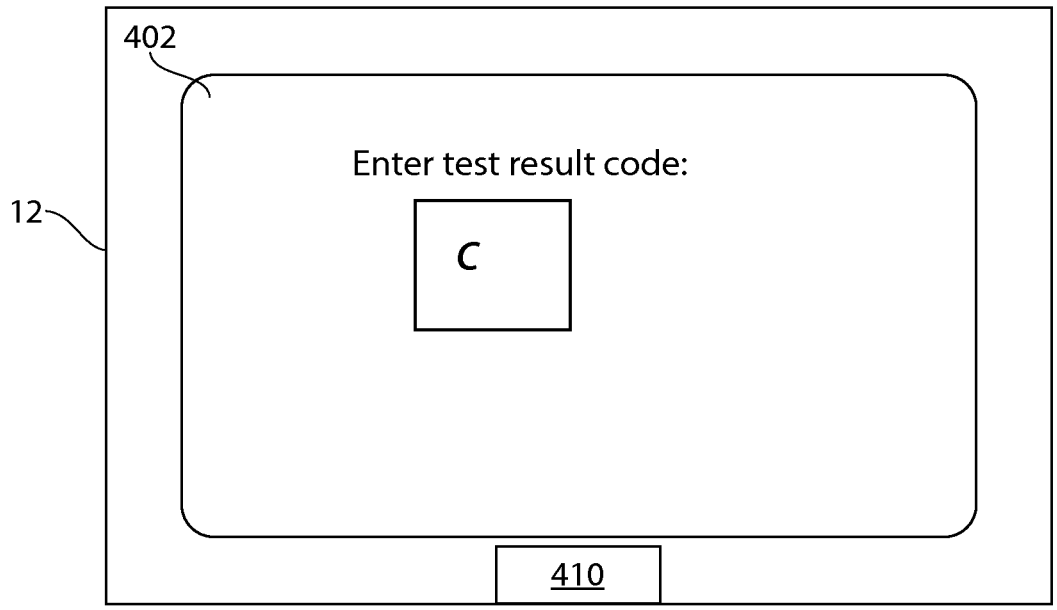
FIGS. 4a and 4b illustrate how a computing device can be used to provide information regarding a result of a test to a customer, according to some embodiments.
Figure 4B:
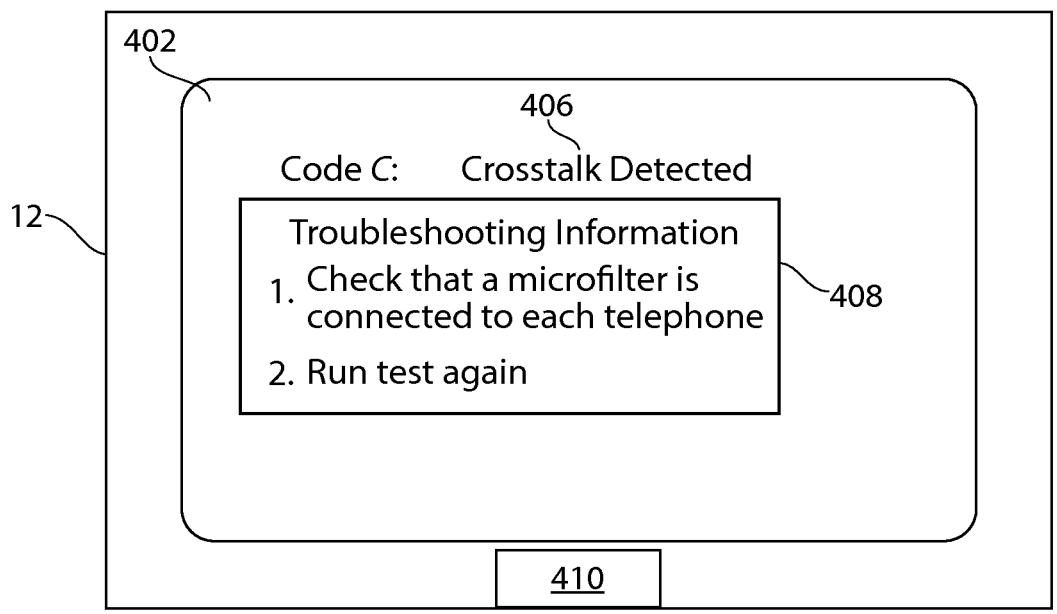

FIGS. 4a and 4b illustrate a computing device 12 being used in conjunction with the test device 8 to trouble shoot a problem. For example, a customer may use computing device 12 to obtain information for troubleshooting and/or resolving a fault condition. Use of computing device 12 may enable providing the user with guidance for resolving the problem. Since, in some embodiments, computing device 12 may include a more sophisticated user interface than that which may be included in test device 8, use of the computing device 12 may allow the presentation of more sophisticated guidance to the user, such as an interactive guide, a video, etc.

Moreover, even in the case in which computing device 12 is a smartphone or other portable electronic device, computing device 12 may have more general purpose computing power, memory and program storage than test device 8, which for economic reasons may have relatively little computing resources. Accordingly, computing device 12, in addition to providing a more sophisticated user interface, may perform conditional or state dependent computing operations. For troubleshooting, conditional and state dependent operations allow problems to be detected and/or localized by collecting information at different times or under different conditions and identifying service-affecting conditions correlated with changes or patterns in such data.

As discussed above, the test device 8 may have simple capabilities, and may generate a code as a result of testing performed on internal conductors 5. Any suitable code may be produce by the test device 8, such as an alphanumeric code. The code may correspond to an electrical condition of the conductors 5 determined by test device 8. However, since the code produced by test device 8 may not be of a type readily interpreted by a typical customer, the customer may wish to obtain more information, such as the condition represented by the code and/or troubleshooting information for fixing a wiring problem. The use of a computing device, e.g., computing device 12, can allow the customer to receive more detailed information and guidance.

As illustrated in FIG. 4a, computing device 12 may run an application program 402 that can provide more detailed information and guidance to the user. Application program 402 may be a dedicated application program or a general-purpose application program for displaying or obtaining information, such as a web browser. As illustrated in FIG. 4a, in some embodiments the user may enter the test code produced by the test device 8 using the application program 402. For example, if the test device 8 produces the test result code "C," the user may enter this information using application program 402. The application program 402 may then look up the code entered by the user and provide the user with additional information. The information may be determined by looking up the code (e.g., in a look-up table) associated with application program 402 on device 12 or by obtaining this information over a network (e.g., the Internet) from a remote server. For example, as shown in FIG. 4b, the user may be provided with information 406 indicating the condition identified by the code (e.g., noise detected).

The user may be provided with troubleshooting information 408 for resolving the problem. For example, if the test device 8 is configured to test a DSL connection, the detection of noise may be the result of a missing microfilter on one or more telephones in the customer premises. The application program 402 may request that the user check to make sure that microfilters are in place. In some embodiments, the application program 402 may interact with the user, and may request that the user confirm that microfilters are in place before moving to the next step. The user may then check for the presence of microfilters and add any microfilters that are needed. The user may be prompted to enter information indicating whether one or more microfilters were added. Once the user provides this information, the application program may move on to the next step. For example, if a microfilter was added by the user, the user may be prompted to run the test again using test device 8. Alternatively, the computing device 12a may send a command to the test device 8 to run a test automatically.

The user may then be informed as to whether the noise has been eliminated by the addition of a missing microfilter. For example, the test device may produce a result code indicating that no fault is detected. However, if the problem persists, the application program 402 may guide the user to perform other actions to identify and resolve the problem. Thus, through the use of test device 8 and a computing device 12, the user can be provided with the capability of testing conductors carrying service in the user's structure, obtaining information regarding a fault, and obtaining detailed guidance to resolve the problem.

Information may be conveyed to the user via computing device 12 in any suitable way, such as with text and/or graphics. In some embodiments, a demonstrative video and/or and audio description may be provided to the user to facilitate troubleshooting or to illustrate corrective action to be taken. The user may be instructed to take various actions such as connecting/disconnecting cables, or activating other tests, such as visiting a website to make a connection speed measurement, etc. As another example, the user may be instructed to move the test device to another location and/or connected to a different portion of wiring 5 to make another test. As another example, a particular code may identify the type and/or location of a fault, and the user may be provided with information regarding the type and/or location of the fault. Such techniques can reduce the need for a user to call a support line for assistance. However, in some circumstances, the user may be requested to call the service provider for assistance.

In some embodiments, for example, a tiered support system may be provided for resolving a service conditions noticed by a customer. A first tier of such a system may entail a test run by a test device. If the test does not directly result in a troubleshooting diagnosis, a next level of trouble shooting may entail guided trouble shooting. In the guided trouble shooting, a computing device, such as a separate computer at the customer's premises, may guide the user through one or more steps involving providing instructions to the user to establish conditions. The test device may then be controlled to make measurements under the created conditions and results, alone and in conjunction with measurements made in other conditions attempt to identify conditions indicating the presence and/or location of a service affecting condition.

If this level of testing does not resolve the customer problem, a next level may include interaction with a communications service provider. That interaction may be controlled by the customer's computing device. Though, in some embodiments, the computing device may simply instruct the user to contact the service provider or otherwise facilitate such communication.

Regardless of how initiated, that interaction, also may be tiered. It may, for example, entail initial processing by an ACD/IVR system 214 with possible escalation to a human customer service representative. These levels of troubleshooting may also entail interaction between one or more computerized devices of the communications service provider and the on-premises test device.

Regardless of the specific instructions provided to the customer, the order and timing of actions the customer is instructed to take may be determined by programming of the customer's computing device. This programming may be provided to the computing device at any suitable time. The programming, for example, may be installed in the computing device at the time of its manufacture. Alternatively, it may be copied from a disc or loaded from another source when test device 8 is installed. Alternatively or additionally, it may be downloaded over a network when used or downloaded from time to time when updated programming is available.

It should be appreciated that any suitable type of computing device 12 may be used, such as a personal computer, tablet computer, mobile telephone, etc., as the techniques described herein are not limited as to the particular type of computing device used.

In some embodiments, the computing device 12 may receive the code from test device 8, such that the user is not required to input the code to computing device 12. The computing device 12 may include hardware that acts as a communication interface 410 to enable it to communicate with other devices. Communication interface 410 may communicate with communication interface 29 of test device 8 to receive the code via a wired or wireless connection. Such communication may be triggered in any suitable way. For example, communication may take place in response to establishing a connection between the devices or in response to user input to the computing device 12 or test device 8 or may occur as part of application program 402 executing on a computing device.

In some embodiments, the test device 8 may be controlled using computing device 12. For example, application 402 may be programmed to send a command to the test device 8 to initiate a test or sequence of tests. A test or test sequence may be initiated in response to user input or automatically based on one or more criteria.

In some embodiments, control of test device 8 may support interactions with an external computerized device. In some scenarios, these interactions may entail determining whether test device 8 is connected to conductors within a premises. Alternatively or additionally, in addition to detecting the presence of test device 8, an external computerized device may detect characteristics of test device 8, which may control the nature of commands sent to or data requested from test device 8. To support determining the presence or nature of test device 8, test device 8 may have a verifiable signature to allow an external computerized device to identify the test device. The signature may reveal the type of device (e.g., configured to be a stand-alone test device, installed in a STB, installed in a modem or a modem/router or installed in a NID, as discussed further below). As another example, the signature may uniquely identify the test device.

The signature may be incorporated into test device 8 in any suitable way, and the signature may be accessed by an external computing device in any suitable way. The signature, for example, may be accessed through any port of test device 8. For example, the test device 8 may store an identifier in non-volatile memory. As another example, the test device 8 may have a set of resistors or other components configured in a particular way. When stored in this way, the signature may be accessed through a port of test device 8 connected to a telephone line. Such access may use a known technique for a line test system using any suitable type of parametric testing, such as "ringer detection," for example. By measuring a voltage/current profile on the line, the line test system can determine the nature of a termination on the line. Devices (ordinary telephone, fax, answering machine, etc.) have "signatures" that allow the line test system to determine information about the types and/or number of devices connected to the line by ringer detection. However, the techniques described herein are not limited as to a particular method for establishing a verifiable signature, as any of a variety of such techniques may be used, if desired. In some embodiments, the signature may be used by software or firmware running on test device 8 to identify the measurement capabilities of test device 8. In some embodiments, the signature of the test device 8 may be provided to a computing device (e.g., server 210) via a communication network to enable the computing device to determine the type or identity of the test device 8. In some cases, the computing device may determine a test command to send to test device 8 based on this information.

Detection of Missing Microfilters

A test device as described herein may make measurements or perform other actions that generate information revealing one or more service affecting conditions on conductors within a customer's premises. One such service affecting condition that may be detected is a missing microfilter.

As illustrated in FIG. 1, a filter 14 (e.g., a microfilter) is often placed between a device using lower frequency telephone service, such as telephone 16, and the unfiltered internal conductors 5. As is known, telephone communications are designed to take place using a frequency spectrum that is lower in frequency than that used by DSL communications. Filter 14 may be a low pass filter that allows signals of low frequency to pass through to the telephone 16, while attenuating higher frequencies (e.g., of the data band) on the filtered extension 5-2 leading to the telephone. Filters may be placed between the internal wiring 5 and devices that use the lower frequency communication band (e.g., of the voice band) for communications, such as telephones and fax machines, for example.

In some circumstances, a filter 14 may be "missing" (such as because it is non-operational or not present e.g., due to being inadvertently omitted between a device such as the telephone 16 and the internal wiring 5). If a filter 14 is missing, a degradation in DSL communication quality may occur because of the impedance or noise changes presented to the internal wiring by telephone 16 going off-hook. It would be desirable to identify when a filter is missing to identify it as the cause of actual or future degradation in DSL communication quality, and enable corrective action to be taken.

Figure 5:
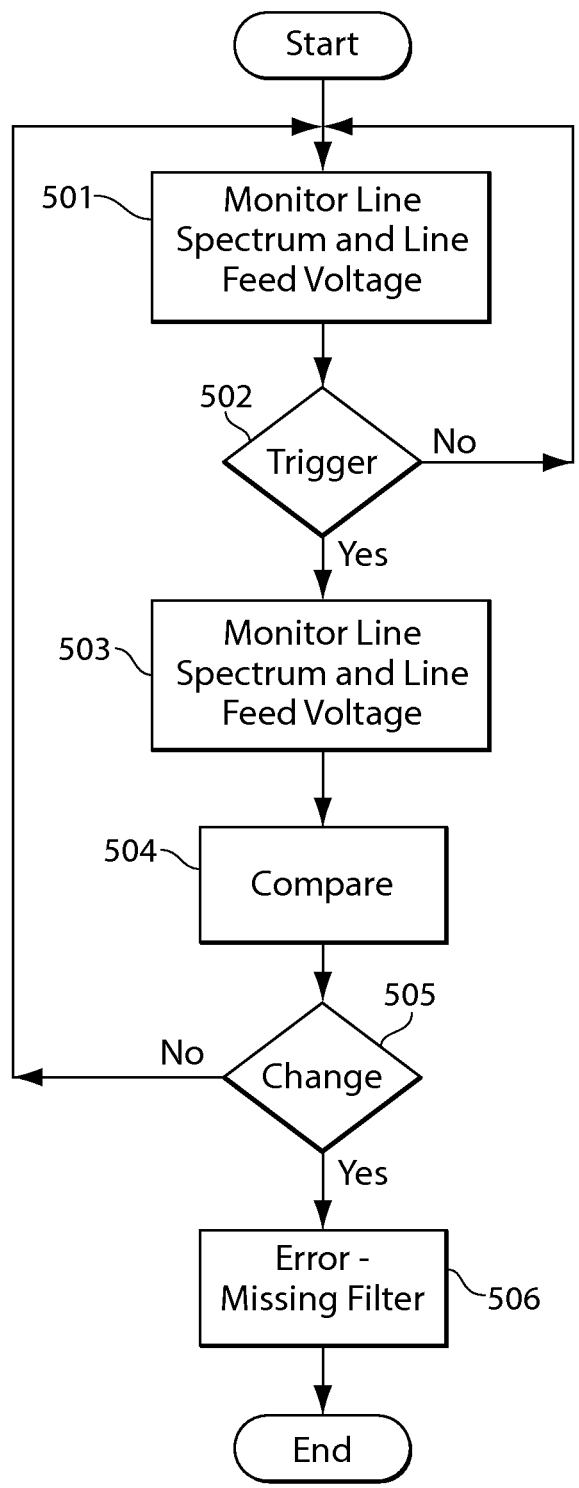
FIG. 5 shows a method of detecting a missing or non-operational microfilter, according to some embodiments.

FIG. 5 shows a method of identifying the lack of an operational microfilter between a device using low frequency telephone service and internal wiring, according to some embodiments. In step 501, the test device 8 may measure the signal spectrum present on the internal conductors 5 and/or the line feed voltage on the internal conductors 5. Step 501 may be initiated at any suitable time (e.g., in response the user initiating a test sequence or the test device 8 receiving a command to do so). In some embodiments, the low frequency portion of the spectrum used by conventional telephone voice communications may be monitored in step 501. However, the techniques described herein are not limited in this respect, as any suitable portion of the frequency spectrum may be monitored.

Monitoring at step 501 may be performed in any suitable way, such as using test hardware of a test device 8. In some embodiments, measuring the signal spectrum may entail periodically measuring energy detected at each of multiple frequencies. A running average of the energy the energy detected at each frequency may be maintained as the monitored line spectrum. Such measurements may produce spectrum information indicative of measured spectral energy. A D.C. voltage of one of the internal conductors 5 may be measured with respect to ground or the difference in D.C. voltage between a pair of internal conductors 5 may be measured to monitor the line feed voltage. The spectrum information, line feed voltage information, and/or information derived therefrom may be stored in a computer readable medium (e.g., a memory) within test device 8 or in any other suitable location. In embodiments in which a test device is coupled to an external computing device, the collected data may be stored by the external computing device. Though, the specific techniques used at step 501 are not critical to the invention.

Monitoring at step 501 may be performed at any suitable time. In some embodiments, that monitoring may be performed based on measurements taken when no telephone-like devices are detected in an off-hook condition. Such a determination may be made by test device 8 in any suitable way, including techniques as are known in the art. For example, in embodiments in which the DC voltage on a telephone line changes when a device is in the off hook condition, an off hook state may be detected by test device 8 measuring a DC voltage on the line to which it is connected.

Regardless of the conditions under which monitoring is performed at step 501, other measurements may be made when those conditions change. In step 502, the test device 8 may detect a trigger event. Examples of trigger events include detecting an indication of an in-use state of a communication device (e.g., a terminal device) connected to a communication network (e.g., which includes conductors 3, 5), such as a telephone-like device having an off-hook condition (e.g., in which a telephone is off the hook), transitioning to an off-hook condition or detecting that the telephone is ringing. Such conditions may be detected in any suitable way. For example, an off-hook condition may be determined by detecting a signaling tone in the voice band, or other suitable frequency range, such as a dial tone, DTMF (Dual Tone Multi-Frequency signaling) tone, call progress tone or ringing tone. As another example, a trigger event may occur when the test device 8 receives information (e.g., from the user or through an application facilitating troubleshooting) indicating that the telephone is in use. For example, the user may actuate a button on the test device to indicate that a telephone is in use. As another example, a trigger event may occur when a determination is made that sub-optimal DSL service is being provided. However, any suitable trigger event may be used.

When a trigger event is detected, the test device may measure the signal spectrum and line feed voltage present on the internal conductors 5 in step 503 during a time in which a telephone-like device is using the low frequency spectrum for communications (e.g., a telephone, fax machine, etc.). Such measurements may produce second spectrum information and second line feed voltage information, which may be stored, as discussed above. In some embodiments, the low frequency portion of the spectrum used by conventional telephone voice communications may be monitored. Though, measurements may be made during some predetermined period of time, such as 30 seconds, for example. Moreover, in some embodiments, a measurement may entail a repeated series of measurements such that an average value may be computed. However, the techniques described herein are not limited in this respect, as any suitable portion of the frequency spectrum may be monitored in step 503.

In step 504, the test device may compare the measurements made during step 503, in which the device using the low frequency spectrum for telephone voice communications (e.g., a telephone) is operating, and in step 503, when no device using the low frequency spectrum for voice communications is operating. If there is a difference between the two measurements that is of sufficient magnitude to be attributable to a missing filter, the test device may make the determination in step 505 that a filter is missing. The significance of the difference may be assessed in any suitable way. The significance may be assessed on a frequency by frequency basis, with a change exceeding a threshold in any frequency band indicating a significant change possibly indicating a missing microfilter. Alternatively or additionally, the significance of the change may be assessed on an aggregate of all frequency levels for which energy is measured. Moreover, the threshold to which the assessed change is compared may be a static threshold, possibly preprogrammed into test device 8. Though, in some embodiments, the threshold may be dynamically determined, such as by computing a percentage of the measured energy of the monitored spectrum determined at step 501.

Regardless of how a significant change is assessed, the comparison at step 504 may be used to derive a test result, indicating whether a missing microfilter has been detected. In step 506, the test device may produce and/or display a test result (e.g., a test result code) conditionally indicating a missing filter having been detected. As another example, the test device may transmit to an external computing device a result (e.g., a test result code) of a comparison between the first and second spectrum information. If there is not a difference between the two measurements attributable to a missing filter, the method may return to step 501.

The method of FIG. 5 may be performed in any suitable order. For example, in some embodiments, step 503 may be performed prior to performing step 501 (i.e., in the reverse order). In such a method, after step 503 is performed, step 501 may be performed after a trigger event indicating that a device which uses the low frequency spectrum for voice communications is no longer operating (e.g., when a telephone is placed back on the hook). Any other suitable technique may be used, such as a technique that enables correlating a change in the measured frequency spectrum with activation/deactivation of a device that uses the low frequency portion of the spectrum used for voice communications.

In some scenarios, a test method as illustrated in FIG. 5 may also be used to localize the missing microfilter. Such localization may be performed as part of an interactive test sequence, as described above. For example, the measured change in a line spectrum may be greatest when the off hook telephone-like device is connected to the line with the missing microfilter. Accordingly, an interactive test procedure may entail instructing a customer to place each telephone-like device within the customer's premises in an off hook condition one at a time (e.g., sequentially). As the customer provides an input indicating that each telephone-like device is off hook, a line spectrum may be measured. Accordingly, step 503, rather than measuring a single line spectrum, may entail measuring multiple line spectra each corresponding to a different telephone-like in an off hook state. In this embodiment, the comparison at step 504 may, in addition to determining whether there is a significant change in the line spectrum when any telephone-like device is off hook, may identify the specific telephone-like device giving rise to the largest change. Based on this identification, the location of a missing microfilter may be output to the customer. Specifically, in some embodiments, the customer may be directed to confirm whether a microfilter is missing on the line to which the telephone-like device generating the largest change is connected.

Logical/IP Testing of Home Network

In some embodiments, the test device 8 may be configured to test connections in a local network associated with a customer's premises (e.g., a home network). For example, the test device 8 may have a communication interface (e.g., such as an Ethernet port or wireless interface, such as a wireless interface capable of communication according to the 802.11x or Bluetooth standards, for example) that allows test device 8 to communicate with one or more computing devices 12*a*, 12*b*, 12*c*, etc. on the home network side of the modem 10, as illustrated by the dashed line in FIG. 1. For example, the test device 8 may be connected to a router 13 of the local network that in turn may be connected to the modem 10 and computing device(s) 12. Test device 8 may include software or firmware for performing any of a variety of tests in the local network, including protocol tests such as logical and/or IP tests, connectivity tests, etc. Test device 8 may test the connections between devices 12*a*, 12*b*, 12*c* of the local network. Test device 8 may perform such tests in response to manual input from a user, or in response to a command from a computing device, such as computing device in the local network or a remote server. Test device 8 may provide the results of these tests to the user and/or to a computing device.

Quiet Line Noise Measurements

In some embodiments, test device 8 may be configured to perform one or more quiet line noise (QLN) measurements. As used herein, a quiet line noise measurement is a measurement performed at a time when no signal is being transmitted on the internal conductors 5 (e.g., no transmissions are being sent or received by the service provider network 6, modem 10, telephone 16, or other device that may communicate via conductors 5). Such a condition may be detected in any suitable way, any of which may serve as a trigger for a QLN measurement or a condition used in evaluating whether a trigger exists. Such a condition, for example, may be determined from measuring spectral energy from bands associated with DSL tones. If energy in a sufficient number of these bands is above a level indicative of a signal, the line may be inferred and be in use (and therefore not "quiet") or, conversely, if the energy in a sufficient number of these bands is below a level associated with a signal, the line may be deemed "quiet." Such a determination may be made on a tone-by-tone basis or as an aggregated power level across the spectrum. In some embodiments, a QLN measurement may be a power spectral density (PSD) measurement made when no signal is present on the conductor(s) being tested, to measure a noise spectrum. The QLN measurement may result in a single value, representing an aggregate detected energy or energy detected in a specific range of frequencies. Though, in other embodiments, the QLN measurement may be energy in multiple frequency bands across a spectrum. For example, multiple such measurements may be made, with each measurement spanning a selected frequency band. In some embodiments in which DSL service is tested, each measurement may span a bandwidth of a DSL tone (e.g., 4312.5 Hz). However, it should be appreciated that the techniques described herein are not limited to the width of the frequency "bin" chosen for a particular QLN measurement. Any suitable number of bins may be used.

A QLN measurement may include measuring one or more spectral components of a signal measured on internal conductors 5. Such a measurement may be useful to detect service affecting conditions on internal conductors 5. For example, such measurements may be useful in detecting a source of interference. Analysis of a QLN measurement may reveal both the presence, and in some scenarios, the nature of the source of interference. A QLN measurement may allow determining the type of possible interference and its likely source—either within or outside of the customer premises. A source of interference may be detected based on the total energy measured on what should be a quiet line. An aggregate energy exceeding a threshold, for example, may indicate the presence of a source of interference.

In some embodiments, the pattern of energy across the measured spectrum may confirm the presence of the source of interference and/or be used to determine the nature of the source of interference. Information on the nature of the source of interference further may be used to provide output to a customer indicating an approach to remove that source of interference. The output may be provided to the customer in any suitable form, such as using any of the techniques discussed above. For example, a character (e.g., a test result code) may be presented to the customer on a display indicating a source of the interference was detected. However, the techniques described herein are not limited in this respect, as any suitable display technique or other output method may be used. In some embodiments, the output may be provided to an external computerized device, enabling the service provider and/or the customer to obtain information regarding a service affecting condition.

In some embodiments, analysis of a QLN measurement may check for noise that appears at particular frequencies, which may confirm that the measured energy is likely associated with a source of interference and/or identify the likely source of the noise. For example, if noise appears at a frequency of 60 Hz, and/or harmonics of 60 Hz, it may be determined that the noise is caused by internal conductors 5 being positioned too close to a power line conductor or electronic device with a large power supply.

Alternatively or additionally, analysis of a QLN measurement may check for a pattern of energies across a spectrum. As another example, a QLN measurement may detect an interference characteristic of operation of a particular device, such as a microwave oven, for example. Patterns for multiple types of noise sources may be stored, for example, in a memory of the test device. A measured QLN spectrum may be compared to such patterns. In such cases, a test result may be produced that is indicative of these conditions, and the user may be provided with guidance, such as to move the modem 10 to a different outlet, for example. Such guidance may be provided to the user in any suitable manner, such as using an external computerized device, as discussed above. Alternatively or additionally, that guidance may entail instructions for how to identify and move an electronic device or wire in an improper position or otherwise identify and address a service-affecting condition. For example, the user may be presented with an instruction to remove electronic equipment from the proximity of the modem 10 by moving the electronic equipment and/or the modem 10. In some embodiments, the user may be guided through a presentation of interactive instructions to perform a sequence of actions. For example, the interactive instructions may instruct the user to adjust electronic equipment in the proximity of the communications network, and provide an input indicating that the electronic equipment was turned off. The user may be instructed to move any suitable type of electronic equipment from the proximity, such as consumer electronic equipment or electrical appliances. The interactive instructions provided to the user can be tailored to resolution of a detected service affecting condition or set of possible service affecting conditions. Examples of QLN measurements will be discussed below.

Frequency Domain Measurements

In some embodiments, a frequency domain measurement, such as a frequency domain reflectometry (FDR) measurement may be performed on a conductor connected to the premises wiring. FDR measurements may include generating a stimulus signal on the conductor at a plurality of different frequencies and measuring reflections at corresponding frequencies.

In some embodiments, an FDR technique may be based on generating a spread frequency spectrum and applying it to a transmission medium to be tested. If there are elements in the transmission path that cause reflections, then these may be observed as a periodic variation in the superposed applied signal+reflection. A difference in frequency between maxima and minima is inversely proportional to the reflection length (distance to a fault or other condition causing the reflection) and the magnitude of the peak-to-peak points is proportional to the severity of the reflection, which may be used as an indication of a likelihood that the condition is service affecting.

The frequency content of the measured reflections may be analyzed to determine a service-affecting condition. For example, analyzing the measured reflections may include comparing the measured frequency content (e.g., spectral energy) of the measured reflections to a predetermined "footprint" characteristic of a fault. The "footprint" may include values of spectral energies at a plurality of frequencies determined in advance to be characteristic of the fault (e.g., based on earlier FDR measurements of a known fault or taken at a time when the wiring has been determined to be or is indicated to be functioning properly).

Such a footprint may be stored in test device 8 (e.g., in a computer readable medium) or in any other suitable location, such as in a service provider network. In some embodiments, the measured reflections may be compared with the footprint by determining a difference therebetween. Such a difference may be determined on a frequency-by-frequency basis and/or based on aggregated values. Any suitable device may be used in analyzing the reflections, such as a DSP, for example. In some embodiments, a fault may be indicated when the difference between the measured reflections and the footprint is below a threshold. The nature and/or the location of the fault may be detected based on comparison of the reflected values with a footprint. For example, a metallic fault, such as an open or short on the internal conductor, may be detected. In some embodiments, the location of a fault may be determined by analyzing the reflection signal.

In some FDR techniques, the generating and measurement device may be co-located. The stimulus signal may be generated by any suitable device, such as test device 8, for example. In other embodiments, the spread frequency spectrum signal used for FDR may be generated by a device otherwise in the network. For example, the ATU-C may be used to provide the source of the stimulus signal and may only measure the superposition. In some embodiments, the ATU-C modem may be used without modification. In such a scenario, testing is limited in frequency to only those frequencies sent by the ATU-C. However, such testing may provide an advantage of being compliant to network standards, and may therefore generate less noise or otherwise disrupt service less than a separate device used to actively inject a spread spectrum signal for FDR measurements.

As a specific example, the stimulus signal may be generated by a device in the service provider network outside of the customer premises, such as a modem, for example. The frequency content of the transmission signal measured at the customer premises (e.g., by test device 8) to determine a service affecting condition. For example, the ATU-C modem may be controlled to generate tones. This control may be based on an L0 startup figure, obtained as is known in the art, for the modem to generate tones for an FDR test. Those tones may be analyzed. For example, tones between 127 kHz and 2.2 MHz may be generated for an ADSL2+. Those tones may then be analyzed to detect faults appearing as impedance mismatch and/or distance to the fault.

More specifically, the frequency spectrum may be regarded as a superposition of QLN, L0 and reflected energy from impedance mismatching. Analyzing that superposed spectrum for periodicity may reveal reflection lengths and faults if the magnitude of the periodic variations is large. Minimum distance detectable using this technique may be based on the highest frequency, such that distance resolutions on the order of 25 m may be achieved using conventional modems. Though higher resolution may be achieved using other techniques, such a technique may be efficient. Moreover, using the ATU-C to generate a high power full spectrum stimulus signal is naturally non-invasive to the network, and may be desirable in some scenarios.

Regardless of how the stimulus signal is generated, a service affecting condition, such as a fault, may be determined by comparing measured values with a "footprint" of a fault, as discussed above. Such a technique may enable detecting and/or localizing a fault.

In some embodiments, a fault may be detected based on both QLN measurements and FDR measurements. For example, QLN measurements may be used to establish a background noise level for FDR measurements. Different test result codes may be produced when a source of interference is detected with a QLN measurement than when a fault is detected using an FDR measurement. For example, a first character may be displayed indicative of interference (e.g., a particular type of interference) and a second character may be displayed that is indicative of a fault (e.g., a particular type of fault). However, the techniques described herein are not limited in this respect, as any suitable test or combination of tests may be performed, and the result may be analyzed and conveyed in any suitable manner.

Checking if Customer's Installation Will Support an Upgrade

The service-affecting conditions detected by a system as described herein may relate to a current service. Though, in some embodiments, conditions may relate to a desired or future service to be delivered over conductors 5 within a premises. In some embodiments, test device 8 may perform a test to determine whether the customer's wiring environment will support an upgrade, such as an upgrade to faster Internet service. Such a test may be requested either by the customer or a service provider. To make this determination, spectral measurements may be made at a higher frequency than would have been necessary for a slower-speed service. For example, spectral measurements may be made up to a frequency of 30 MHz to determine spectral characteristics of the wiring environment at such frequencies, whereas tests at up to 2 MHz may be sufficient to troubleshoot the user's current installation. Accordingly, test device 8 may be configured to perform such spectral measurements. For example, the test device 8 may be configured to perform spectral measurements, such as one or more QLN measurements, in a frequency range spanning from 0 to 30 MHz. However, it should be appreciated that tests performed in any suitable frequency range may be performed. For example, to test the viability of future high-speed upgrades, tests may be performed in a range extending up to 50 MHz, 100 MHz, or higher. The range may begin at any suitable frequency, such as 0 Hz, 10 kHz, or 1 MHz, by way of example.

Embodiments of a Test Device that May be Installed in Another Device

In some embodiments, a test device, such as test device 8, may be configured to be installed in another device such as an interface device (e.g., a network interface device (NID) or other network termination point) residential gateway, set-top box (STB), modem, or other device. In some embodiments, a test device may be configured to be installed in any suitable customer premises equipment.

Figure 6A:
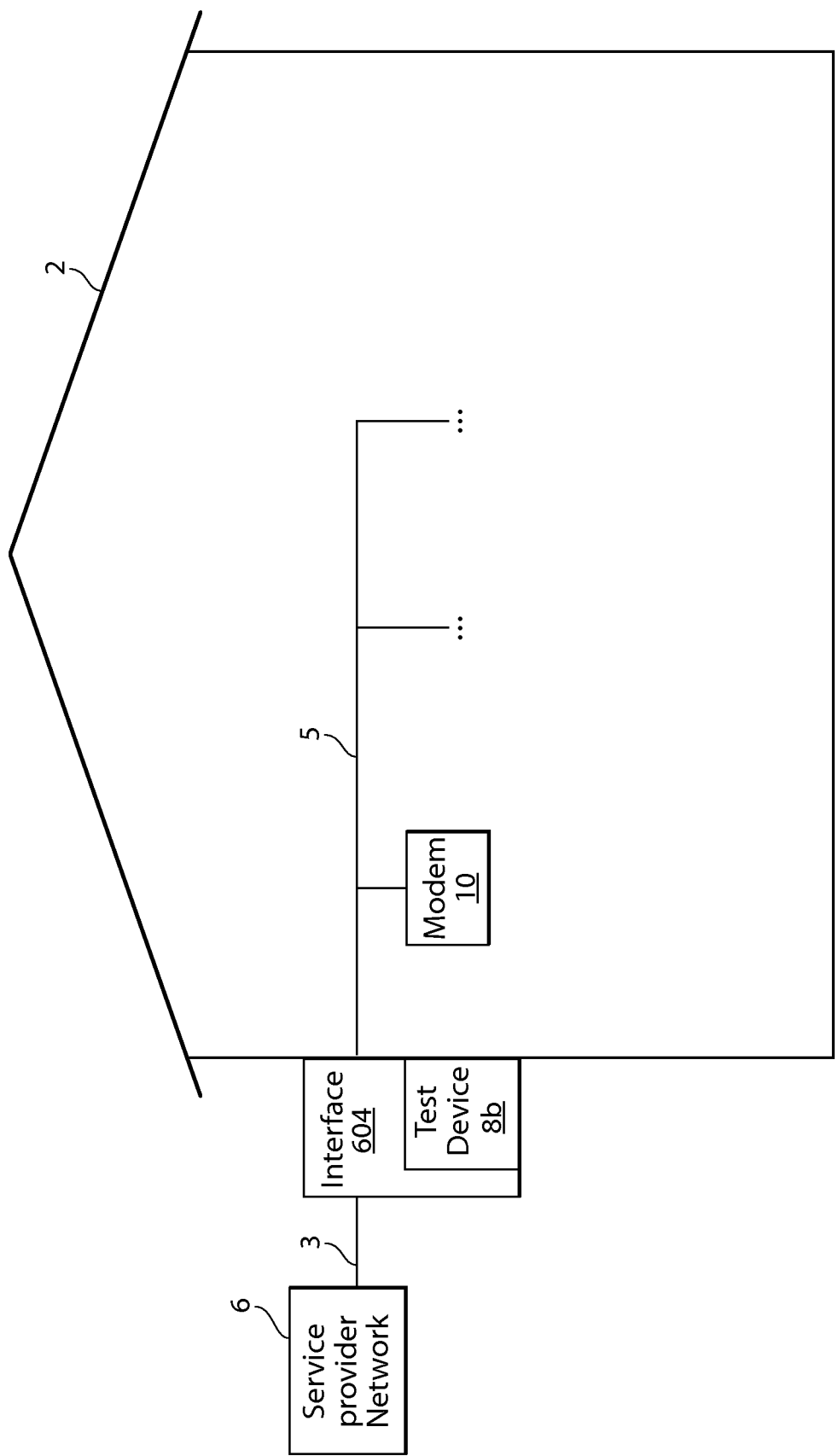
FIG. 6a shows an embodiment in which a test device may be installed in an interface between internal and external wiring.
Figure 6B:
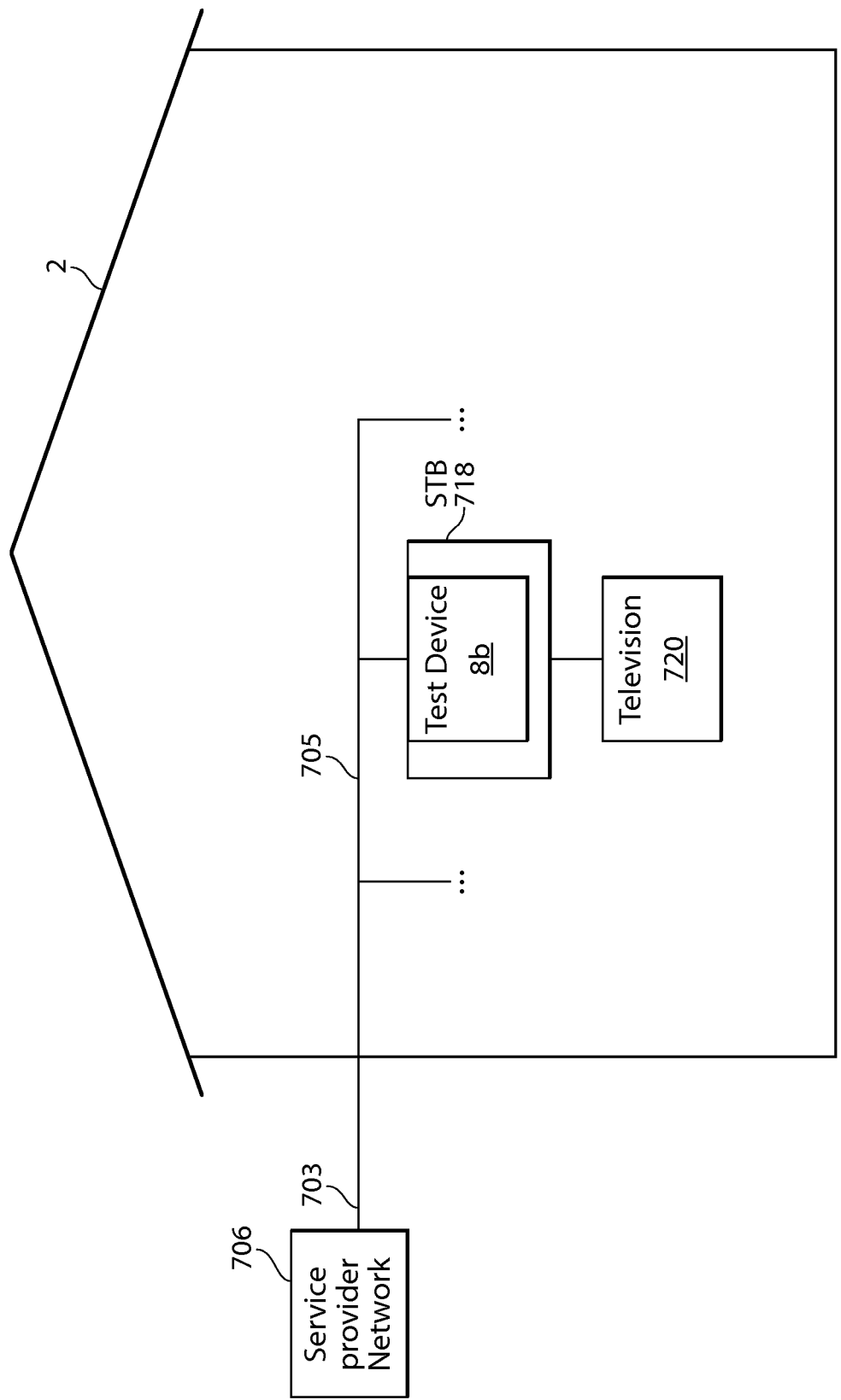
FIG. 6b shows an embodiment in which a test device may be included in a set-top box.

For example, as shown in FIG. 6a, a test device 8b may be positioned in an interface device 604. In embodiments configured for testing telephone wiring, interface device 604 may be a NID that is positioned on the exterior of a structure, and which separates external conductors 3 from the internal conductors 5. In some embodiments, a test device 8b to be installed in interface device 604 may include a housing suitable for installation in interface device 604. In such embodiments, installation of a test device 8b in interface device 604 may be performed by a technician. However, the installation of test device 8b may be performed in any suitable way FIG. 6b shows an embodiment in which a test device 8c may be included in a set top box 718. As shown in FIG. 6b, a service provider may provide service, such as a cable television service, to the customer premises. A service provider network 706 may include a cable head end (not shown) that sends cable television signals to the customer premises via external wiring 703, as known in the art. The external wiring 703 may be directly connected to the internal wiring 705 of the customer premises or connected thereto via an interface (not shown). Internal wiring 705 may be formed of a coaxial cable or any other suitable type of wiring. An extension of internal wiring 705 is connected to a set top box 718. As known in the art, a set top box is a device that may receive and decode television signals. It should be appreciated that a set top box need not be positioned on top of a television, as such a device may be positioned in another location.

In this example, the set top box 718 is connected to a television 720 and is configured to enable a viewer to view cable television programs. In this embodiment, set top box 718 includes a test device 8c to enable testing the conductors 705 connected to set top box 718. For example, test device 8c may perform tests on conductors 705 to resolve a problem with cable television service or cable Internet service, in some embodiments. Test device 8 may include any of the elements discussed above with respect to test device 8 illustrated in FIG. 3. In this example, ports 22 and/or line 24 may be configured to connect to wiring 705 (e.g., a coaxial cable). Since a test device 8c may be disposed within the housing of set top box 718, in such embodiments the test device 8c need not necessarily have its own housing or a user interface. In some embodiments, the user interface of the set top box 718 may be configured to act as a user interface for test device 8c.

Including a test device 8c in a set top box 718 may facilitate installation of test device 8c in the customer's home, as the customer need not install a test device separate from set top box 718. In some embodiments, the set top box 718 may include one or more switches that enables switching the test device 8c into or out of the signal path. For example, the set top box 718 may switch the test device 8c into the signal path when a test is to be performed, and switch the test device 8c out of the signal path when the test is completed.

Figure 6C:
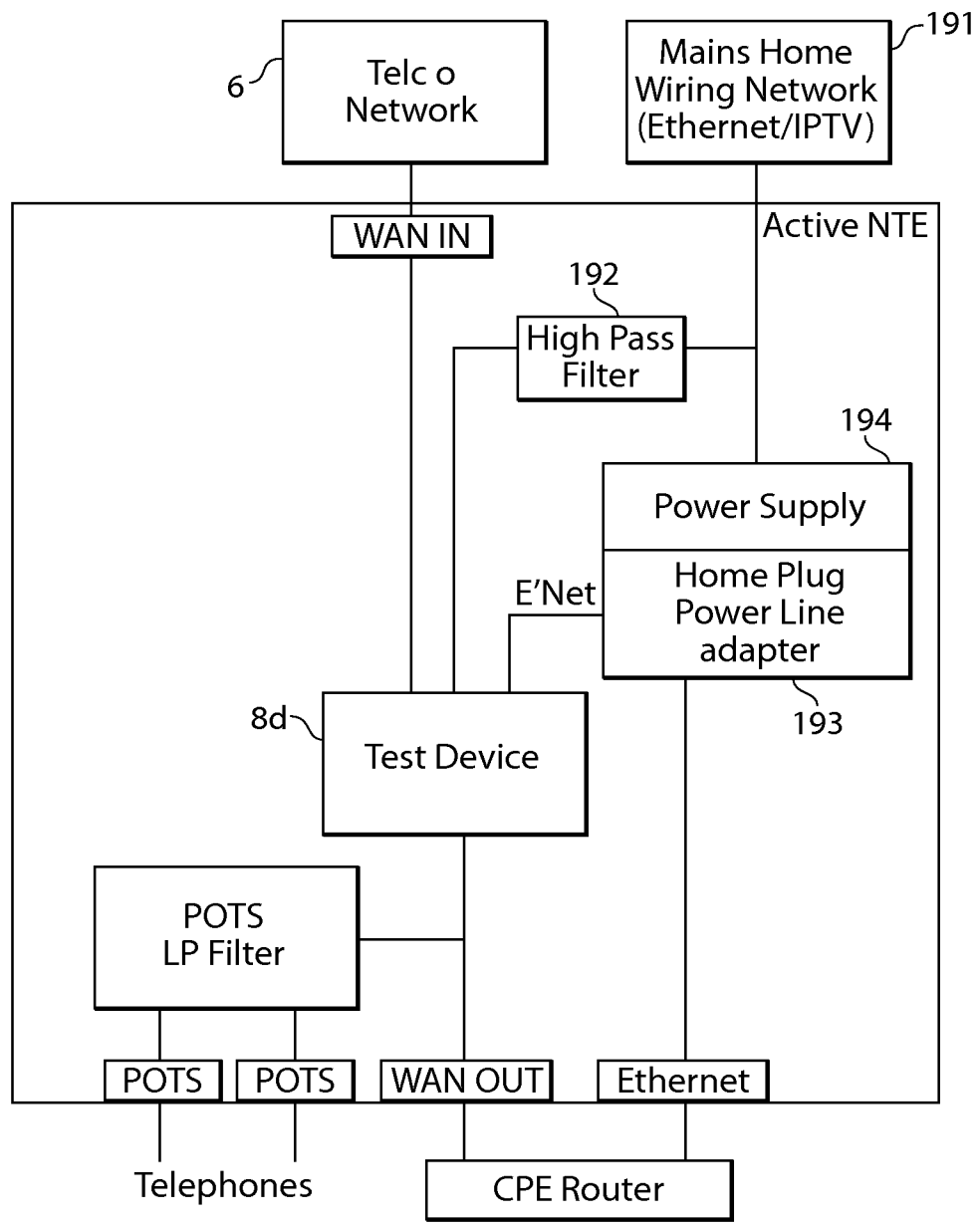
FIG. 6c shows an embodiment in which a test device may be used to test power conductors.
Figure 6D:
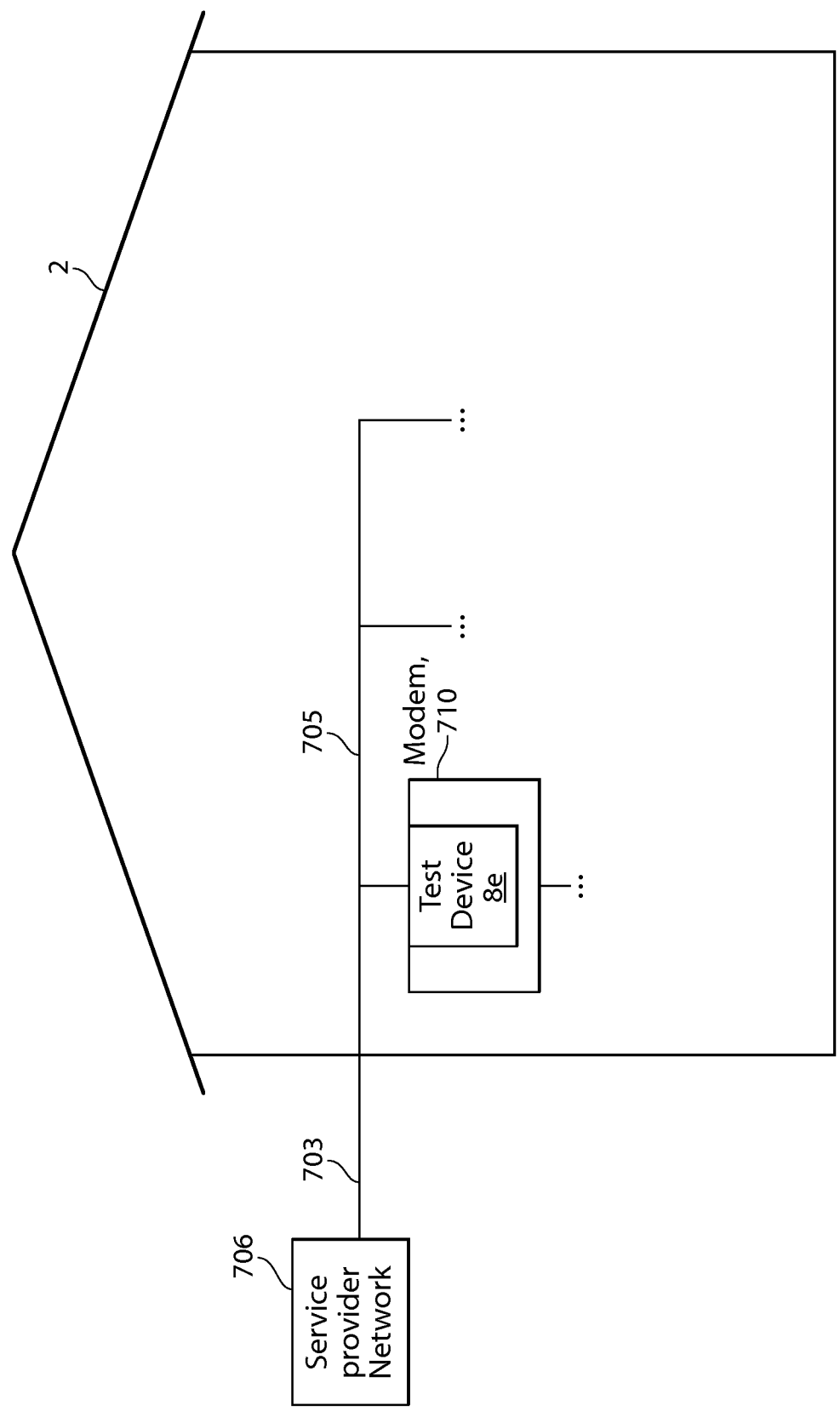
FIG. 6d shows an embodiment in which a test device may be included in a modem.

Embodiments have been described in which a test device may be installed in an interface between internal and external conductors or in a set top box. However, a test device may be installed in any suitable device, such as a device configured to connect to internal conductors of a structure. For example, in some embodiments a test device may be installed in a modem (e.g., a DSL or cable modem), a router, a television, or another customer premises equipment. As an example, FIG. 6d shows an embodiment in which a test device 8e may be installed within a modem 710. Modem 710 may be any suitable type of modem, such as DSL or cable modem, for example, and may be configured to be connected to internal conductors 3 within the customer premises.

In some embodiments, a test device installed within another device may have capabilities and perform functions as described herein. In some embodiments, the functions performed by the test device may be different based on the location at which it is connected to conductors 5. In some embodiments, a test device may generate a different signature, depending on its configuration as a way to indicate the manner in which the device is connected to the conductors 5 within a customer's premises. By providing a different signature, an external computerized device may execute a different program based to provide different commands, based on the capabilities of the device, or process measurements differently, reflecting the different location of the test device.

Embodiment Capable of Testing Power Line Wiring

In some embodiments, a test device 8d may be configured to perform tests on the conductors used to provide power to devices in a home (e.g., such as the mains wiring carrying 60 Hz, 120 V AC power in the U.S.), referred to hereafter as power conductors. Any suitable tests, such as those discussed above, may be performed on the power conductors of a structure. Such tests may be useful particularly in a case where the power conductors are used to transmit data (e.g., to provide network access), such as Ethernet over Power Line FIG. 6c shows an embodiment in which test device 8d is configured to perform testing on the power conductors 191 of a structure. As shown in FIG. 6c, the test device 8d may be connected to the power conductors via a high pass filter 192. Network communications over the power conductors 191 may be provided using a power conductor data interface 193 (such as a HomePlug Power Line Adapter) and power supply 194. The power conductor data interface 193 can be connected to a router of the local network to enable devices connected to the local network to communicate over the power conductors 191.

FIG. 6c also illustrates that the test device 8d may be configured to test more than one type of wiring. In the example illustrated in FIG. 6c, the test device 8d may be connected and configured to test both telephone wiring and power conductors. A test device 8d may be configured to measure any suitable number of different wiring connections or types of wiring, including telephone wiring, cable wiring, power line wiring and/or other wiring.

Particular Examples of Test Device Circuitry and Test Methods

Example 1

Figure 7A:
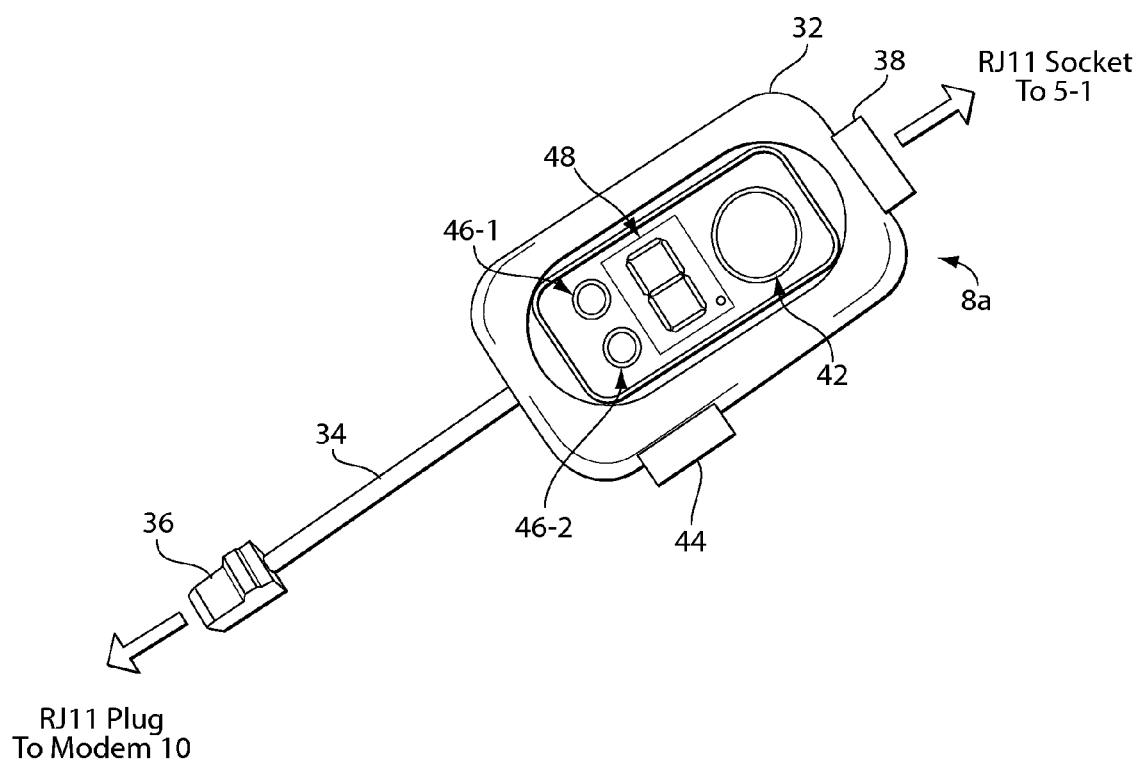
FIG. 7a shows an example of a test device that may be used to test DSL service, according to some embodiments.

FIG. 7a shows the structure of a test device 8a, which is an example of test device 8 that may be used in some embodiments, such as the embodiment shown in FIG. 1. As illustrated in FIG. 7a, test device 8a may include a housing 32, which may be an RF shielded housing. A cable 34 including an RJ 11 plug 36 may be used for connecting port 22 of test device 8 to an RJ11 socket or DSL port of modem 10. Test device 8a may include an RJ 11 socket 38 for connection of port 24 to an RJ 11 plug of unfiltered extension 5-1. The communication interface 29 of test device 8a may also include a port 44 for connecting the test device 8a to a computing device 12. In some embodiments, port 44 may be a USB port (e.g., a mini USB-B port). The user interface 28 of test device 4a may include a button 42 for activation by a user, one or more status LEDs 46 (such as a red LED 46-1 and green LED 46-2), and a display 48, such as, without limitation, a 7-segment LED display.

Figure 7B:
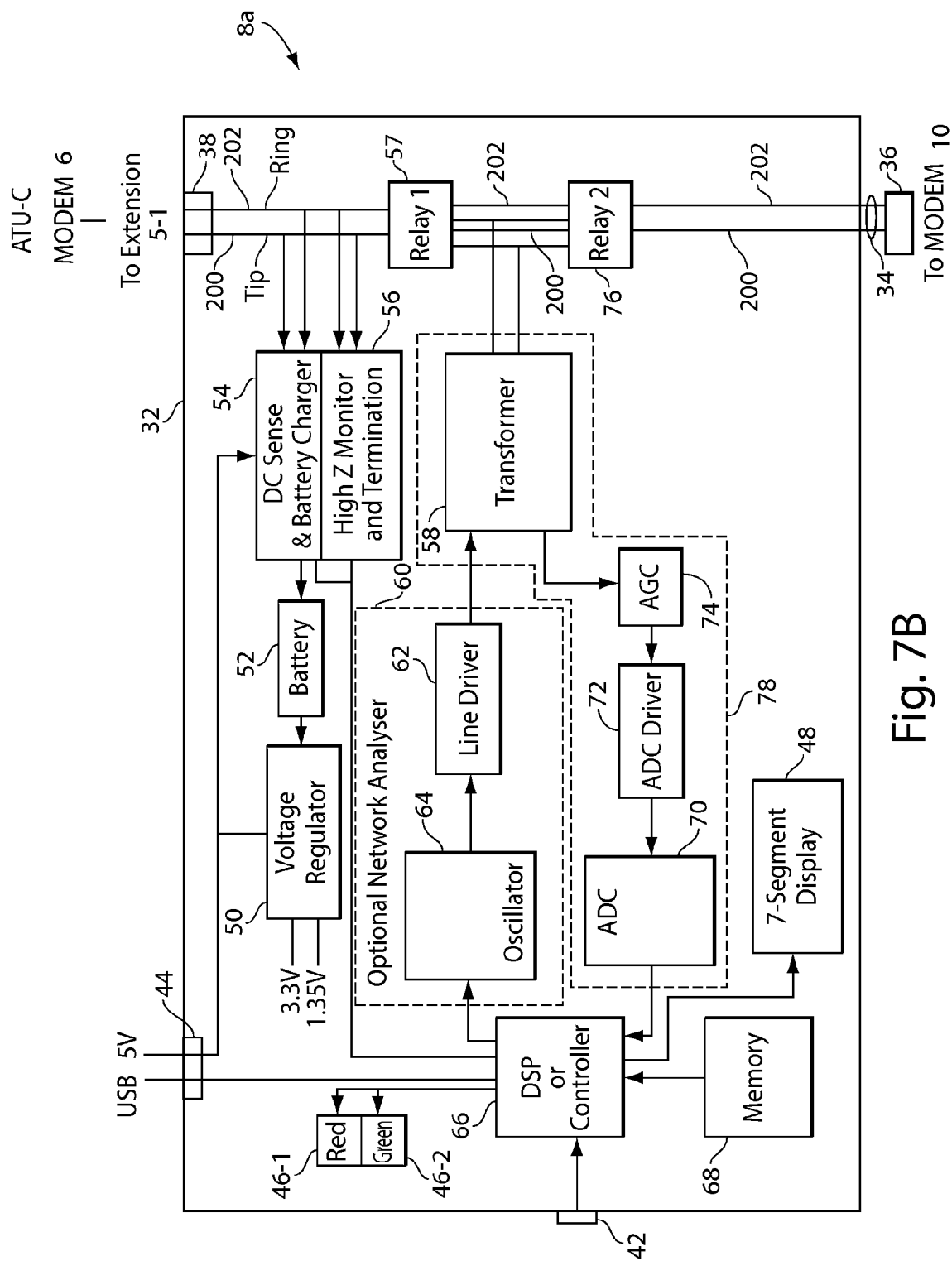
FIG. 7b shows components of the test device of FIG. 7a, according to some embodiments.

As shown in FIG. 7b, housing 32 of test device 8a may house electronic testing circuitry components. Specifically, the interior of housing 32 houses the components of the test and control unit 26 of device 8a, which may include: a voltage regulator circuit 50, a rechargeable battery circuit 52, a DC sense and battery charger circuit 54, a high Z monitor and termination circuit 56, a first relay circuit 57, an impedance matching/isolation transformer circuit 58, an optional network analyzer 60 including a line driver circuit 62 and an oscillator 64, a digital signal processor (DSP) (e.g., a DSP chip) and/or controller 66 (hereafter referred to as DSP 66), a memory 68 operative for storing non-transitory computer program code that controls operation of DSP 66, an analog-to-digital converter (ADC) 70, an ADC driver circuit 72, an automatic gain control circuit (AGC) 74, and a second relay circuit 76.

In the example shown in FIG. 5, status LEDs 46 include a red LED 46-1 and a green LED 46-2 which may be operative under the control of DSP 66. Display 48, for example, a 7-segment display, is also operative under the control of DSP 66. First relay block 57 and second relay block 76 are operative under the control of DSP 66. In one state, first relay circuit 57 and second relay circuitry connect plug 36 and socket 38 in a "through" connection whereupon socket 38 and plug 36 are directly connected via first relay circuit 57, second relay circuit 76, and a pair of internal conductors (e.g., a Tip-Ring pair) 200 and 202 of device 8a that run between socket 38 and plug 36 via first and second relay circuits 57 and 76.

Under the control of DSP 66, first and second relay circuits 57 and 76 can be independently controlled to selectively connect transformer 58 to socket 38 or plug 36 while electrically isolating plug 36 and socket 38, respectively, from transformer 58. Under the control of DSP 66, first and second relay circuits 57 and 76 can be controlled to connect transformer 58 to socket 38 and plug 36 via relay circuits 57 and 76.

USB port 44 may enable DSP 66 to communicate with an external computing device. By way of USB port 44, DSP 66 can send any data accumulated by DSP 66 and/or any calculation made of data processed by DSP 66 to an external computing device. DSP 66 may receive data from an AC sampling circuit comprised of transformer 58, AGC 74, ADC driver 72 and ADC 70, process the data, and forward the received and/or processed data to any suitable external computing device via USB port 44. The external computing device can be programmed to further analyze any such data and/or to act as a repository for data received and processed by DSP 66 at different times. The test device 8a may be powered through the communication interface 29. For example, the test device 81 may be powered by way of a 5-volt power line that is part of a conventional USB connection. Voltage regulator block 50 may supply power to one or more components of device 8a. For example, the voltage regulator block may provide power to the battery charger portion of circuit 54 for charging a rechargeable battery 52 which may be included in test device 8a.

In operation, device 8a may provide one or more of the following functionality:

A1) Locally activated and diagnostic sequence;
A2) Locally activated monitor for interactive test;
A3) Locally activated demand test and full results retrieval; and
A4) Remotely activated demand test and results retrieval.

Once active, device 8a may detect and/or measure one or more of the following:

B1) One or both wires of cable 5 disconnected (detects DC line feed on one or both wires of extension 5-1);
B2) Background noise levels per tone (breaks synchronization to measure quiet line noise (QLN));
B3) ATU-R powered and active (detects certain predetermined DSL tones, on handshake);
B4) ATU-C powered and active (detects handshake response to ATU-R pilot tones);
B5) Signal+noise prior to channel analysis;
B6) Level measurements, including peak and mean;
B7) Rapid changes in measured levels across the broadband spectrum over time (A "level" may be expressed in dBm/tone, for example. A "rapid" change in a level may be any change that occurs in less than a predetermined time period, such as one second, by way of illustration); and
B8) Changes in DC line feed voltage.

One or more of the following can be calculated by device 8a:

C1) Insertion loss from QLN (uses level and profile to estimate loss, where insertion loss may be calculated as the difference between a known transmit level per tone (e.g., dBm/tone) and the measured received level of the same tone (e.g., a subtraction between the two parameters. The result can be used as a value of insertion loss at a particular frequency);
C2) Signal level per DSL tone (signal+noise measured in B5 above–noise measured in B2 above);
C3) Insertion loss (assuming maximum send level of receive level at ATU-R);
C4) Signal-to-Noise Ratio per DSL tone (SNR per DSL tone using signal level from C2 above and QLN from B2 above per DSL tone);
C5) Bit loading (based on an SNR margin (SNRM) of 6 dB);
C6) Maximum attainable bit-rate (based on 12a0×total bit-loading from C5); and
C7) Crest factors for signal and noise values. Crest factor may be calculated as the Peak to Average Power Ratio, sometimes referred to as PAPR. For each tone described above the peak value of dBm/tone by the mean dBm/tone to give a dimensionless numerical value, which is the crest factor.

Device 8a can analyze the above (B1-B8 and C1-C7) to determine the following:

D1) One or both wires disconnected (lack of DC line feed);
D2) ATU-R missing or non-functional (e.g., a predetermined DSL tone is below an acceptable threshold T1);
D3) ATU-C missing or non-functional (ATU-C pilot tones missing or below a threshold T2);
D4) Signal level poor (more than XdB attenuation at a given frequency (e.g., 300 kHz) or an equivalent threshold T3);
D5) Noise level too high (more than Y % of spectrum above worst case noise for equivalent ultra-short line, threshold T4);
D6) Noise/Signal classifiers (Crest factor analysis, D1 cross-talk, D2 signal, D3 impulse, D4 natural); and
D7) Line quality assessment (A "Tested OK" indication or potential fault or noise indication).

An exemplary, non-limiting test sequence for testing lines carrying DSL service will now be discussed with respect to the flowchart of FIG. 7c. In connection with the discussion of this method, it will be assumed that plug 36 is operatively coupled to modem 16 and that socket 38 is operatively coupled to extension 5-1. A user may be instructed (e.g., using device 12a) to ensure that the test device 8a is connected in this manner before proceeding.

Initially, the method commences by advancing from start step 68 to step 70 in response to user activation of activation button 42. In step 70, device 8a determines if a DC line feed is present. For this test, DSP 66 determines via the DC sense part of circuit 54 if a suitable DC line feed voltage is present on the pair of conductors 200 and 202 (e.g., the Tip-Ring pair) of device 8a that connect to the Tip-Ring conductors of extension 8-1 and the Tip-Ring conductors of cable 34. To this end, the DC sense portion of circuit 54 may be a volt meter that is configured and connected to detect DC line feed and changes in DC line feed appearing on conductors 200 and 202.

If DSP 66 via the DC sense part of block 54 determines that DC line feed is not present, the method advances to steps 72 where DSP 66 causes red LED 46-1 to illuminate and causes display 48 to output a test result (e.g., a test result code) indicative of the determination that a DC line feed is not present.

However, if, in step 70, however, DSP 66 determines that DC line feed is present, the method advances to step 74 wherein DSP 66 determines if a measured quiet line noise (QLN) is greater than a predetermined threshold T1 stored in memory 68. For the test of step 74, DSP 66 controls first and second relays 57 and 76 couple transformer 58 to extension 5-1 but isolate from transformer 58 from the modem 10. After waiting a sufficient time for an ATU-C modem of the service provider to stop transmission after breaking the connection with ATU-R modem 10, DSP 66, via the AC sampling circuit 78 (comprised of transformer 58, AGC 74, ADC driver 72, and ADC 70) performs a noise level measurement on the conductive connections that run between transformer 58 and the service provider network 6.

If, via the measurement of step 74, DSP 66 determines that the measured QLN is greater than threshold T1, the method advances to step 76 wherein DSP 66 causes red LED 46-1 to illuminate and causes display 48 to display an indication that excess QLN noise is present.

However, if the measured QLN is less than or equal to threshold T1, the method advances to step 78 wherein DSP 66 determines if the modem 10 is present. To perform this test, DSP 66 sets first and second relays 57 and 76 so that ATU-C modem of the service provider is isolated from transformer 58 and modem 10 is electrically connected in communication with transformer 58 via, among other things, second relay 76, cable 34, and plug 36. Thereafter, via the AC sampling circuit 78, DSP 66 determines if modem 10 is present by detecting the presence of one or more DSL tones used by modem 10 to communicate with ATU-C modem of the service provider. More specifically, DSP 66 determines if measured values of each of one or more DSL tones is greater than one or more predetermined thresholds T2. Each DSL tone can be compared to a single predetermined threshold. Also or alternatively, each DSL tone can be compared to a unique threshold for said DSL tone or a plurality of thresholds can be provided for comparison to one or a number of DSL tones. If so, the method advances to step 82.

However, if DSP 66 does not detect any DSL tones or detects that one or more DSL tones have a measured value (e.g., RMS value) that is less than or equal to a desired threshold, DSP 66 interprets this condition as modem 10 either being powered off, not connected, or not functioning properly, or that a problem exists in the wiring between device 8*a* and modem 10. In this case, the method advances from step 78 to step 80 where DSP may cause red LED 46-1 to illuminate and display 48 to indicate that modem 10 is not detected to be present.

Assuming that the method has advanced to step 82 from step 78 where the proper operation of modem 10 was confirmed, DSP 66 in step 82 determines if the ATU-C modem of the service provider is present. To perform this test, DSP 66 sets first and second relays 57 and 76 so that the connection between ATU-C modem of the service provider and modem 10 is restored and transformer 58 is coupled to conductors 200 and 202 that connect the ATU-C modem and modem 10. In response to restoring this connection, the two modems commence handshaking utilizing DSL tones, for which techniques are known in the art. Via AC sampling circuit 78, DSP 66 determines if these handshaking DSL tones are present and if each handshaking DSL tone has an amplitude greater than a predetermined threshold T3, that is either unique to said DSL tone or common to one or more DSL tones. If so, the method advances to step 86. If not, however, the method advances to step 84 wherein DSP 66 causes red LED 46-1 to illuminate and causes display 48 to display an indication that the ACU-C modem cannot be detected.

In step 86, DSP 66 causes AC sampling circuit 78 to continue measuring signal levels in the xDSL frequency range while the ATU-C modem of the service provider and modem 10 are connected. DSP 66 compares the measured signal levels to quiet line noise (QLN) levels to determine if the signal levels are of sufficient strength for DSL communications.

If DSP 66 determines that the measured signal level(s) for DSL frequencies is less than a predetermined threshold T4 common to a number of DSL frequencies, the method advances to step 88 where DSP 66 causes red LED 46-1 to illuminate and causes display 48 to display a visual pattern indicative of the measured signal level(s) for DSL frequencies being too low. On the other hand, if DSP 66 determines that the measured signal level(s) for DSL frequencies is not less than a predetermined threshold T4, the method advances from step 86 to step 90.

For each of steps 74, 78, 82, and 86, DSP 66 compares a measured value (e.g., amplitude) of at least one DSL tone (frequency) to a threshold T. However, it is envisioned for each of steps 74, 78, 82, and 86 that the values of two or more DSL tones (frequencies) can be compared to a single threshold for each step or multiple thresholds. For example, in step 86, a measured value of a first DSL frequency can be compared to a first threshold T4-1, a value of a second measured DSL frequency can be compared to a second threshold T4-2, and so forth.

In step 74, DSP 66 performed a quiet line noise (QLN) measurement with modem 10 isolated from the ATU-C modem. Noise detected by this measurement may be a mixture of natural noise, crosstalk noise from adjacent pairs of wires, induced impulse noise from external sources, and radio noise, e.g., from AM radio stations. Measurements from step 74 can include peak, mean and phrase values for each DSL tone in the DSL frequency range. In step 90, a further parameter—crest factor—is calculated as the peak to-average power ratio for each DSL tone.

The method then advances from step 90 to step 92 wherein the crest factor for each DSL tone is compared to a threshold for said DSL tone or to a threshold common to a number of DSL tones, including all of the DSL tones. If the crest factor for any one DSL tone is above this threshold, this DSL tone is deemed to have excessive noise. In one non-limiting embodiment, for each DSL tone, DSP 66 compares the measured QLN determined in step 74 for said tone to the crest factor determined for said DSL tone in step 90. If DSP 66 determines that the measured QLN for said DSL tone determined in step 74 and the crest factor for said DSL tone determined in step 90 differ by more than some amount, such as 10 dB, for example, then, in step 92 a fault is declared for the DSL tone whereupon the tone is deemed unusable. Step 92 determines whether each DSL tone is usable or unusable. If some predetermined number of DSL tones or some predetermined percentage of the total number of DSL tones is deemed unusable, the method advances to step 94 indicative of excess noise whereupon DSP 66 causes output components to signal such a problem was detected. For example, DSP 66 may signal such problem by controlling red LED 46-1 to illuminate and causing display 48 to display a visual pattern indicative of the method advancing to step 94. For example, step 92 can be programmed such that if 20% of the xDSL spectrum is deemed unusable, the method advances to step 94.

If, in step 92, DSP 66 determines that a sufficient number of xDSL tones are usable, i.e., less than a threshold number of tones are unusable, the method advances to step 96 where DSP 66 determines if the QLN loss is approximately equal (e.g., differ by less than 10 dB) to the signal loss for each tone. The values of QLN loss used in step 96 are determined from the measured values of QLN in step 74 according to amplitude and frequency content. An estimate of QLN loss is made from the measured value of QLN in step 74 according to amplitude and frequency content. An estimate of signal loss is made from a signal level and from an assumed transmit level.

Specifically, in the described embodiment, it is known that QLN noise determined by DSP 66 in step 74 should be dominated by crosstalk from pairs of wires adjacent to twisted-pair cables 3 and 5 (including, in the present example, extension 5-1). Closer to the ATU-C modem, crosstalk is expected to be very high in level and extend across the entire DSL frequency spectrum. Moving further away from ATU-C modem, the level of crosstalk decreases and the DSL frequency spectrum changes such that the crosstalk is reduced for higher frequencies. Therefore, the level and frequency content of QLN noise measured in step 74 can be utilized by DSP 66 to estimate the distance device 8*a* resides from ATU-C modem and, optionally, categorize said distance, e.g., without limitation, Ultra Short, Extra Short, Short, Medium, Long.

More specifically, in step 82, when the ATU-C commences handshaking with modem 10, the ATU-C modem transmits (outputs) on full power (amplitude) across the entire DSL frequency spectrum. Knowing the amplitude of each DSL tone output by the ATU-C modem during the commencement of handshaking with modem 10 in step 82 and the measured amplitude of said DSL tone received by device 8*a* from the ATU-C modem in step 82, DSP 66 can determine a difference between these amplitudes as the signal loss between the ATU-C modem and device 8*a*. Based on this signal loss, the approximate distance between the ATU-C modem and device 8*a* can be estimated.

If DSP 66 determines that the QLN loss for each of one or more DSL tones is similar to the signal loss for said DSL tone (e.g., without limitation, QLN loss and signal loss are within 10 dB), the DSL signal path that connect the ATU-C modem and device 8*a* is deemed by DSP 66 to be valid. However, if the QLN loss for each of one or more DSL tones is less than the signal loss for said DSL tone by a predetermined amount (e.g., QLN loss <10 dB of the signal loss), the DSL signal path (e.g., the pairs of wires or Tip-Ring pairs) that connect the ATU-C modem and device 8a is deemed by DSP 66 to have a physical fault and the method advances to step 98. Lastly, if the signal loss for each of one or more DSL tones is less than the QLN loss for said DSL tone by a predetermined amount (e.g., signal loss <10 dB of the QLN loss), the DSL signal path (e.g., the pairs of wires or Tip-Ring pairs) that connect the ATU-C modem and device 8a is deemed by DSP 66 to have an excess noise fault and the method advances to step 98.

If, in step 96 it is determined that QLN loss is not approximately equal to the signal loss, the method advances to step 98 where DSP 66 deems a fault to have been detected. The method then advances to step 100 where DSP determines if the QLN loss is less than the signal loss. If so, it is deemed that a line fault is present and the method advances to step 104 wherein DSP 66 causes an indication of this determination to be displayed. For example, DSP 66 may cause red LED 46-1 to illuminate and display 48 to display a visual pattern indicative of the method advancing to step 104.

On the other hand, if, in step 100, DSP 66 determines that the QLN loss is not less than the signal loss, DSP 66 deems the line to have excessive noise and the method advances to step 102 wherein DSP 66 causes an indication of this determination to be displayed, such as by causing red LED 46-1 to illuminate and causing display 48 to display a visual pattern indicative of the method advancing to step 102.

However, if DSP 66 determines in step 96 that QLN loss is approximately equal to signal loss (e.g., QLN loss <10 dB of the signal loss), the method advances to step 106 wherein DSP 66 determines insertion loss based on the measured values of QLN in step 74 and, more specifically, from a QLN profile, level and slope, collectively called the QLN loss. DSP 66 can also calculate insertion loss based on the signal strength (amplitude) detected by AC sampling circuit 78 under the control of DSP 66. Desirably, insertion loss determined in this latter manner may be determined at a single frequency within the DSL frequency spectrum, e.g., 300 kHz.

Following step 106, the method advances to step 108 where DSP 66 performs signal to noise ratio (SNR) per tone, bit-loading, and speed calculations. To determine the SNR per tone in dB, DSP 66 utilizes the formula $10 \log_{10}[(v_1)^2/(v_2)^2]$, where $v_1$ is the measured value (e.g., RMS value) for said tone from step 86 and $v_2$ is the measured value (e.g., RMS value) of QLN for said tone from in step 74.

Bit-loading for a set signal-to-noise (SNR) ratio margin, e.g., SNRM=6 dB, is determined by DSP 66 against the following rules for each DSL tone not deemed unusable in step 92: (1) if SNR is <SNRM then bit-loading equals 0 and said DSL tone is marked unusable; (2) if (SNR−SNRM)÷3 is >15, then bit-loading for said DSL tone is set to 15; and (3) otherwise bit-loading for said DSL tone is set equal to (SNR−SNRM)÷3, rounded down to the nearest whole number.

The total bit-loading can then be calculated by DSP 66 by summing the bit-loading per DSL tone across the xDSL frequency spectrum of interest. DSP 66 can then determine the maximum data rate from the bit-loading. For example, the total bit-loading is calculated by DSP 66 by simply adding together the bit-loading per DSL tone determined across the xDSL frequency spectrum of interest. The maximum data rate can then be determined by DSP 66 by multiplying the total bit-loading by a suitable value (e.g., 4000) to express the maximum speed in desired terms, e.g., bits per second.

The method then advances to step 110 wherein DSP 66 performs a bit-loading analysis that assesses maximum potential performance against actual performance. More specifically, in step 110 DSP 66, assuming 6 dB of SNRM, compares the actual maximum data rate determined in step 108 for the usable and occupied xDSL tones to the potential performance for said usable xDSL tones stored in memory 68 that was determined from theoretical data or empirical data desirably obtained under similar physical circumstances as the conductors of the customer premises shown in FIG. 1.

The method then advances to step 112 wherein DSP 66 determines if the actual performance is within a predetermined percentage or range, e.g., without limitation 80%, of the maximum potential performance. If so, the method advances to step 114 where DSP 66 causes green LED 46-2 to illuminate (indicative of the method of FIG. 6 passing) and causes the display to display a visual pattern indicative of the method advancing to step 114.

If, however, in step 112 DSP 66 determines that the actual performance is not within a desired percentage or range of the maximum potential performance the method advances to step 116.

In step 116, DSP 66 determines if the measured values of QLN determined in step 74 are too high for the signal loss determined in step 82. For example, if DSP 66 determines that QLN>signal loss by more than a first predetermined value, e.g., without limitation, 6 dB, the method advances to step 118. Otherwise, the method advances to step 120. Regardless of which step 118 or 120 the method advances, DSP 66 causes red LED 46-1 to illuminate and causes display 48 to display a visual pattern indicative of the method advancing to said step.

As should be appreciated from the foregoing description, that whenever the method of FIG. 6 advances to any of steps 72, 76, 80, 84, 88, 94, 102, 104, 114, 118, or 120, the method may stop executing. Thus, for example, if the method advances to step 72, step 74 and so forth are not executed. However, in some embodiments, once a fault condition is detected, processing may continue. For example, further processing may identify whether multiple faults exist or may gather additional information to aid in repair of the fault, such as its location or whether it has been repaired. Alternatively, even if no fault condition is found against a first set of performance criteria, testing might continue to determine whether the tested conductors would meet a second set of performance criteria. Such testing, for example, may result in a determination that a home could benefit from higher performance data service.

Figures 1, 7C:
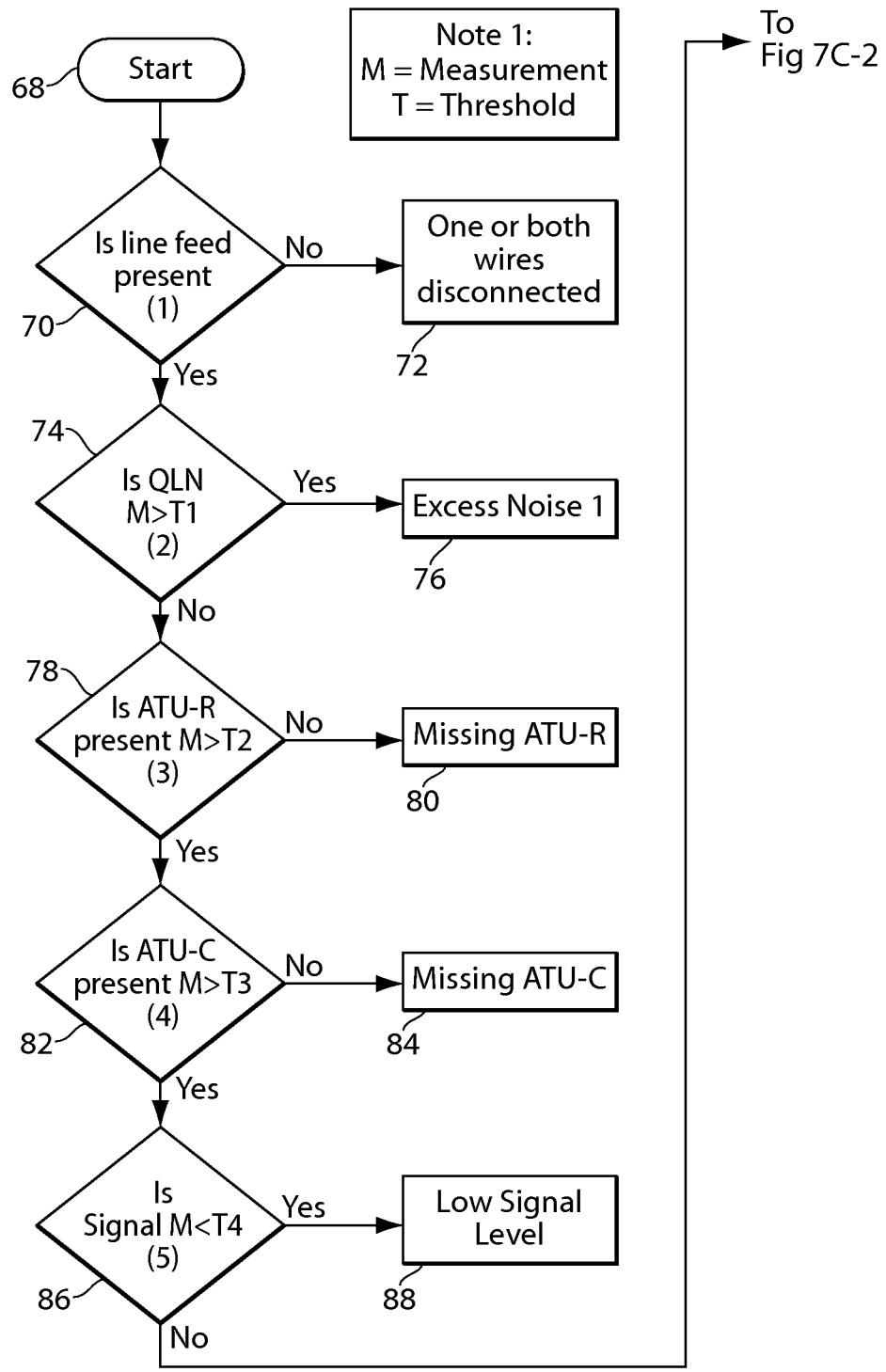
FIG. 7c shows a flowchart of a test sequence that may be performed by the test device of FIG. 7a, according to some embodiments.
Figures 2, 7C:
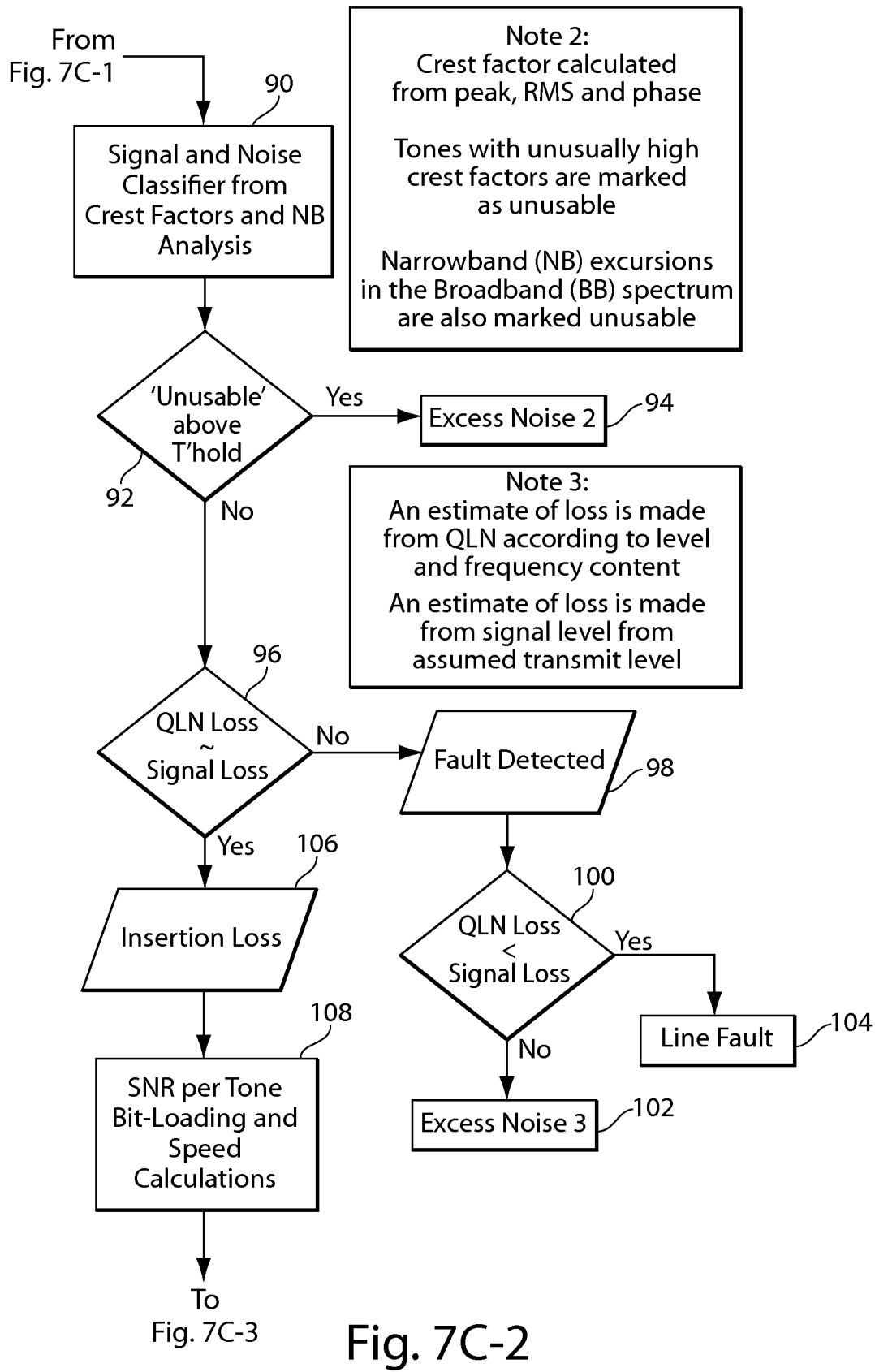
Figures 3, 7C:
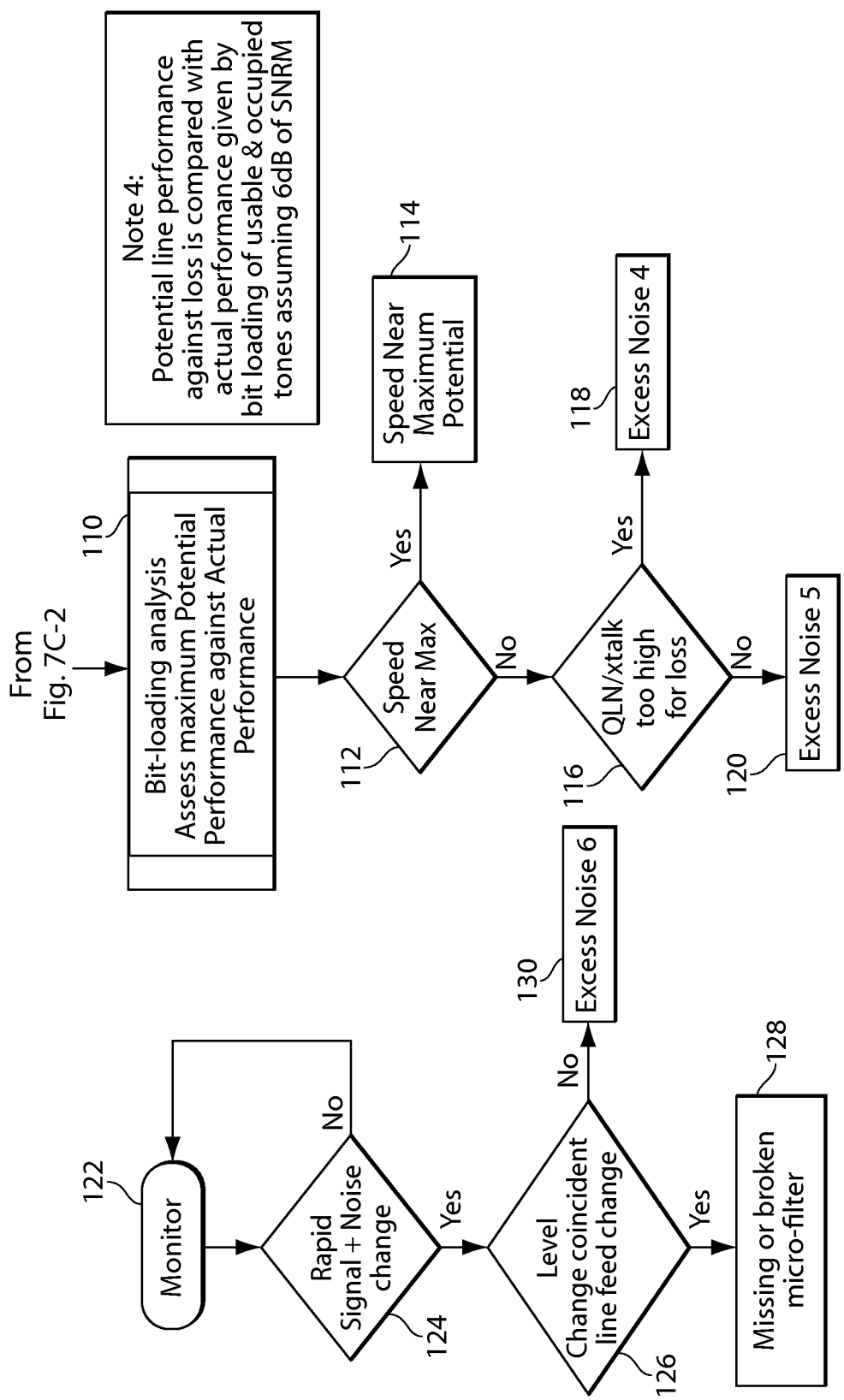

In the embodiment illustrated, upon the method of FIG. 7c terminating its execution, the user may terminate testing and turn-off device 8a by depressing activation button 42 a second time. Absent activating activation button 42 a second time DSP 66, at a suitable time, will branch to a monitor subroutine represented by steps 122-130. More specifically, the method will advance from any one of steps 72, 76, 80, 84, 88, 94, 102, 104, 114, 118, or 120 to monitor step 122. From monitor step 122, the method advances to step 124 where DSP 66 monitors for rapid signal and noise changes on conductors 200 and 202. In this step, DSP monitors for rapid signal and noise changes on conductors 200 and 202 by setting first and second relays 57 and 76 to a state where AC sampling circuit 78 can monitor for any such changes.

If, in step 124, a rapid signal and noise change is not detected, the method returns to step 122 and thereafter, continuously loops on steps 122 and 124. However, if, in any iteration of step 124, a rapid signal and noise change is detected, the method advances to step 126 wherein DSP 66 determines if the rapid change is coincident with a DC line feed change. If so, the DSP 66 deems a microfilter to be broken or missing and the method advances to step 128. If not, DSP 66 deems the line to contain excessive noise and the method advances to step 130. Regardless if the method advances to either step 128 or 130 from step 126, DSP 66 may cause an output indicating a service-affecting condition. For example, it may cause red light 46-1 to illuminate and cause display 48 to display a visual pattern indicative of the method advancing to said step from step 126.

As can be seen, a test device 8a may be placed immediately before the residential gateway, e.g., modem 10. The device 8a may noise levels in pairs of wires, e.g., twisted-pair cable 8a and extension 5-1, that feed DSL signals to modem 10 and determines whether the measured noise levels are below or above expected noise thresholds caused by crosstalk and other sources of noise. The device 8a may also determine whether the modem 10 and the service provider's modem are present and able to initiate a handshake to begin communication. Device 8a is capable of recognizing working or degraded service regardless of the synchronization states of the modems. By way of signal and noise measurements, device 8a can indirectly determine if an unfiltered extension, fax machine, microfilter, telephone, or set top box would adversely affect xDSL broadband service.

Referring back to FIG. 7b, device 8a can optionally include network analyzer 60, comprising oscillator 64 and line driver 62, operative under the control of DSP 66. In operation, network analyzer 60 can be controlled by DSP 66 to output one or more AC signals to extension 5-1 via transformer 58, relay 57 and the portion of conductors 200 and 202 that extend from relay 57 to socket 38. DSP 66 can control AC sampling circuit 78 to sample the response of extension 5-1 to the one or more AC signals output by network analyzer 60. Via AC sampling circuit 78, DSP 66 can determine from the sampled response of extension 5-1 to the AC signals output by network analyzer 60 the presence or absence of at least one DSL service affecting condition of conductors that can be sensed via extension 5-1. Examples of DSL service affecting conditions include an impedance that is either higher or lower than a predetermined impedance threshold or the presence of a bridged tap.

AC signals output by network analyzer 60 can be generated in the range from 20 Hz to 2.2 MHz (for testing in the ADSL2+ environment), and optionally up to 8 MHz (for testing in the VDSL band). Moreover, it is envisioned that device 8a can be configured to recognize and generate handshake ATU-R tones. It is envisioned that this configuration may use several differential phase shift keying (DPSK) of several DSL carrier tones. The capability of recognizing and generating handshake ATU-R tones is provided by the combination of DSP 66, network analyzer 60, and AC sampling circuit 78.

Moreover, it is envisioned that device 8a can also have the capacity to recognize handshake ATU-C tones via AC sampling circuit and DSP 66. This uses DPSK of several DSL carrier tones.

Although relays 57 and 76 have been shown in FIG. 7b as exemplary circuitry for connecting the test device 8 to the internal conductors 5 and modem 10, respectively, the test device may be connected to internal conductors 5 and/or modem 10 in any suitable way. For example, in some embodiments relays 57 and 76 may be replaced with one or more types of types of controllable electrical switches, such as transistors. In some embodiments, test device 8 may be connected to internal conductors 5 and/or modem 10 in response to manual input from a user. For example, relays 57 and/or 76 may be replaced with a manual switch that enables a user to select whether to connect the test device 8 to i) only modem 10, ii) only internal conductors 5, or iii) both the modem 10 and internal conductors 5. However, any suitable type of automatic or manual switch may be used to selectably connect the test device 8 to the modem 10, internal conductors 5, or both.

Device 8a, and specifically, the combination of DSP 66 and AC sampling 78, can enable device 8a to act as a modem. The ability of device 8a to act as a modem provides for remote access capability of device 8a from, for example, the ATU-C modem of the service provider.

An example has been described above in which a DSP is used to perform measurements of signal levels at various frequencies. However, the techniques described herein are not limited to use of a DSP for performing such measurements, as any suitable technique and type of hardware may be used. For example, in some embodiments a scanning filter and level measurement set or a DSL modem chip (e.g., having a custom DSP core) may be used.

Example 2

Figure 8:
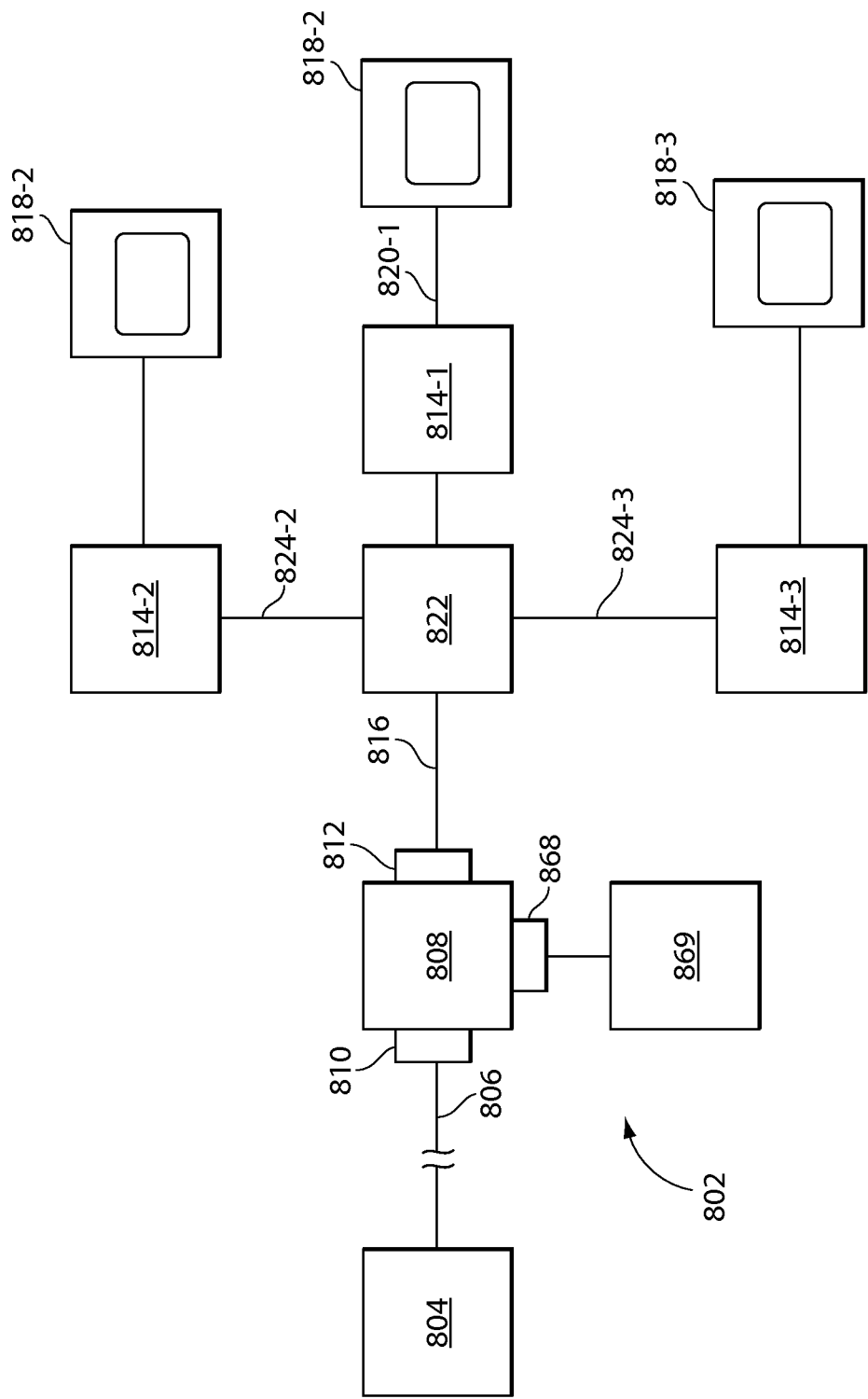
FIG. 8 shows an example of a network environment in which a test device is included in a set-top box, according to some embodiments.

Another embodiment will be described with respect to FIG. 8. As shown in FIG. 8, an in-home or residential communication network 802 receives broadband service from a broadband service provider 804 via a communication line 806. Communication line 806 can include suitable types of conductors, such as a wire pair, a twisted pair, a coaxial cable, or a fiber optic line for providing, without limitation, DSL service to communication network 802. Any suitable type of data service may be provided by broadband service provider 804 to communication network 802 via communication line 806.

Communication network 802 includes a residential gateway 808 which includes a wide area network (WAN) port 810 for receiving broadband services from broadband service provider 804 via communication line 806 and a local area network (LAN) port 812 for providing high speed data service (e.g., Ethernet service) to other nodes of communication network 802. As is known in the art, residential gateway 808 may include an internal modem (or other device configured to perform a modem function) for receiving broadband services via WAN port 810 of residential gateway 808 and an internal router (or other device configured to perform a router function) which provides broadband services to LAN port 812. However, it is envisioned that the output of the modem of residential gateway 808 can be coupled directly to LAN port 812.

In some embodiments, LAN port 812 is coupled directly to a first node of communication network 802, in this example an input of a set-top box (STB) 814-1, via a cable 816 that extends between LAN port 812 and the input of STB 814-1. Cable 816 may be a coaxial cable or one or more wire pairs, such as a twisted pair or a tip-ring pair. In a manner known in the art, STB 814-1 coverts incoming signals provided by LAN port 812 and cable 816 into audio and/or video content that is supplied to a device, such as, without limitation, a television 818-1 via a cable 820-1. Cable 820-1 may be a cable that includes multiple twisted pairs, such as a Cat-5, a Cat-6 cable, or a coaxial cable depending upon the output and input connections of STB 814-1 and television 818-1, respectively.

In some embodiments, communication network 802 includes a plurality of STBs 814 (2, or 3, or more) with the output of each STB connected to supply audio and/or video service(s) to a device, such as a television 818. The embodiment shown in FIG. 8 includes three STBs (or nodes), namely, 814-1, 814-2, and 814-3, all connected to LAN port 812 of residential gateway 808 via a junction 822. To facilitate connections of LAN port 812 to each STB 814-1-814-3, instead of cable 816 being connected to the input of STB 814-1, cable 816 is connected to an input of junction 822. Where cable 816 is a coaxial cable, junction 822 may be a coaxial cable splitter that physically couples coaxial cable 816 to cables 824-1, 824-2, and 824-3 which service STBs 814-1, 814-2, and 814-3, respectively. Where junction 822 is a coaxial cable splitter, cables 824-1-824-3 may also be coaxial cables. However, where cable 816 is a wire pair, such as a twisted pair (e.g., a tip-ring pair), each cable 824-1-824-3 may be a wire pair and junction 822 may be a wire pair junction that connects the pair of wires of cable 16 to each wire pair of cables 824-1-824-3. For example, where cable 816 is a tip-ring pair, junction 822, in its capacity as a wire pair junction, connects the tip wire of cable 816 to the tip wire of each cable 824-1-824-3 and connects the ring wire of cable 816 to the ring wire of each cable 824-1-824-2. It is envisioned that where junction 822 is a coaxial cable splitter, junction 822 can optionally include switches known in the art. However, this is not to be construed as limiting the invention.

In the foregoing description, WAN port 810 and LAN port 812 may be configured to facilitate DSL service and Ethernet service, respectively. This type of conversion by residential gateway 808 can be useful where pre-installed cables 816, 824-1, 824-2, and/or 824-3 are coaxial cables or wire pairs, such as twisted pairs or tip-ring pairs, and cable 86 is a coaxial cable or a fiber optic line.

In review, LAN port 812 can be connected directly to STB 814-1 via cable 816. Alternatively, LAN port 812 can be connected to two or more STBs 814 via junction 822 in the form of a coaxial cable splitter or a wire pair junction.

Figure 9:
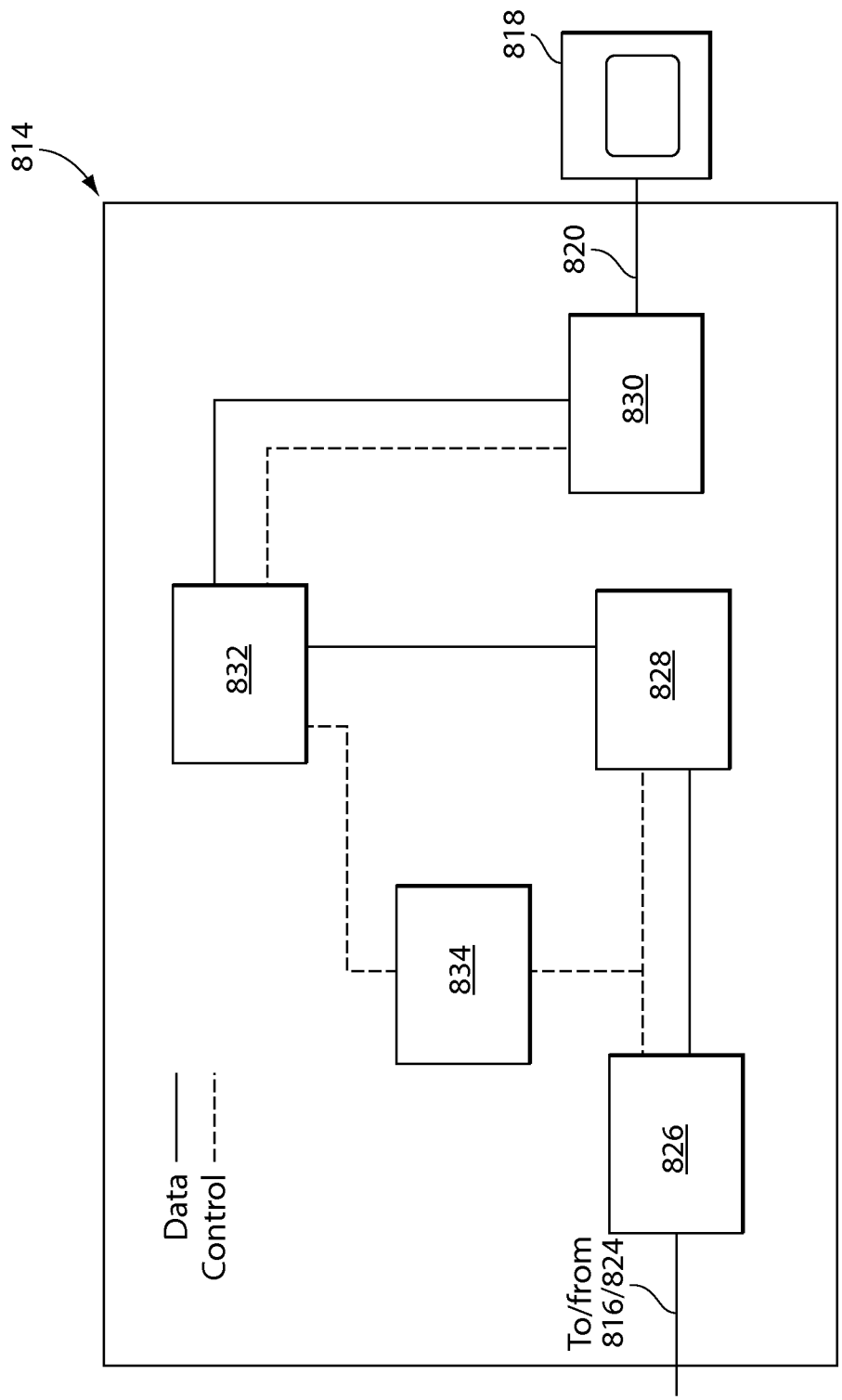
FIG. 9 shows exemplary components of a set top box.

With reference to FIG. 9 and with continuing reference to FIG. 8, each STB 814 shown in FIG. 8 may include an analog front end (AFE) chip 826, a MAC/physical layer (MAC/PHY) chip 828, an end services interface (ESI) block 830 and a CPU 832, all which may be connected in the manner illustrated in FIG. 9. AFE chip 826 has an input connected to LAN port 812 of residential gateway 808 either directly via cable 816 or via a cable 824 (e.g., cable 824-1) and junction 822. The output of AFE chip 826 is coupled to an input of MAC/PHY chip 828 which has an output connected to CPU 832. CPU 832 is connected to an input of ESI 830 which can be any suitable and/or desirable interface, such as, without limitation, HDMI, component video/audio, or composite video/audio. The output of ESI 830 is connected via a cable 820 (e.g., cable 820-1) to a television 818 (e.g., television 818-1). It is envisioned that AFE chip 826 and MAC/PHY chip 828 may be able to support MoCA, HPNA, and/or G.hn services.

AFE chip 826 and MAC/PHY chip 828 operate under the control of a chipset firmware 834 operating under the control of CPU 832 that in turn operates under the control of application firmware. CPU 832 operating under the control of the application firmware acts as a data interface between MAC/PHY chip 828 and EST block 830. CPU 832 operating under the control of the application firmware also provides control signals to EST block 830 to control the operation thereof to (in this example) provide audio and/or visual services to television 818 via cable 820. The firmware of chipset firmware 834 is selected to correspond to the type of service provided by AFE chip 826 and MAC/PHY 828, namely, MoCA, HPNA, and/or G.hn.

AFE chip 826, MAC/PHY chip 828, CPU 832 and its application firmware, and ESI block 830 of STB 814 are configured to the broadband service provided by LAN port 812 of residential gateway 808. For example, if LAN port 812 provides Ethernet service, AFE chip 826, MAC/PHY chip 828, CPU 832 and its application firmware, and EST block 830 are configured to process Ethernet packets into audio and/or visual signals provided to television 818 via cable 820. For example, AFE chip 826 and MAC/PHY chip 828 can each be configured to operate in accordance with the MoCA, HPNA and/or G.hn networking standard. The MoCA, HPNA, and G.hn networking standards are well known in the art and will not be described further herein.

Having described an in-home or residential communication network 802 (FIG. 8) and an STB 14 (FIG. 9), an embodiment will now be described with reference to FIG. 10 and with continuing reference to FIGS. 8 and 9. More specifically, the following embodiment will be described with reference to an in-home or residential communication network 802 including a residential gateway 808 that services one or more STBs 814-1, 814-2, and/or 814-3. However, this is not to be construed as since any one or more of STBs 814-1-814-3 can be replaced with any suitable and/or desirable node that implements a MoCA, HPNA, and/or G.hn service. For example, any STB 814 in FIG. 8 can be replaced with, for example, a PC or a smart appliance or device that includes a MoCA, HPNA, G.hn or equivalent or similar interface. In addition, any one or more of STBs 814-1-814-3 can be eliminated whereupon the end of the corresponding cable is unterminated or open, as is often the case in a typical residential communication network. Herein, each instance of an STB, PC, smart appliance or device, or the like may be thought of as an interface device (ID) between residential gateway 808 and a data service receiving device, such as, without limitation, a television 818, the CPU of the PC, a controller of an appliance or device, and the like.

Figure 10:
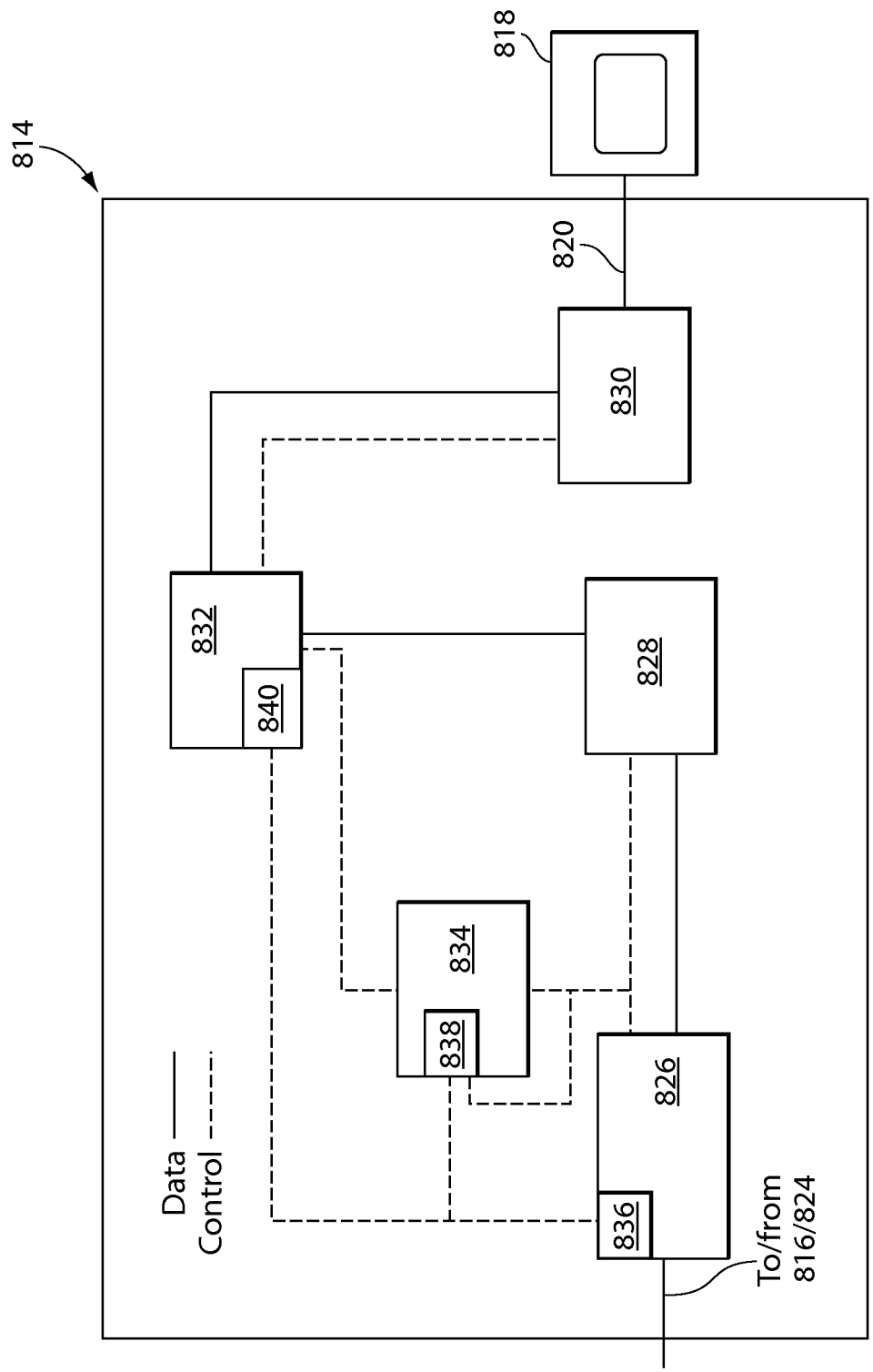
FIG. 10 shows components of a set top box in an embodiment in which the set top box includes a test device.

FIG. 10 illustrates the hardware, firmware, and/or software that may be added to STB shown in FIG. 9 to facilitate testing of cabling and connections of communication network 802. Specifically, a Measurement AFE/Pass-Through circuit 836 is incorporated inline between LAN port 812 and the input of AFE chip 826. In one embodiment, the hardware of Measurement AFE/Pass-Through 836 is incorporated directly into AFE chip 826. However, this is not to be construed as limiting. In addition, to facilitate the function of Measurement AFE/Pass-Through circuit 836, chipset firmware 834 is augmented with enhanced firmware 838 that may be made part of chipset firmware 834 at the factory or may be downloaded and made part of chipset firmware 834 via communication network 802. A software agent 840 may be pre-installed at the factory or downloaded via communication network 802 and made part of the application firmware that controls the operation of CPU 832. Enhanced firmware 838 and/or software agent 840 can either be pre-installed at the factory or downloaded into the embodiment of STB 814 shown in FIG. 10 via broadband service provider 804 and residential gateway 808.

With reference to FIG. 11 and with continuing reference to all previous figures, Measurement AFE/Pass-Through circuit 836 may include a switch network 842, a DC application circuit 844, an AC application circuit 846, and a measurement circuit 848 all connected as shown. In operation, switch network 842 is operative for individually (one-at-a-time) coupling AFE chip 826 in a pass-through mode between LAN port 812 (via cable 816 or 824) and AFE chip 826; for connecting DC application circuit 844 to cable 816 or 824; and/or for connecting AC application circuit 846 to cable 816 or 824.

In the foregoing discussion, STB 814 and/or Measurement AFE/Pass Through 836 is described as being connected to either cable 816 or cable 824. It is to be appreciated that connection to cable 816 occurs when STB 814 (e.g., STB 814-1) is connected directly to LAN port 812. In contrast, the connection to cable 824 occurs when one or more STBs 814 connect to LAN port 812 via junction 822.

Figure 12A:
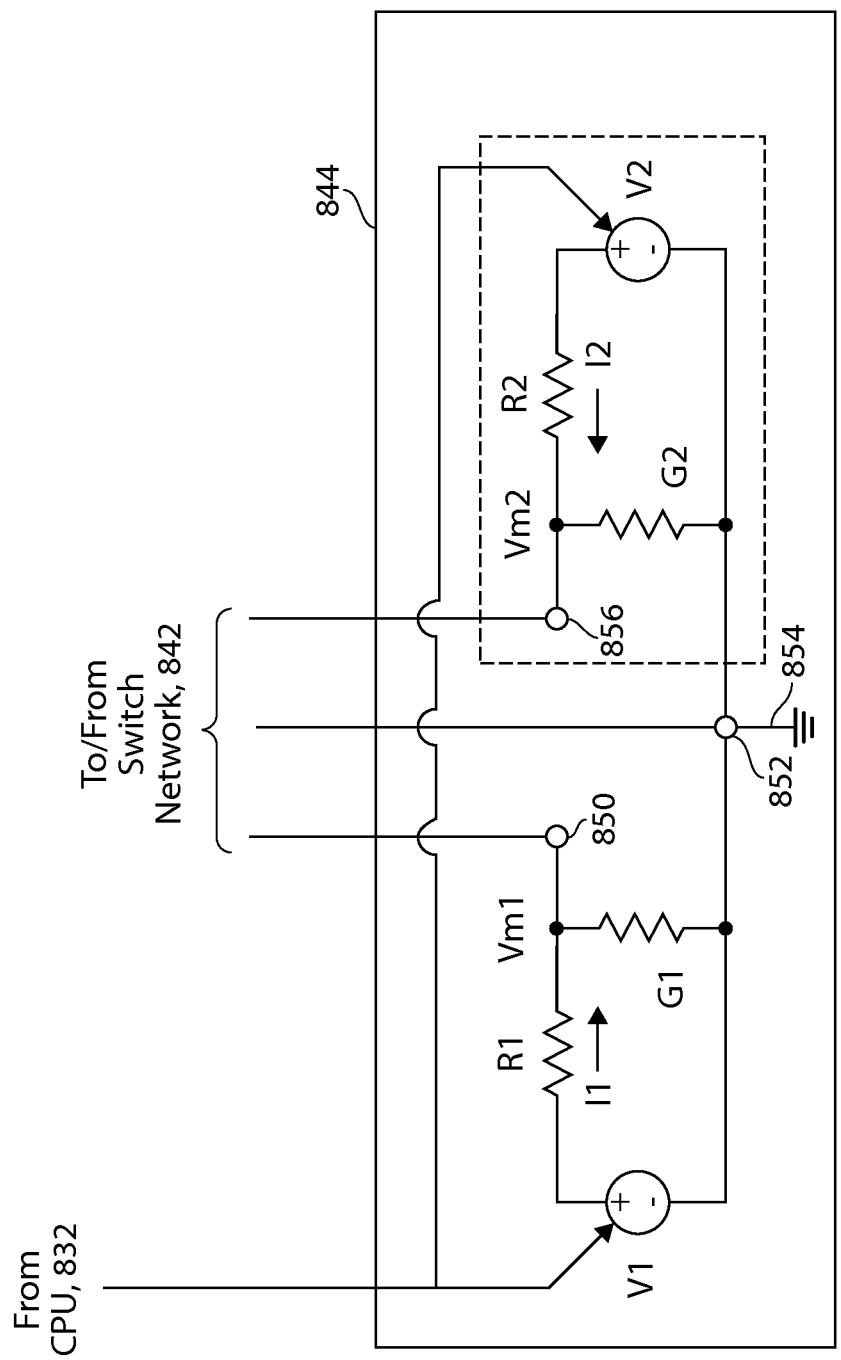
FIGS. 12a and 12b show examples of DC and AC application circuits, respectively, that may be used in the circuit of FIG. 11, according to some embodiments.
Figure 12B:
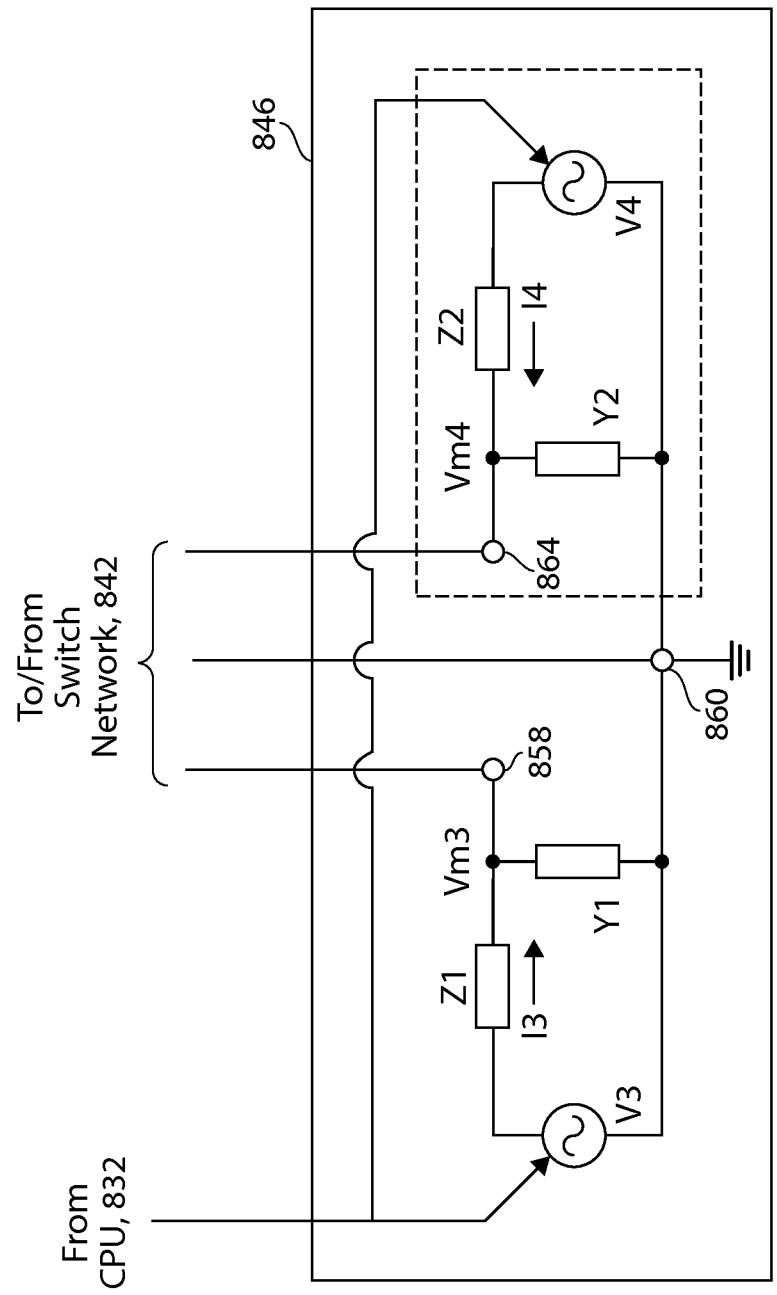

With reference to FIGS. 12a and 12b and with continuing reference to FIG. 11, DC application circuit 844 includes a DC voltage source V1, a resistance R1, and a conductance G1 all connected in the manner shown in FIG. 12a. Optionally, DC application circuit 844 can include a second voltage source V2, a second resistance R2, and a second conductance G2 connected in the manner shown in FIG. 12a. DC application circuit 844 defines a node 850 at the junction of resistance RI and conductance G1 and a node 852 which acts as a reference or ground potential 854. Where DC application circuit 844 includes the optional resistance R2 and conductance G2, DC application circuit 844 also defines a node 856 at the junction of resistance R2 and conductance G2. Each node 850, 852, and, optionally, 856 is coupleable via switch network 842 to cable 816 or 824 in any suitable and/or desirable manner that facilitates testing in the manner described hereinafter. Where cable 816 or 824 is a wire pair, such as a twisted pair or a tip-ring pair, switch network 842 connects node 850 to one of said wires and connects either ground node 852 or, optionally, node 856 to the other of said wires as deemed suitable and/or desirable by the test to be performed. For example, when it is desirable to supply common mode or differential mode signals to the pair of wires of cable 816 or 824, switch network 842 connects nodes 850 and 856 to said wires. Similarly, if it is desired to reference one of the pair of wires of cable 816 or 824 to ground, switch network 842 connects nodes 850 and 852 to said pair of wires. Similarly, where cable 816 or 824 is a coaxial cable, switch network 842 can connect node 850 to the center conductor and can connect either node 852 or, if provided, node 856 to the sheath of said coaxial cable as deemed suitable and/or desirable by the test to be performed. Desirably, voltage source VI and, if provided, voltage source V2 are programmable source(s) that can be controlled by CPU 832 operating under the control of software agent 840.

Referring now to FIG. 12b, AC application circuit 846 includes an AC voltage source V3, an impedance Z1, and an admittance Y1 connected in the manner shown. Voltage source V3 is a programmable source that can be programmed to output sinusoidal AC signals or pulse AC signals under the control of CPU 832 operating under the control of the SW agent 840 of measurement AFE/pass-through 836. Optionally, AC application circuit 846 can include a second voltage source V4, a second impedance Z2, and a second admittance Y2 all connected as shown in FIG. 12b Like voltage source V3, voltage source V4 is a programmable source operating under the control of CPU 832 operating under the control of the SW agent 840 of measurement ATE/pass-through 836 to output sinusoidal or pulse AC signals. The junction of impedance Z1 and admittance Y1 define a node 858. A reference or ground potential 862 defines a node 860 of AC application 846. If provided, the junction of impedance Z2 and admittance Y2 define a node 864.

Under the control of switch network 842, node 858, 860, and, if provided, node 864, can be selectively connected to the wires comprising cable 816 or 24, which can be either a coaxial cable or a wire pair, such as a twisted pair or a tip-ring pair. For example, when it is desirable to supply common mode or differential mode AC signals to the pair of wires of cable 816 or 824, switch network 842 connects nodes 858 and 864 to said pair of wires. Similarly, if it is desired to reference one of the pair of wires of cable 816 or 824 to ground, switch network 842 connects nodes 858 and 860 to said pair of wires in a suitable manner. Similarly, where cable 816 or 824 is a coaxial cable, switch network 842 can connect node 858 to the center conductor and can connect either node 862 or, if provided, node 864 to the sheath of said coaxial cable as deemed suitable and/or desirable by the test to be performed.

Switch network 842 can selectively connect the pair of wires of cable 816 or 824 to the nodes of DC application circuit 844 or AC application 846, one-at-a-time. Hence, the nodes of DC application circuit 844 can be connected to the wires of cable 816 or 824 independent of the nodes of AC application circuit 846, and vice versa.

Measurement circuit 848 includes suitable internal circuitry, such as, without limitation, an analog-to-digital converter (ADC) that is operative for detecting a condition of the pair of wires of cable 816 or 824 or the response of the pair of wires of cable 816 or 824 to voltages and/or currents impressed on said wires by DC application circuit 844 and/or AC application circuit 846. More specifically, measurement circuit 848 is coupled to nodes 850, 852, and, if provided, 856 and is connected to nodes 858, 860, and, if provided, 864 of AC application circuit 846. It is envisioned that measurement circuit 848 can include any necessary hardware and/or software deemed suitable and/or desirable by one of ordinary skill in the art to accomplish measurement of the condition of the pair of wires of cable 816 or 824 and/or the acquisition of the response of the pair of wires of cable 816 or 824 to the application of one or more DC signals by DC application 844 and/or one or more AC signals by AC application circuit 846. For example, measurement circuit 848 can include one or a number of ADCs and, if necessary, a switch network that enables the selective connection of said one or more ADCs to appropriate nodes of DC application circuit 844 and/or AC application circuit 846. The type and arrangement of the internal elements or circuits of measurement circuit 848 is not to be construed as limiting since it is envisioned that measurement circuit 848 can include any suitable and/or desirable number and arrangement of elements or circuits that enables the measurement of the condition of the pair of wires of cable 816 or 824 existing on the pair of wires of cable 816 or 824 (e.g., resistance or capacitance) and/or the response of the wires of cable 816 or 824 to DC and/or AC signals impressed on said wires by DC application circuit 844 and/or AC application circuit 846, respectively.

Figure 13:
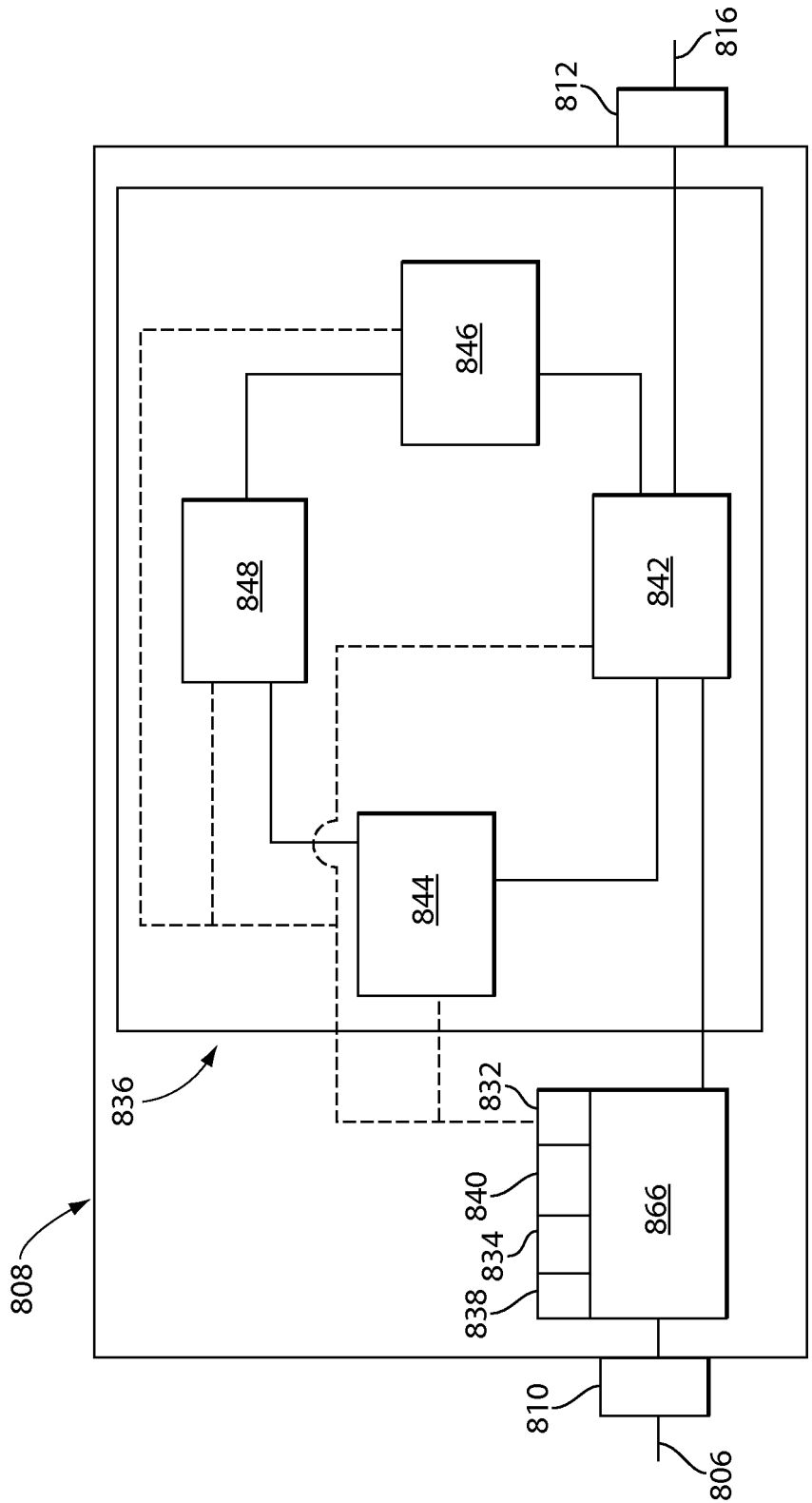
FIG. 13 shows an example of a residential gateway, according to some embodiments.

With reference to FIG. 13, in some embodiments, residential gateway 808 also includes an instance of a Measurement AFE/Pass-Through circuit 836 positioned to apply DC and AC signals onto cable 816 and to measure the response of communication network 82 to said AC and DC signals. FIG. 13 also shows the internal modem/router 866 of residential gateway 808 along with the CPU/application software 832, the software agent 840, the chipset firmware 834, and the enhanced firmware 838 of Measurement AFE/Pass-Through 836 of residential gateway 808.

Having thus generally described the hardware, software, and firmware, the operation will now be described with reference to the embodiment of communication network 802 shown in FIG. 8, wherein residential gateway 808 and each STB 814 is assumed to include a measurement AFE/Pass-Through 836. However, this is not to be construed as limiting since it is envisioned that the present techniques find application in a communication network setting only includes a single STB 814 connected directly to residential gateway 808.

Generally, each instance of a Measurement AFE/Pass-Through 836 is coupled to the internal cables 816 and 824-1-824-3 of communication network 82. The operation of communication network 802 shown in FIG. 8, wherein instances of Measurement AFE/Pass-Through 836 are included in residential gateway 808 and each STB 814-1-814-3 will now be described.

Figure 14:
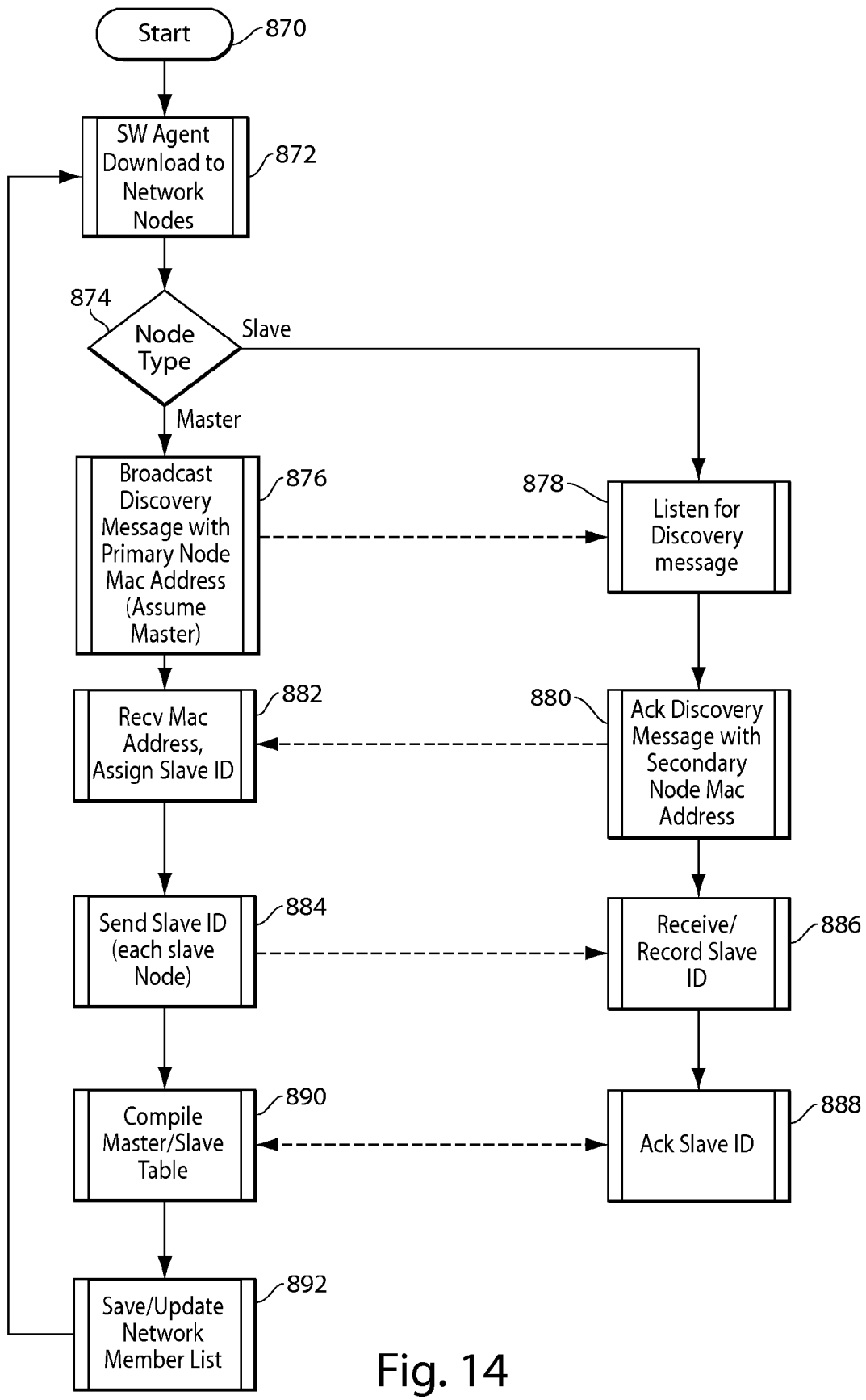
FIG. 14 shows a method of network discovery and initialization, according to some embodiments.

With reference to the flow diagram of FIG. 14, in a method of network discovery and initialization, the method advances from a start step 870 to a step 872 wherein software agent 840 is downloaded to each network node, namely, residential gateway 808 and STBs 814-1-814-3. If, for any node, software agent 840 is pre-installed, step 872 can be bypassed for said node.

The method then advances to step 874 where a decision is made by each node whether it is a master node or a slave node. The software agent 840 residing in residential gateway 808 works with the CPU 832/application software of residential gateway 808 to establish residential gateway 808 as the master node. Desirably, the software agent 840 downloaded into each STB 814-1-814-3 works with the CPU 832/application software thereof to establish said STB as a slave node in the network.

In residential gateway 808, software agent 840 causes the method to advance to step 876. In contrast, the software agent 840 residing in each STB 814-1-814-3 causes the method to advance to step 878. In step 876, the software agent 840 residing in residential gateway 808 broadcasts a discovery message with primary node MAC address. During network discovery and initialization, each STB 814-1-814-3, in step 878, listens for this discovery message output by residential gateway 88 in step 876 and, in step 880, acknowledges the discovery message with a secondary node MAC address. In step 882, residential gateway 88 receives the MAC addresses broadcast by STBs 814-1-814-3 and, in step 884 sends a slave unique ID to each STB 814-1-814-3 acting in its capacity as a slave node. In step 886, each STB 814-1-814-3 acting in its capacity as a slave node receives and records its slave unique ID and, in step 888 acknowledges its slave ID to residential gateway 808. In step 890, residential gateway 808 compiles a master/slave table and in step 892 saves and updates a network member list that residential gateway 808 utilizes thought to coordinate testing of communication network 802, including cables 816 and 824-1-824-3 in the manner described hereinafter.

It is envisioned that at a suitable time, the method of FIG. 14 can advance from step 892 back to step 872 wherein the network discovery and initialization process is repeated. This return to step 872 can be accomplished on demand or at regular or periodic intervals deemed suitable and/or desirable by one of ordinary skill in the art. However, it is to be appreciated that following step 892, the method of FIG. 14 can terminate. The decision to terminate the method of FIG. 14 or to return from step 892 to step 872 can be made by one of ordinary skill in the art based upon the configuration of the communications network 802 shown in FIG. 8 and whether or not said configuration is subject to change.

At a suitable time following the discovery and initialization of the nodes of the communication network 802 shown in FIG. 8, namely, residential gateway node 808, and STB nodes 814-1-814-3, the software agent 840 residing in residential gateway 808 can coordinate the testing of cables 816 and 824-1-24-3. Namely, the software agent 840 downloaded into residential gateway 808 may cause the following test to be performed on cables 816 and 824-1-824-3:
1. AC and DC metallic line test, such as testing resistance, voltage, current, etc.;
2. reflectometry (TDR and/or FDR) measurements; and
3. dual ended interactive tests between different nodes.

Each of these tests can provide distinct information about network cables 816 and 824-1-824-3 and junction 822 that can be utilized individually or in combination for diagnosis of faults and impairments in the network between residential gateway 808 and STBs 814-1-814-3. For example, under the control of the software agent 840 residing in residential gateway 808 acting in its capacity as a master node, said software agent 840 can cause the Measurement AFE/Pass-through 836 of any one of residential gateway 808 or STBs 814-1-814-3 to perform an AC metallic line test, a DC metallic line test, or reflectometry (TDR and/or FDR) measurements of cables 816 and 824-1-824-3 and junction 822. More specifically, the software agent 840 residing in residential gateway 808 acting in its capacity as a master node can cause the Measurement AFE/Pass-Through 836 of residential gateway 808 to perform single-ended AC and/or DC metallic line tests and/or single-ended reflectometry measurements of the network comprising cable 816, junction 822 and cables 824-1-824-3. Similarly, the software agent 840 downloaded into residential gateway 808 acting in its capacity as a master node can cause the Measurement AFE/Pass-Through 836 of any one of STBs 814-1-814-3 to perform single-ended AC and/or DC metallic line tests and/or single-ended reflectometry measurements of the network comprising cables 824-1-24-3, junction 822, and cable 816.

The Measurement AFC/Pass-Through 836 of residential gateway 808 acting in its capacity as a master node facilitates single-ended line testing by the Measurement AFE/Pass-Through 836 of any one of STBs 814-1-814-3 by sending a suitable test command to said STB via cable 816, junction 822, and the cable 824 corresponding to the Measurement AFE/Pass-Through 836 of the STB 814 to perform said single-ended test. For example, if the Measurement AFE/Pass Through 836 of STB 814-1 is to perform single-ended testing, the software agent 840 of residential gateway 808 acting in its capacity as a master node dispatches a suitable test command to the CPU 832 of STB 814-1 via cables 816 and 824-1, and junction 822. Operating under the control of the software agent 840 residing in STB 814-1, the CPU 832 of STB 814-1 causes Measurement AFC/Pass-Through 836 of STB 814-1 to perform single-ended testing of cables 816, 824-2, 824-3, and junction 822 via cable 824-1.

Similarly, under the control of software agent 840 residing in residential gateway 808, the CPU 832 of residential gateway 808 can initiate dual-ended interactive testing between any pair of nodes of communication network 802 shown in FIG. 8. In FIG. 8, these nodes include residential gateway 808 acting as a master node and each STB 814-1-814-3 acting as a slave node. Thus, for example, under the control of the software agent 840 residing in residential gateway 88, CPU 832 of residential gateway 808 can cause dual-ended interactive tests to be conducted between the Measurement AFE/Pass-Through 836 of residential gateway 808 and the measurement AFE or pass through of any one of STBs 814-1-814-3 under the control of the software agent 840 residing in said STB. Similarly, under the control of the software agent 840 residing in residential gateway 808, CPU 822 of residential gateway 808 can cause dual-ended interactive testing to occur between any two slave nodes of the communication network 802 shown in FIG. 8. For example, the software agent 840 residing in residential gateway 808 can cause dual-ended interactive testing to occur between STB 814-1 and STB 814-2; between STB 814-1 and STB 814-3; or between STB 814-2 and STB 814-3, all via junction 822.

Examples of conditions that can be acquired via the AC and DC metallic line tests include: longitudinal balance; insertion loss; insulation resistances; line impedance/reactance; line length; and line termination status. Examples of conditions that can be detected by a measurement circuit 848 of any one of the Measurement AFE/Pass-Through 836 residing in residential gateway 808 for one of the STBs 814-1-814-3 without the use of DC application circuit 844 or AC application circuit 846 include: ambient noise; foreign AC voltage; and foreign DC voltage.

Examples of time and frequency domain reflectometry (TDR and FDR) measurements that can be conducted on cable 816, junction 822, and cables 824-1-824-3 include: open; short; termination status; length; integrity of connections and splices (e.g., of junction 822); and insertion loss.

Examples of dual-ended measurements that can be made between any two nodes 808, 814-1, 814-2, and 814-3 of communication network 802 include: insertion loss; cable or segment length; noise and interference; and cable connectivity and integrity.

It is envisioned that some of the above-described measurements and acquired line conditions may be available for every architecture of communication network 802. Accordingly, the software agent 840 residing in each node is desirably configured to be flexible and adaptive to perform applicable measurements and corresponding analysis of line conditions. Based on whether the software agent resides in residential gateway 808, whereupon the software agent 840 causes residential gateway 808 to act in a capacity as a master node, or software agent 840 resides in one of the STBs 814, whereupon the software agent 840 causes said STB to act in a capacity of a slave node of the network.

Desirably, the line measurement sequences are interactive, i.e., subsequent measurement analysis depends on the results of a preceding test. An exemplary test sequence is shown in the flow chart of FIG. 15 wherein the method advances from start step 900 to step 902 wherein the software agent 840 residing in residential gateway 808 causes one of the instances of Measurement AFE/Pass-Through 36 of residential gateway 808, STB 814-1, STB 814-2, or STB 814-3 to perform a parametric line test to acquire one or more of the following line conditions: noise; longitudinal balance; insertion loss; insulation resistance; line impedance/reactance; foreign AC voltage; foreign DC voltage; line length; and/or line termination status.

Upon completion of the parametric line test and acquiring line conditions, the method advances to step 904 wherein a decision is made whether the parametric line test passed or failed. Such a test may fail, for example, if the line conditions are outside of an expected range or in any other suitable way. This decision can be made by the CPU 832 of any node 808, 814-1, 814-2, or 814-3 of communication network 802. However, such determination is communicated to CPU 832 of residential gateway 808 which acts on this determination and causes the method to advance the step 906 if a fault is detected or to advance to step 908 if a fault is not detected.

Assuming the method advances to step 906, the software agent 840 residing in residential gateway 808 causes CPU 832 of residential gateway 808 to initiate an FDR test by one of the nodes 808, 814-1, 814-2, 814-3 of communication network 802. Step 906 also compares actual FDR test results to a predetermined FDR footprint 910 (e.g., which may be stored in memory). From step 906, the method advances to step 912 where a determination is made by one of the nodes of communication network 802 whether a fault was located. Regardless of which node 808, 814-1, 814-2, or 814-3 makes this determination, CPU 832 of residential gateway 808 acts on this determination to advance to step 914 if a fault is detected or to advance to step 916 if a fault is not detected.

Returning now to step 904, if, in step 904, it is determined that the parametric line test in step 902 did not detect a fault, the method advances from step 904 to step 908, where under the control of the software agent 840 residing in residential gateway 808, a Measurement AFE/Pass-Through 836 of one of the nodes 808, 814-1, 814-1, 814-3 is caused to perform an FDR test and compare the FDR test to the predetermined FDR footprint 910. The difference between FDR test 906 and FDR test 908 is that FDR test 906 is designed for fault location analysis whereas FDR test 908 is designed for fault detection analysis.

The method then advances to step 918 where the results of the comparison of the FDR test and comparison performed in step 908 is acted upon by CPU 932 of residential gateway 808 operating under the control of software agent 840. If, in step 918, it is determined that a fault exists, the method advances to step 106 described above. However, if, in step 918, it is determined that. a fault does not exist, the method advances to step 916.

In step 916, the software agent 840 residing in residential gateway 808 causes the Measurement AFE/Pass-Through 836 of residential gateway 838 to perform a double-ended measurement with the Measurement AFE/Pass-Through 836 of each STB 814-1-814-3, one at a time. Following step 916, the CPU 832 of residential gateway 808 operating under the control of the software agent 840 residing in residential gateway 808 advances to step 914 where the test results are output or dispatched by CPU 22 of residential gateway 808 operating under the control of the software agent 840 residing in residential gateway 808 in any suitable or desirable manner. For example, the test results can be dispatched back to broadband service provider 804, can be communicated to one or more STBs 814-1-814-3 for display on the corresponding television 818-1-818-3, respectively, or can be output on a port 868 of residential gateway 808 for dispatch to an intelligent control device connected to said port 868, such as a PC.

Figure 15:
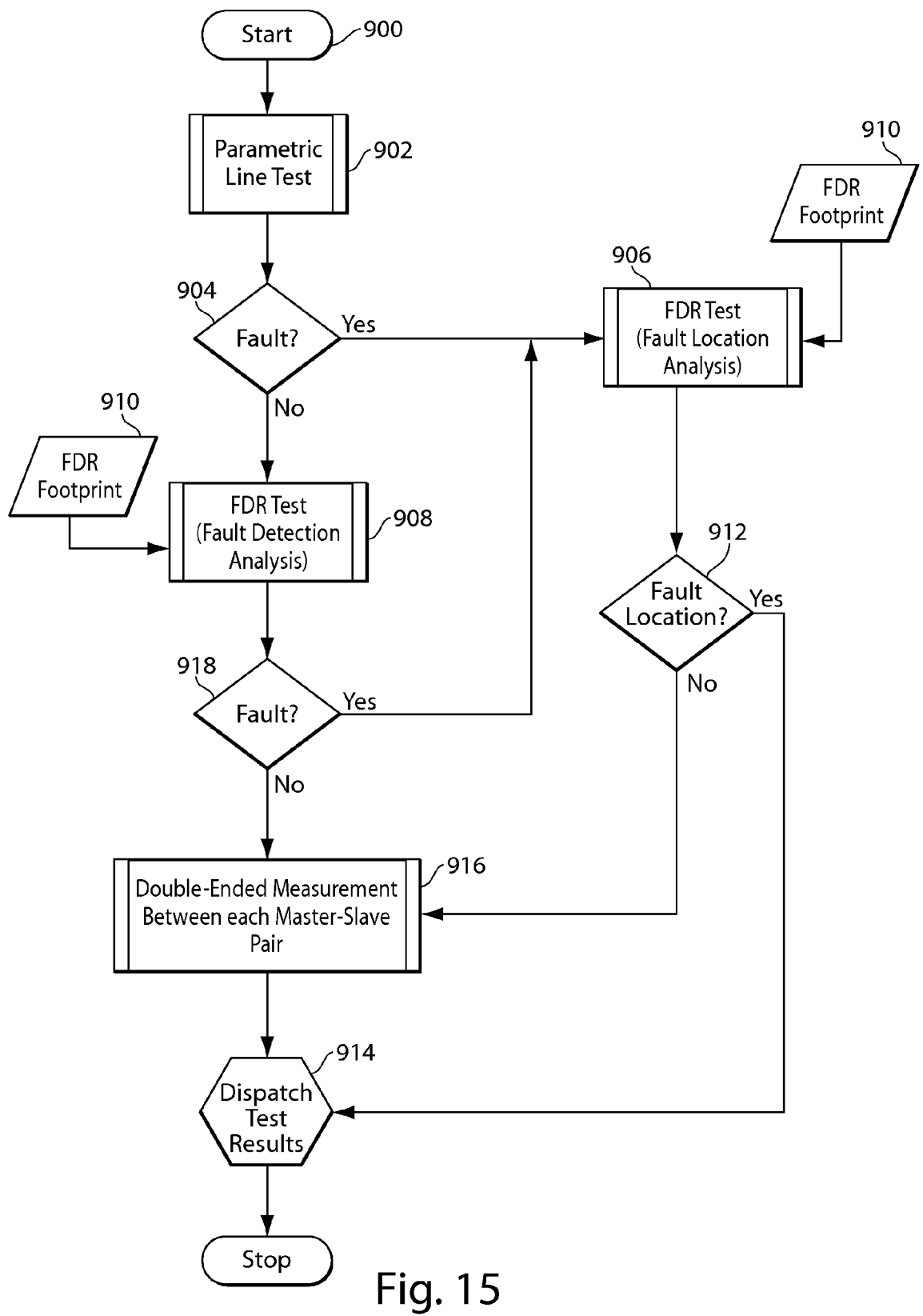
FIG. 15 shows an exemplary test sequence that may be performed by a test device included in a set top box, according to some embodiments.

The test sequence shown in FIG. 15 and described above is an exemplary test sequence and is not to be construed as limiting the invention.

A high level analysis of the method performed by residential gateway 808 modified to include the instance of the Measurement AFE/Pass-Through 836, software agent 840, and enhanced firmware 838 and each STB 814-1-814-3 modified to include the Measurement AFE/Pass-Through 836, software agent 840, and enhanced firmware 838 will now be described.

Figure 16:
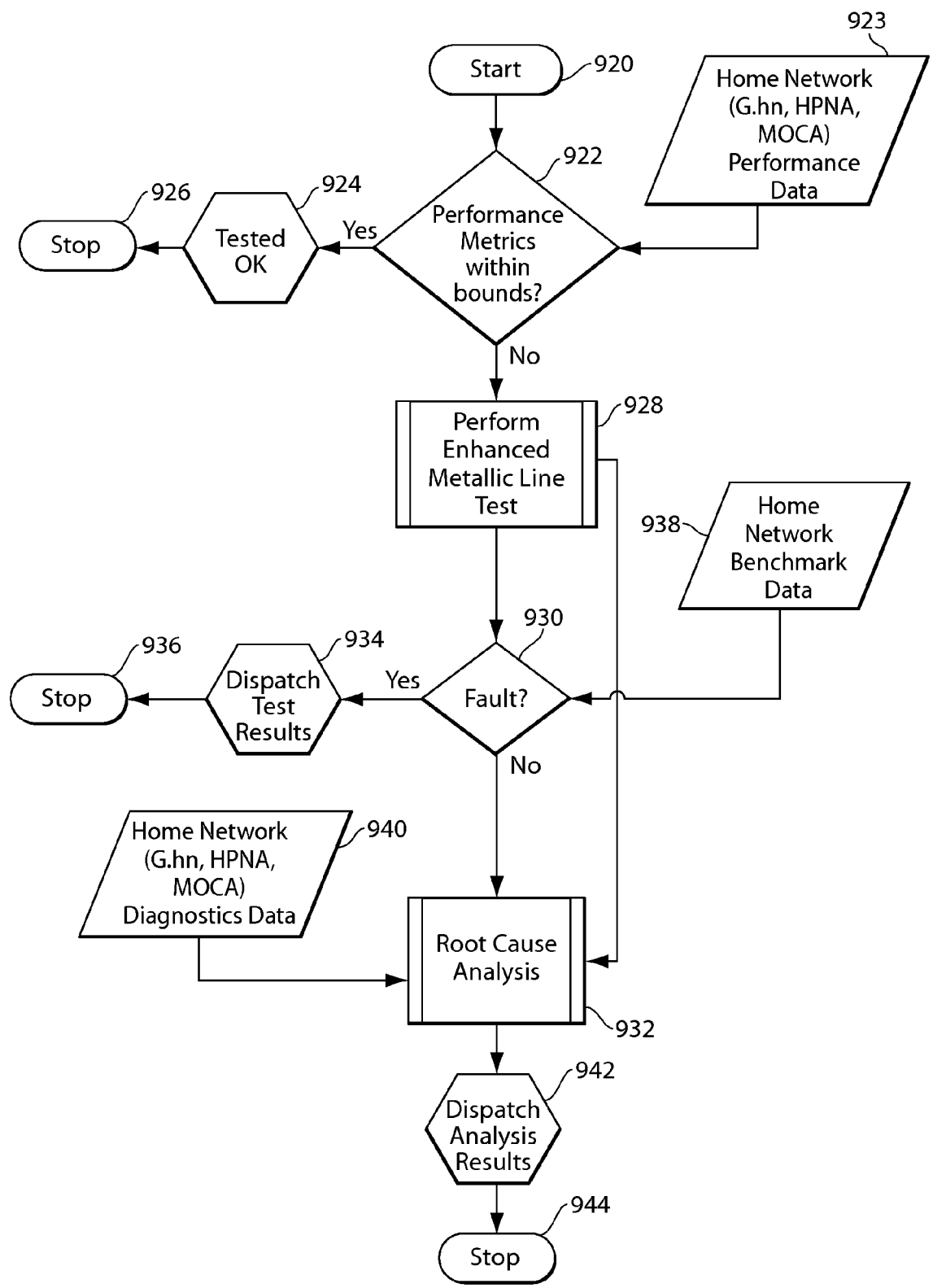
FIG. 16 shows a measurement analysis method, according to some embodiments.

In the flow diagram of FIG. 16, the method advances from start step 920 to step 922 wherein CPU 832 of residential gateway 808 operating under the control of software agent 840 residing in residential gateway 808 determines whether the line conditions acquired by any one or a combination of the parametric line tests, the time and frequency domain reflectometry tests, and/or the dual-ended measurement tests are within predetermined bounds or tolerances 923 available to CPU 832 of residential gateway 808 in step 922. If so, the method advances to step 924 where the CPU 832 of residential gateway 808 deems the step to be successful whereupon the method advances to stop step 926. Optionally, if the CPU 832 of residential gateway 808 in step 924 deems the line test to be within acceptable tolerances, CPU 832 of residential gateway 808 can cause said test results to be output to a user (e.g., displayed on a computer or one or more televisions 818-1-818-3), can cause test results to be supplied to broadband service provider 804, and/or can cause test results to be output on port 868 of residential gateway 808 for retrieval and/or analysis by a PC, or any other suitable and/or desirable type or form of intelligent controller.

Exemplary bounds or tolerances 923 available to CPU 832 of residential gateway 808 include packet errors; signal-to-noise ratio (SNR); and receive signal power. However, this list of bounds or tolerances is not to be construed as limiting the invention.

Returning to step 922, if it is determined by the CPU 832 of residential gateway 808 that one or more line measurements are not within acceptable tolerance, the method advances to step 928 where CPU 832 of residential gateway 808 operating under the control of software agent 840 residing in residential gateway 808 causes one or more enhanced metallic line tests to be performed by the Measurement AFE/Pass-Through 836 of one or more nodes 808, 814-1, 814-2, and/or 814-3 of communication network 802. The results of the enhanced performance metallic line test(s) of step 928 are provided in parallel to steps 930 and 932. In step 930, the CPU 832 of residential gateway 808 determines if the enhanced metallic line test detected a fault. If so, the method advances to step 934 where CPU 832 of residential gateway 808 dispatches test results to one or more televisions 818-1-818-3, to broadband service provider 804, and/or to port 868 for retrieval and analysis by an intelligent control device, such as a PC. However, if in step 930, CPU 832 of residential gateway 808 determines that the enhanced metallic line test passed, the method advances to step 932. In 930, the CPU 832 of residential gateway 808 determines whether or not a fault is present by comparing the results of the enhanced metallic line test(s) to home network benchmark data 938 for said enhanced metallic line test(s).

In step 932, the CPU 832 of residential gateway 808 performs a root cause analysis by comparing the line tests to home network diagnostic data 940. In step 942, CPU 832 of residential gateway 808 dispatches the analysis results to one or more of televisions 818-1-818-3, to broadband service provider, and/or to port 868 for analysis and retrieval by an intelligent control device, such as a PC 69. The method then advances to stop step 944.

Figure 17:
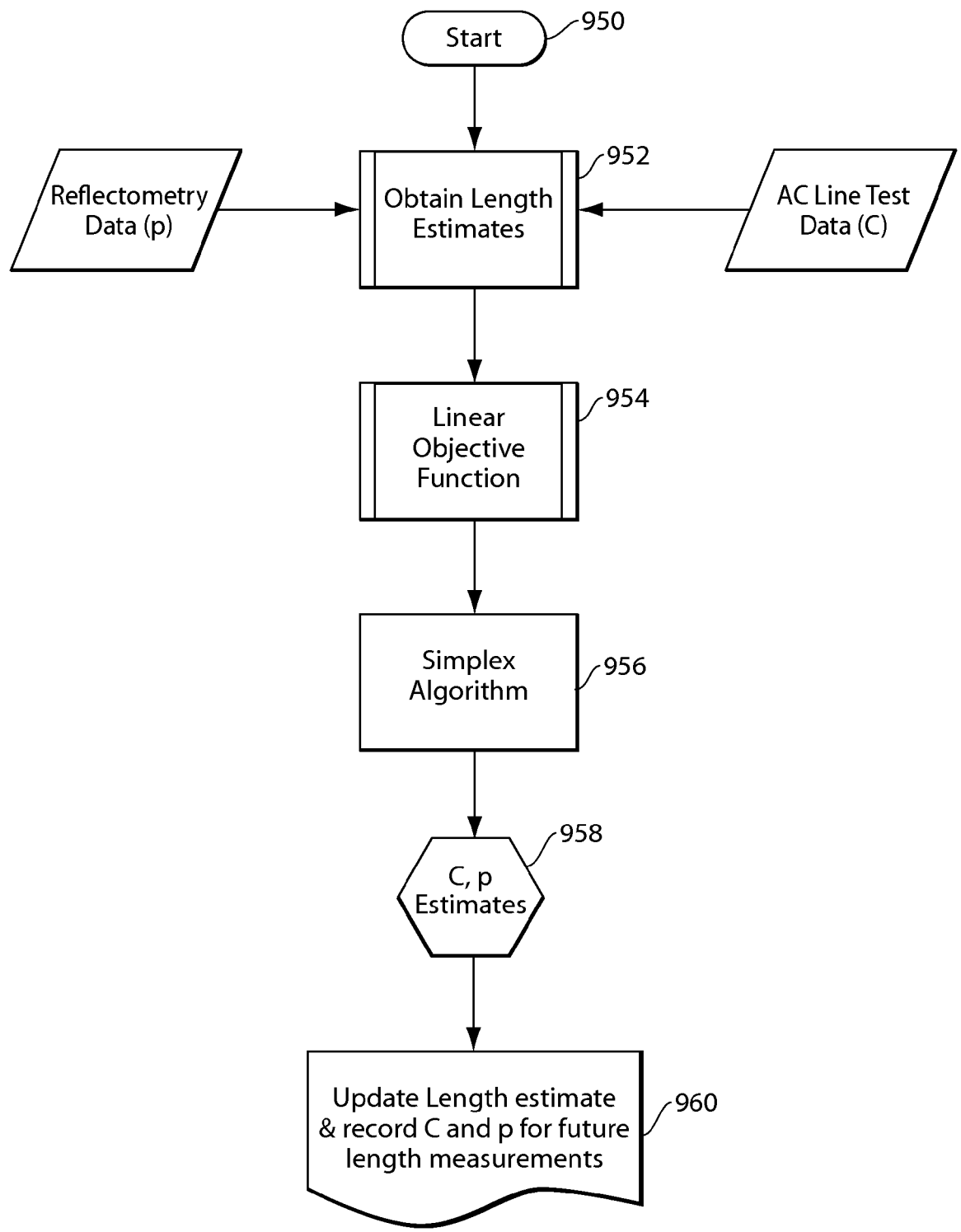
FIG. 17 shows an analysis method, according to some embodiments

With reference to the exemplary integrated analysis flow chart of FIG. 17, the method advances from a start step 950 to a step 952 wherein the CPU 832 of residential gateway 808 operating under the control of the software agent 840 residing in residential gateway 808 causes the Measurement AFE/Pass-Through 836 of one or more nodes 808, 814-1, 814-2, and/or 814-3 to obtain line length estimates from a number of different measurement techniques, e.g., a reflectometry measurement and a low frequency parametric line measurement. To this end, the software agent 840 residing in residential gateway 808 has knowledge of the propagation constant of the cable under test. Similarly, the cable length measurement obtained from low frequency line tests, such as capacitance, requires that software agent 840 residing on residential gateway 808 have knowledge of the line characteristics, such as capacitance per meter (or resistance per meter), for the measurement. When only one of the measurements is available, the estimate of line length is as accurate as the knowledge of the line characteristic parameter. However, the length measurement can be improved if both measurements are available using an approach that optimizes the estimate by minimizing the error in length obtained from the two test results.

In accordance with this example, the method advances to step 954 wherein an optimization problem, namely, a linear objective function, may solved for improving the length estimate obtained from AC line test data and from reflectometry data. For example, one possible linear objective function, shown in step 954 of FIG. 16, may be formulated as a linear equation with possible ranges for capacitance (or resistance) per meter and the propagation constant acting as a linear constraint to the optimization problem.

The method then advances to step 956 where the optimization problem is solved, e.g., utilizing the well-known Simplex Algorithm. The method then advances to step 958 where the solution of the length data C determined from the AC line test data and the length p determined by the reflectometry data are determined. In step 960, the values for C and p are updated in a memory of CPU 832 of residential gateway 808 and recorded for future length measurement.

The techniques described herein also enable correlation of diagnostic data across different layers of the communication network 802 shown in FIG. 8. Typically, where measurement and diagnostic data from different sources, such as two or more of residential gateway 808, STB 814-1, STB 814-2, and STB 814-3, are available, there can be inter-relation between said data depending upon the type of impairment. Correlation of relevant data obtained from different sources is performed for root cause and dispatch analysis.

One possible integrated analysis is detection of degradation in the performance of cables 816, 824-1, 824-2, and/or 824-3. The following information can be utilized by CPU 832 of residential gateway 808 for identifying a root cause of this performance degradation in a link data rate and/or where high error rate is observed: longitudinal balance; signal to noise ratio (SNR); noise power; noise margin; and/or the error seconds (DSL MIB data). In the case where the analysis determines a low balance of cables 816, 824-1, 824-2, and/or 824-3 from physical line test data acquired from one or more of cables 816, 824-1, 824-2, and/or 824-3, test results indicative of this are output to one or more televisions 818-1-818-3, to broadband service provider 4, and/or to port 68 of residential gateway 8 for retrieval and analysis by an intelligent controller, such as PC 69. Similar comments apply is respect of CPU 832 of residential gateway 808 determining low longitudinal balance or that the physical wiring is "tested OK" with the degraded data rate.

Desirably, CPU 832 of one or more nodes 808, 814-1, 814-2, and/or 814-3 is operative under the control of its software agent 840 to perform an integrated analysis of test data or data sets obtained during the performance of any one or combination of the parametric line tests, reflectometry measurements and double-ended interactive tests discussed above to provide a combined data analysis statement for the identification of a root cause failure in any one or combination of tables 816, 824-1, 824-2, 824-3, and/or junction 822. More specifically, there are multiple sources of data available to the software agent 840 for diagnosis of communication network 802. For example, from residential gateway 808 and one or more STBs 814-1-814-3, the following example classes of information can be acquired: equipment inventory and status, e.g., hardware make, model, and firmware version; link status and performance data, e.g., DSL MIB data; and network diagnostic statistics, e.g., bit error rates and noise specifics. The addition of the Measurement AFE/Pass-Through 836 and enhanced firmware 838 to the MoCA, HPNA, and/or G.hn chipsets provides additional measurement capabilities beyond standard specification requirement. These measurements provide tools for cost analysis, sectionalizton, and isolation of quality of service ((PS) and quality of experience (QOE) problems inside communication network 802 by providing specific function, such as, without limitation, DC (metallic) and AC (impedance) parametric line tests, e.g., leakage resistances; reflectometry (TDR and FDR) measurement, e.g., table length; and double-interactive tests, e.g., insertion loss.

The software agent 840 performs these functions either autonomously or on demand, aggregates this data and dispatches this data as required or at periodic intervals to an external application. This external application categorizes each data point and assigns a weighted value to its importance. Then, the application determines the fault identification, location, and resolution, desirably by way of an artificial intelligence algorithm. It is envisioned that the test device can run any suitable and/or desirable suite or combination of tests and aggregate the data acquired in response to these tests either periodically or on demand to provide a comprehensive diagnosis of communication network 802, especially cables 816, 824-1-824-3 and junction 822.

Various modifications and alterations will occur to others upon reading and understanding the preceding description. For example, it is envisioned in one alternate embodiment that gateway 808, STB 814-1, STB 814-2 and/or STB 814-3 (or any other device, such as, without limitation, a PC or a smart appliance that includes a MoCA, HPNA, or G.hn interface) can exclude Measurement AFE/Pass-Through 836 and enhanced firmware 838 while still enabling some limited testing, such as one or more of the single-ended tests described above, with use of the existing hardware of STB described generally in FIG. 9 above.

Additional Aspects

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

For example, embodiments of controllers may be implemented using hardware, software or a combination thereof. When implemented in software, the software code can be executed on any suitable hardware processor or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed to perform the functions recited above.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Exemplary thresholds have been described herein that may be used for various tests. However, the techniques described herein are not limited to the particular threshold values provided, as different threshold values may provide suitable results. Further it should be appreciated that the threshold value(s) used may depend on various factors such as the length of the conductors and the measurement frequency selected for a particular application. Thus, one of ordinary skill in the art will appreciate that actual threshold values and methods for calculating such values are expected to vary from application to application.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method to detect a service affecting condition in a communications network associated with a missing filter, the method comprising:
   with a test device connected to a conductor of the communications network, measuring a spectrum on the conductor to determine first spectrum information;
   detecting a communication device connected to the communication network in an in-use state;
   while the communication device is in the in-use state, with the test device, measuring a spectrum on the conductor to determine second spectrum information;
   with a computerized device external to the test device, providing an instruction to a customer of a communication service provided over the communications network to place a telephone-like device in an off-hook state; and
   indicating a missing filter when the second spectrum information deviates from the first spectrum information by more than a threshold amount,
   wherein the communications network comprises a DSL network and the communication device comprises a communication device that operates in the voice band.

2. The method of claim 1, wherein:
   providing the instruction to the customer to place a telephone-like device in an off-hook state comprises providing at least one instruction for the customer to sequentially place a plurality of telephone-like devices in an off-hook state; and
   indicating the missing filter additionally comprises indicating a location of the missing filter.

3. The method of claim 2, wherein:
   measuring the spectrum on the conductor to determine the first spectrum information comprises measuring a spectrum on the conductor when each of the plurality of telephone-like devices is in an off-hook state; and
   indicating the location of the missing filter comprises indicating the location relative to at least one of the plurality of telephone-like devices.

4. The method of claim 3, wherein:
   indicating the location of the missing filter comprises providing an instruction to the customer to check for a filter connected to at least one of the plurality of telephone-like devices.

5. The method of claim 1, wherein detecting a communication device in an in-use state comprises detecting a tone in the voice band.

6. The method of claim 5, wherein the tone comprises at least one of a dial tone, DTMF tone, call progress tone, or ringing tone.

7. The method of claim 5, wherein a missing filter is indicated when deviation between the first spectrum and the second spectrum of more than the threshold is coincident with the detected tone.

8. The method of claim 1, wherein the missing filter is indicated based on a magnitude of a difference between the second spectrum information and the first spectrum information.

9. The method of claim 8, wherein the missing filter is indicated based on comparing energy levels, as indicated in the first spectrum information, at each of a plurality of frequencies to energy levels, as indicated in the second spectrum information, at corresponding frequencies.

10. The method of claim 1, wherein the missing filter is indicated based on comparing an aggregate energy level, as indicated in first spectrum information, at a plurality of frequencies to an aggregate energy level, as indicated in the second spectrum information, at corresponding frequencies.

11. The method of claim 10, wherein:
the plurality of frequencies correspond to a frequency spectrum used in a DSL communications network for data communication.

12. The method of claim 1, wherein indicating a missing filter comprises transmitting to an external computing device a result of a comparison between the second spectrum information and the first spectrum information.

13. A method to detect a service affecting condition in a communications network associated with a missing filter, the method comprising:
with a test device connected to a conductor of the communications network, measuring a spectrum on the conductor to determine first spectrum information;
detecting a communication device connected to the communication network in an in-use state;
while the communication device is in the in-use state, with the test device, measuring a spectrum on the conductor to determine second spectrum information; and
indicating a missing filter when the second spectrum information deviates from the first spectrum information by more than a threshold amount, wherein:
the conductor is at least partially within a customer premises;
the method further comprises:
measuring a line feed voltage; and
determining for the measured line feed voltage that no telephone-like devices connected to the conductor are off-hook; and
measuring the spectrum on the conductor to determine first spectrum information comprises measuring the spectrum while it is determined that no telephone-like devices are off-hook.

14. The method of claim 13, wherein the communications network comprises a DSL network and the communication device comprises a communication device that operates in the voice band.

15. The method of claim 14, further comprising:
with a computerized device external to the test device, providing an instruction to a customer of a communication service provided over the communications network to place a telephone-like device in an off-hook state.

16. The method of claim 15, wherein:
providing the instruction to the customer to place a telephone-like device in an off-hook state comprises providing at least one instruction for the customer to sequentially place a plurality of telephone-like devices in an off-hook state; and
indicating the missing filter additionally comprises indicating a location of the missing filter.

17. The method of claim 16, wherein:
measuring the spectrum on the conductor to determine the first spectrum information comprises measuring a spectrum on the conductor when each of the plurality of telephone-like devices is in an off-hook state; and
indicating the location of the missing filter comprises indicating the location relative to at least one of the plurality of telephone-like devices.

18. The method of claim 17, wherein:
indicating the location of the missing filter comprises providing an instruction to the customer to check for a filter connected to at least one of the plurality of telephone-like devices.

19. A test device, comprising:
a port for connection to a conductor of a customer premises over which DSL service is provided, the DSL service supporting communications in a voice band and a data band;
measurement circuitry; and
at least one processor configured to:
operate the measurement circuitry to take DC measurements on the conductor;
process the DC measurements to indicate whether there is connected to the conductor a terminal device in an off-hook state;
operate the measurement circuitry so as to obtain spectrum information associated with signals on the conductor at a plurality of times, wherein the plurality of times comprises a first time when no terminal device is indicated in the off-hook state and a second time when at least one terminal device is indicated in the off-hook state;
analyze the spectrum information to identify, in the data band, spectral energy generated by a terminal device adapted to communicate in the voice band; and
when the spectral energy exceeds a threshold, indicate a fault condition associated with the conductor.

20. The test device of claim 19, wherein:
the test device further comprises a memory;
the spectrum information comprises first spectrum information and second spectrum information; and
the processor is further adapted to:
maintain in the memory the first spectrum information indicating energy in at least the data band when no terminal device is indicated in the off-hook state;
operate the measurement circuitry at the second time to generate the second spectrum information; and
compute the spectral energy generated by the terminal device adapted to communicate in the voice band by comparing the second spectrum information to the first spectrum information.

21. The test device of claim 20, wherein:
the processor is further adapted to, repeatedly:
operate the measurement circuitry to measure a DC voltage on the conductor; and
when the DC voltage indicates that no terminal device is in the off-hook state, operate the measurement circuitry to measure energy at least one frequency in the data band, and update the first spectrum information.

22. The test device of claim 19, wherein the port comprises an xDSL-compatible connector.

23. The test device of claim 19, wherein:
the test device comprises a display; and
the at least one processor is configured to indicate a fault condition associated with conductor by presenting a result on the display indicating a missing filter.

24. The test device of claim 19, wherein the fault condition is indicated when the spectral energy exceeds a threshold at a timing coincident with detection of the terminal device being in an in-use state.

25. The test device of claim 24, wherein detecting the terminal device in an in-use state comprises detecting a signal corresponding to a signaling tone in the voice band.

* * * * *